US007011444B2

(12) United States Patent
Mayusumi et al.

(10) Patent No.: US 7,011,444 B2
(45) Date of Patent: Mar. 14, 2006

(54) FIRE SENSOR

(75) Inventors: Kari Mayusumi, Tokyo (JP); Yukio Yamauchi, Kanagawa-ken (JP); Hiroshi Shima, Kanagawa-ken (JP)

(73) Assignee: Hochiki Corporation, (JP)

( * ) Notice: Subject to any disclaimer, the term of this patent is extended or adjusted under 35 U.S.C. 154(b) by 14 days.

(21) Appl. No.: 10/246,481

(22) Filed: Sep. 19, 2002

(65) Prior Publication Data

US 2003/0058117 A1 Mar. 27, 2003

(30) Foreign Application Priority Data

Sep. 21, 2001 (JP) ............................. 2001-288822
Sep. 27, 2001 (JP) ............................. 2001-295530
Dec. 27, 2001 (JP) ............................. 2001-395898

(51) Int. Cl.
*G08B 17/00* (2006.01)
*G08B 23/00* (2006.01)
*G01K 3/00* (2006.01)
*G01K 7/00* (2006.01)

(52) U.S. Cl. ...................... 374/112; 374/208; 374/178; 374/179; 374/185; 340/584; 340/693.6; 340/598

(58) Field of Classification Search ................ 374/208, 374/178, 141, 110, 112, 179, 185, 109, 138, 374/163, 210, 100, 135, 29, 114, 165, 183; 340/693.6, 599, 598, 628, 577, 584, 595, 340/693.11, 693.9, 627, 585
See application file for complete search history.

(56) References Cited

U.S. PATENT DOCUMENTS 4,236,822 A 12/1980 Jaretsky et al.
4,295,371 A * 10/1981 Sawa ......................... 257/687
4,331,888 A * 5/1982 Yamauchi ................... 340/598
4,388,617 A * 6/1983 Nakanishi et al. .......... 340/594
4,803,469 A * 2/1989 Matsushita .................. 340/577
6,445,292 B1 * 9/2002 Jen et al. ............... 340/539.26
2003/0058116 A1 * 3/2003 Mayusumi et al. ......... 340/584
2003/0063005 A1 * 4/2003 Mayusumi et al. ......... 340/584

FOREIGN PATENT DOCUMENTS

| | | |
|---|---|---|
| DE | 39 24 252 | 2/1991 |
| EP | 1 298 617 | 4/2003 |
| GB | 1 219 006 | 1/1971 |
| JP | 58-38467 | 8/1983 |
| JP | 1-297795 | 11/1989 |
| JP | 7-43284 | 2/1991 |
| JP | 04 297992 | 10/1992 |
| JP | 06 096375 | 4/1994 |

* cited by examiner

*Primary Examiner*—Gail Verbitsky
*Assistant Examiner*—Mirellys Jagan
(74) *Attorney, Agent, or Firm*—Blank Rome LLP

(57) ABSTRACT

A fire sensor comprising a baseplate, a temperature detecting element, and a protective case. The baseplate has an outside surface which serves as a heat sensing surface which is exposed to a hot airflow generated by a fire. The temperature detecting element thermally contacts with the inside surface of the baseplate to detect the temperature of the baseplate. The protective case contacts with the radially outer portion of the inside surface of the baseplate to form a hermetically sealed space between itself and the baseplate. The temperature detecting element is confined within the hermetically sealed space. The baseplate has the temperature detecting element in approximately the central portion of the inside surface thereof and also has a shape and a material which meet the condition that the product of the thickness and heat conductivity of the baseplate is $1.1\times10^{-4}$ (W/K) or less.

79 Claims, 49 Drawing Sheets

| Radius of heat sensing portion $r_0$ [mm] | Radius of heat sensing portion $r$ [mm] | Conditional expression $\alpha \times 10-4 \geqq \lambda$ disk·d of $\alpha$ [W/K] |
|---|---|---|
| 1.5 | 10 | 0.81 |
| 1.5 | 15 | 0.93 |
| 2.0 | 10 | 0.97 |
| 2.0 | 15 | 1.1 |
| 2.0 | 20 | 1.2 |
| 2.0 | 25 | 1.3 |
| 2.5 | 25 | 1.5 |

(A)

(B)

(A)

(B)

(A)

(B)

(A)

(B)

(A)

(B)

(A)

(B)

(A)

(B)

(A)

(B)

(A)

(B)

(A)

(B)

(A)

(B)

(A)

(B)

PRIOR ART

PRIOR ART

PRIOR ART

PRIOR ART

FIRE SENSOR

BACKGROUND OF THE INVENTION

1. Field of the Invention

The present invention relates generally to a fire sensor, and more particularly to a fire sensor that detects temperature changes in a hot airflow generated by a fire, using a temperature detecting element.

2. Description of the Related Art

A prior art fire sensor, for detecting temperature changes in a hot airflow generated by a fire, is shown in FIG. 56 by way of example (Japanese Utility Model Laid-Open Publication No. SHO55-150490). This fire sensor includes a sensor main body 51 with a circuit board 55 incorporated therein, a protective case 52 made of metal and protruding from the sensor main body 51, and a temperature detecting element 53 housed in the protective case 52. In addition to these components, the fire sensor further includes a heat collecting plate 54 mounted on the tip end of the protective case 52 for purposes of accelerating the speed of a temperature response to a hot airflow generated by a fire. The temperature detecting element 53 consists of a transistor.

FIG. 57 shows another fire sensor that detects temperature changes in a hot airflow generated by a fire. This fire sensor includes a sensor main body 51 having a circuit board 55 incorporated therein, and a temperature detecting element 53. The temperature detecting element 53 consists of a thermistor coated with resin. The fire sensor further includes a protective structure 57 to protect the temperature detecting element 53. In this case, since the temperature detecting element 53 is exposed to air through the resin coating formed thereon, sufficient response speed is obtained without a special structure such as the heat collecting plate 54 shown in FIG. 56.

The above-described fire sensors, however, have the following problem. The fire sensor in FIG. 56 is constructed such that heat does not escape to the sensor main body 51 via the wall of the protective case 52. Because of this, the temperature detecting element 53 has to be disposed away from the sensor main body 51, and consequently, the size of the fire sensor cannot be reduced. In the case of the fire sensor shown in FIG. 57, the temperature detecting element 53 must be disposed away from the sensor main body 51 to prevent thermal energy from escaping via wiring 58. In addition, the protective structure 57 is required because the wiring 58 is low in mechanical strength. Thus, it is fairly difficult to achieve a reduction in sensor size.

Furthermore, there is a prior art fire heat sensor which performs differential heat sensing. This differential fire heat sensor detects a fire by judging the rate of a rise in temperature caused by the fire, using a plurality of temperature detecting elements and a heat conduction structure thereof. As such a differential fire heat sensor, there are a thermocouple type heat sensor and a heat sensor which employs two thermistors. In addition, there is a temperature sensor employing a micro machining technique for purposes of detecting a rapid change in temperature. These differential fire heat sensors employ two temperature detecting elements, and detect the temperature difference therebetween to judge a rapid rise in temperature. To cause the temperature difference to occur, one of the two detecting elements has a high response to heat and the other has a low response to heat.

Such differential fire heat sensors, however, have the following problems.

FIG. 58 shows a thermocouple type heat sensor (Japanese Patent Publication No. SHO 44-24057). In the figure, a semiconductor thermocouple 71 which is a heat sensing element is in contact with a hot junction 73 on the inside of a heat sensing cover 72 made of metal, and is installed in the central portion of the heat sensor. The hot junction 73 and a cold junction 74 are in a positional relationship perpendicular to each other with respect to a sensor mounting surface 75. As the hot junction 73 and the cold junction 74 are in a positional relationship perpendicular to the direction of a hot airflow, sensitivity does not vary depending on the hot airflow direction.

On the other hand, the heat sensing cover 72 is made of metal. Because metal is typically great in thermal diffusivity, the escape of thermal energy through heat transfer is great and a rise in the temperature of the hot junction 73 is small. Since the temperature rise of the hot junction 73 is small, the temperature difference between the hot junction 73 and the cold junction 74 becomes small and only a small output can be obtained.

FIG. 59 shows a prior art heat sensor with two thermistors as heat sensing elements (Japanese Utility Model Publication No. HEI 1-297795). In this type of heat sensor, the magnitude of a temperature difference signal that is obtained from two thermistors 83*a,* 84*a* is sufficient because one (thermistor 83*a*) of the two is exposed to a hot airflow. However, since the two thermistors 83*a,* 83*b* are in a positional relationship that is asymmetrical in a horizontal direction, there is a problem that sensitivity (magnitude of the temperature difference) will greatly depend on the direction of a hot airflow.

FIG. 60 shows a temperature sensor employing a micro machining technique for purposes of detecting a rapid temperature change (Japanese Patent Publication No. HEI 7-43284). In the figure, this temperature sensor includes a substrate 91, an insulating layer 91*a* formed on the top surface of the substrate 91, and sensing elements S and S' formed on the thick portion A and thin portion A' of the substrate 91 through the insulating layer 91*a*. The bottom surface of the substrate 91 is mounted on a heat sink 92. The thickness of the substrate 91 is 400 to 600 $\mu$m or less and the insulating layer 91*a* is 10 $\mu$m or less. Since they are on the order of a micrometer, a reduction in sensor size is possible. However, because the sensing elements S and S' are disposed in close proximity to each other, there is a problem that the temperature difference therebetween is small. If the sensing element S is disposed away from the sensing element S' to obtain a great temperature difference, sensitivity (magnitude of the temperature difference) will depend on the direction of a hot airflow and the sensor will be increased in size and cost.

SUMMARY OF THE INVENTION

The present invention has been made in view of the circumstances mentioned above. Accordingly, it is an object of the present invention is to provide a fire sensor whose temperature response to a hot airflow generated by a fire is high, and which is capable of being reduced in size. Another object of the invention is to provide a fire heat sensor that is structurally simple and of a sufficiently small size as a fire sensor. Still another object of the invention is to provide a fire heat sensor which is capable of performing differential heat sensing in which sensitivity is independent of the direction of a hot airflow.

To achieve the above-described objects and in accordance with the present invention, there is provided a fire sensor comprising a baseplate, a temperature detecting element, and a protective case. The baseplate has an outside surface which serves as a heat sensing surface which is exposed to a hot airflow generated by a fire. The temperature detecting element thermally contacts with the inside surface of the baseplate to detect temperature of the baseplate. The protective case contacts with the radially outer portion of the inside surface of the baseplate to form a hermetically sealed space between itself and the baseplate. The temperature detecting element is confined within the hermetically sealed space.

With the above-described structure of the fire sensor of the present invention, the heat sensing portion, which comprises the baseplate and the temperature detecting element, is flat in shape and it is therefore easy to reduce the thickness and size of the fire sensor.

In a preferred form of the present invention, the baseplate has the temperature detecting element in approximately the central portion of the inside surface thereof and also has a shape and a material which meet the condition that the product of the thickness and heat conductivity of the baseplate is $1.1\times10^{-4}$ (W/K) or less.

Therefore, when the baseplate is exposed to a hot airflow generated by a fire, the heat energy $Q_{disk}$ that escapes through the baseplate becomes less than or equal to the heat energy $Q_{air}$ that escapes through air. Therefore, the baseplate and air can be considered the same with respect to the flow of thermal energy. Since the heat flow through the baseplate in the protective case is negligible, a quick response to heat and a great rise in temperature are obtained.

In the fire sensor of the present invention, the hermetically sealed space may be filled with a resin material or heat insulating material.

Further in accordance with the present invention, there is provided a fire heat sensor comprising:

at least three heat collectors disposed so that they are thermally isolated from one another at positions where heat is received from a hot airflow generated by a fire;

low-temperature detecting portions, which comprise the heat collector, a heat accumulator, and a temperature detecting element, for measuring and outputting a temperature which rises slowly when receiving heat from the hot airflow;

high-temperature detecting portions, which comprise the heat collector and a temperature detecting element, for measuring and outputting a temperature which rises sharply when receiving heat from the hot airflow; and a heat sensing circuit for performing differential heat sensing in response to the outputs of the low-temperature detecting portions and high-temperature detecting portions.

In the fire heat sensor of the present invention, the above-described low-temperature detecting portions may comprise one low-temperature detecting portion. The above-described high-temperature detecting portions may comprise two high-temperature detecting portions. The heat collector of the one low-temperature detecting portion may be situated at the center of a circle. The heat collectors of the two high-temperature detecting portions maybe situated on the circle and on a center line passing through the center of the circle.

Thus, if two high-temperature detecting portions are provided at symmetrical positions across one low-temperature detecting portion, the sensitivity of differential heat sensing can be made constant regardless of the direction of a hot airflow.

That is, temperature differences ΔT1 and ΔT2 between the two high-temperature detecting portions and the one low-temperature detecting portion are expressed as $$\Delta T1 = Th1 - Tc$$

$$\Delta T2 = Th2 - Tc$$

where Th1 is the temperature detected by one of the two high-temperature detecting portions, Th2 is the temperature detected by the other of the two high-temperature detecting portions, and Tc is the temperature detected by the low-temperature detecting portion.

Hence, the present inventors have measured the above-described temperature differences by changing the direction of a hot airflow, and found the following fact. That is, the total (ΔT1+ΔT2) of the two temperature differences does not depend on the direction of a hot airflow.

Thus, the present invention has been made based on the above-described fact that the total of two temperature differences does not depend on the direction of a hot airflow.

The above-described heat sensing circuit performs differential heat sensing by calculating adding or averaging temperature differences obtained between the outputs of two high-temperature detecting portions and the output of one low-temperature detecting portion. That is, the total (ΔT1+ΔT2) or average value {(ΔT1+ΔT2)/2}, which is independent of the direction of a hot airflow, is calculated. If this value exceeds a predetermined threshold value, it is judged that a fire has occurred.

In the fire heat sensor of the present invention, the temperature detecting elements of the one low-temperature detecting portion and two high-temperature detecting portions may comprise two composite transistors which each comprise a pair of transistors connected through molded resin. The heat collector of the one low-temperature detecting portion may be connected with a lead frame terminal on which one transistor of each of the two composite transistors is mounted. The heat collector of each of the two high-temperature detecting portions may be connected with a lead frame terminal on which the other transistor of each of the two composite transistors is mounted. The heat sensing circuit may constitute a bridge circuit which includes the transistors connected to the low-temperature detecting portion and the transistors connected to the high-temperature detecting portions, in order to obtain a differential output that is proportional to a temperature difference between the high-temperature detecting portion and the low-temperature detecting portion.

Thus, if the low-temperature detecting elements of the temperature detecting portion and high-temperature detecting portions comprise two composite transistors which each comprise a pair of transistors connected through molded resin, and lead frame terminals on which each transistor is mounted are connected directly to the respective heat collectors, then the flow of heat is formed from the high-temperature detecting portion to the low-temperature detection portion through the molded resin. Therefore, an ideal characteristic can be realized in which a temperature difference reaches a fixed value with respect to a slow linear rise in temperature required of a sensor which performs differential heat sensing.

Note that the above-described temperature detecting element may also comprise a single transistor.

In the fire heat sensor of the present invention, the heat sensing circuit may constitute a bridge circuit which includes a Darlington connection of two transistors collector-connected to the low-temperature detecting portion and a Darlington connection of two transistors collector-connected to the high-temperature detecting portions, in order to obtain a differential output that is proportional to a temperature difference between the high-temperature detecting portion and the low-temperature detecting portion.

With the Darlington connection of two transistors collector-connected to the low-temperature detecting portion and the Darlington connection of two transistors collector-connected to the high-temperature detecting portions, a temperature coefficient for the base-emitter junction is doubled and therefore a difference in temperature can be made greater.

The heat sensing circuit may also constitute a bridge circuit which includes a parallel connection of two transistors collector-connected to the low-temperature detecting portion and a parallel connection of two transistors collector-connected to the high-temperature detecting portions, in order to obtain a differential output that is proportional to a temperature difference between the high-temperature detecting portion and the low-temperature detecting portion. In this case, a change in the base-emitter voltage $V_{be}$ of each of the two transistors connected to the low-temperature detecting portion and high-temperature detecting portions is detected and therefore a stable operation with respect to power source voltage fluctuations and external noise can be assured.

In the fire heat sensor of the present invention, the above-described low-temperature detecting portions may comprise two low-temperature detecting portions. The above-described high-temperature detecting portions may comprise one high-temperature detecting portion. The heat collector of the one high-temperature detecting portion may be situated at the center of a circle. The heat collectors of the two low-temperature detecting portions may be situated on the circle and on a center line passing through the center of the circle. The heat sensing circuit may perform differential heat sensing by adding or averaging a first differential output which corresponds to a temperature difference between one of the two low-temperature detecting portions and the one high-temperature detecting portion, and a second differential output which corresponds to a temperature difference between the other of the two low-temperature detecting portions and the one high-temperature detecting portion.

In this case, by adding or averaging two temperature differences, differential heat sensing can also be performed without depending on the direction of a hot airflow. Since the low-temperature detecting portion requires a heat accumulator of a relatively large size, it is preferable to reduce the number of low-temperature detecting portions to reduce the size of the fire heat sensor itself. If there is sufficient space, the number of low-temperature detecting portions may be greater than that of high-temperature detecting portions.

In the fire heat sensor of the present invention, the above-described low-temperature detecting portions may comprise one low-temperature detecting portion. The above-described high-temperature detecting portions may comprise four or more high-temperature detecting portions. The heat collector of the one low-temperature detecting portion may be situated at the center of a circle. The heat collectors of the four or more high-temperature detecting portions may be situated on the circle and on a plurality of center lines passing through the center of the circle. The heat sensing circuit may perform differential heat sensing by adding or averaging four or more differential outputs obtained between the four or more high-temperature detecting portions and the one low-temperature detecting portion.

In the fire heat sensor of the present invention, the above-described low-temperature detecting portions may comprise four or more low-temperature detecting portions. The above-described high-temperature detecting portions may comprise one high-temperature detecting portion. The heat collector of the one high-temperature detecting portion may be situated at the center of a circle. The heat collectors of the four or more low-temperature detecting portions may be situated on the circle and on a plurality of center lines passing through the center of the circle. The heat sensing circuit may perform differential heat sensing by adding or averaging four or more differential outputs obtained between the four or more low-temperature detecting portions and the one high-temperature detecting portion.

Further, in the fire heat sensor of the present invention, the above-described low-temperature detecting portions may comprise a plurality of low-temperature detecting portions. The above-described high-temperature detecting portions may comprise a plurality of high-temperature detecting portions which correspond in number to the plurality of low-temperature detecting portions. The heat collectors of the plurality of low-temperature detecting portions may be situated on a circle and on a center line passing through the center of the circle. The heat collectors of the plurality of high-temperature detecting portions may be situated on the circle or a concentric circle, and on a center line passing through the center of the circle. The heat sensing circuit may perform differential heat sensing by calculating a difference between an average value of outputs of the plurality of high-temperature detecting portions and an average value of outputs of the plurality of low-temperature detecting portions.

In the fire heat sensor of the present invention, the heat collector assures thermal insulation by being installed on a fixing member which is formed form a material whose thermal diffusivity is less than $10^{-6}$ $m^2/s$. The fixing member may be formed from synthetic resin (polyimide, glass epoxy, etc.) or glass. The thermal diffusivity of the materials of the heat collector and the heat accumulator is in the range of $10^{-6}$ to $10^{-3}$ $m^2/s$. For example, the heat collector and the heat accumulator may be formed from metal such as copper, aluminum, etc. Furthermore, the heat collector may comprise an electrode pad for a circuit mounting board.

In addition to transistors, the temperature detecting element may comprise a thermocouple, a thermistor, or a diode. Furthermore, the heat accumulator may comprise an electronic component which forms a portion of an electrical signal circuit; for examples, an electrolytic capacitor, a light-emitting diode.

The above-described fire sensor of the present invention may further include an outer cover for protecting the temperature detecting element. In this case, the outer cover has a plurality of plate fins protruding from a sensor main body toward the temperature detecting element, and the plurality of plate fins have a predetermined offset angle to a center line passing through the center of the outer cover and are erected approximately perpendicular to the sensor main body.

With this arrangement, if the outer cover is exposed to a hot airflow generated by a fire, the hot airflow is collected to the heat sensing portion by the plate fins. Therefore, detection sensitivity to a hot airflow is enhanced.

Furthermore, the above-described fire heat sensor of the present invention may further include an outer cover for protecting the temperature detecting element. As with the fire sensor, the outer cover has a plurality of plate fins protruding from a sensor main body toward the temperature detecting element, and the plurality of plate fins have a predetermined offset angle to a center line passing through the center of the outer cover and are erected approximately perpendicular to the sensor main body.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the present invention will hereinafter be described in detail with reference to the drawings.

(A) Embodiments of a Fire Sensor

Initially, a description will be given of embodiments of the present invention applied to a fire sensor that detects a change in temperature of a hot airflow due to a fire by a temperature detecting element.

Figure 1:
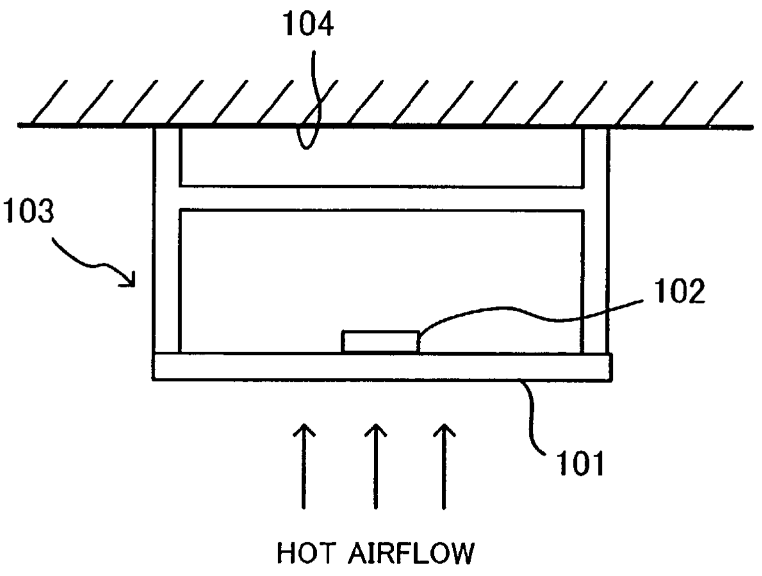
FIG. 1 is a sectional side view of a fire sensor constructed in accordance with a first embodiment of the present invention.

Referring to FIG. 1, there is depicted a fire sensor constructed in accordance with a first embodiment of the present invention. The fire sensor includes a baseplate 101, a temperature detecting element 102, and a sensor main body 103 which serves as a protective case. The outside of the baseplate 101 serves as a heat sensing surface. The temperature detecting element 102 is installed on the central portion of the inside of the baseplate 101 so that it does not contact the sensor main body 103. That is, the temperature detecting element 102 thermally contacts with the inside of the baseplate 101 to detect the temperature of the baseplate 101.

The sensor main body 103 contacts the radially end portion of the inside surface of the baseplate 101 and forms a closed space between itself and the baseplate 101. The temperature detecting element 102 is confined within the closed space.

The baseplate 101, temperature detecting element 102, and sensor main body 103 meet the following conditions. Initially, from the viewpoint of mechanical strength and heat responsiveness it is desirable that the thickness d of the baseplate 101 be 0.1 mm$\leqq$d$\leqq$0.8 mm.

It is also desirable that the material of the baseplate 101 be plastic or glass whose heat conductivity is small, and which has a certain magnitude of strength. Preferably, the material and shape of the baseplate 101 meet the following conditional Eq. 1:

$$d\cdot\lambda_{disk}\leqq 1.1\times 10^{-4}[W/K] \tag{1}$$

where d is the thickness [m] of the baseplate 101 and $\lambda_{disk}$ is the heat conductivity [W/(m·K)] of the baseplate 101.

Figure 2:
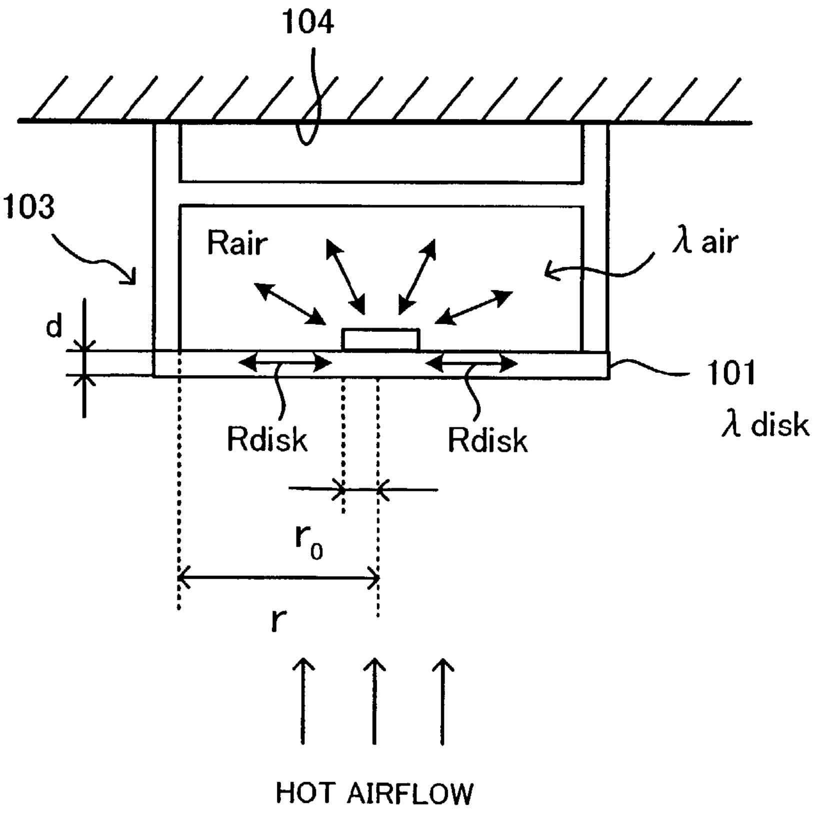
FIG. 2 is a sectional side view showing the relationship between the thickness and heat conductivity of the baseplate of the fire sensor of the first embodiment.

The symbols used in the conditional Eq. 1 are shown in FIG. 2. In the figure, $r_0$=radius or average radius of the temperature detecting element, r=radius or average radius of the baseplate 101, d=thickness of the baseplate 101, $\lambda_{disk}$=heat conductivity of the baseplate 101, $R_{disk}$=heat resistance through the baseplate 101 between the temperature detecting element and the main body, $R_{air}$=heat resistance through air between the temperature detecting element and the main body.

Using the symbols shown in FIG. 2, the function of each part will be described. FIG. 3A illustrates the thermal relationship between the constituent components of the fire sensor of the first embodiment. Thermal energy is supplied from a hot airflow to the temperature detecting element 102 through the baseplate 101, and escapes from the temperature detecting element 102 to the sensor main body 103 through the baseplate 101 and air.

The temperature rise $\Delta T_s$ of the temperature detecting element 102 is proportional to the difference between $Q_{in}$ and $Q_{loss}$ and given by $$\Delta Ts\alpha(Q\text{in}-Q\text{loss})$$

where $Q_{in}$ is the thermal energy supplied to the temperature detecting element 102 and $Q_{loss}$ is the total thermal energy which escapes from the temperature detecting element 102 to the sensor main body 103.

The thermal energy $Q_{in}$ supplied to the temperature detecting element 102 is determined by external conditions. Assuming $Q_{in}$ is the same, it is effective to make $Q_{loss}$ smaller to maximize the temperature rise $T_s$ of the temperature detecting element 102.

The thermal energy $Q_{disk}$ which escapes from the temperature detecting element 102 through the baseplate 101 is reciprocally proportional to heat resistance $R_{disk}$. The thermal energy $Q_{air}$ which escapes from the temperature detecting element 102 through air is reciprocally proportional to heat resistance $R_{air}$. Therefore, the relationship between them is given by the following Eqs. 2 and 3:

$$Q_{loss}=Q_{disk}+Q_{air} \tag{2}$$

$$Q_{disk}: Q_{air}=(1/R_{disk}):(1/R_{air}) \tag{3}$$

If the fire sensor is constructed so that $Q_{disk}\leqq Q_{air}$, the baseplate 101 and air can be considered the same with respect to the flow of thermal energy.

Since the baseplate 101 and air can be considered the same, and the total thermal energy that escapes from the baseplate 101 to the sensor main body 103 is small, the baseplate 101 is negligible as shown in FIG. 3B. Therefore, a quick response to heat and a great rise in temperature are obtained. In addition, since the heat sensing section (which consists of the baseplate 101 and the temperature sensing element 102) is flat in shape, it is easy to reduce the size and thickness of the fire sensor.

In the foregoing description, the heat resistance in a direction perpendicular to the surface of the baseplate 101 is left out of consideration, because the heat resistance is negligible if the thickness of the baseplate 101 is reduced sufficiently to 0.8 mm or less.

Now, the conditions for the baseplate 101 given by Eq. 1 will be described using the symbols of FIG. 2. The heat resistance $R_{disk}$ Of the baseplate 101 and the heat resistance $R_{air}$ of air become values which are approximated by the following Eqs. 4 and 5:

$$R_{disk}=\frac{1}{2\pi\cdot\lambda_{disk}\cdot d}\cdot\ln\left(\frac{r}{r_0}\right) \tag{4}$$

$$R_{air}=\frac{1}{2\pi\cdot\lambda_{air}}\cdot\left(\frac{1}{r_0}-\frac{1}{r}\right) \tag{5}$$

where $r_0$ is the radius of the temperature detecting element 102, r is the radius of the baseplate 101, $\lambda_{disk}$ is the heat conductivity of the baseplate 101, and $\lambda_{air}$ is the heat conductivity of air.

Figure 4:
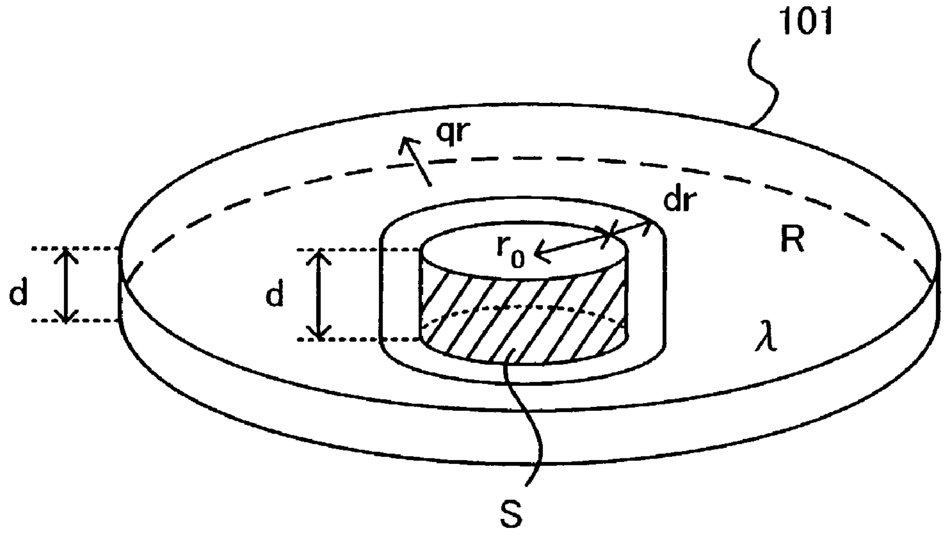
FIG. 4 is an explanatory diagram used for calculating of the heat resistance of the baseplate shown in FIG. 2.

The derivation of Eqs. 4 and 5 will be described in further detail. FIG. 4 is an explanatory diagram for calculating the heat resistance $R_{disk}$ Of the baseplate 101. In the figure, R (K/W) represents the heat resistance of the baseplate 101 of thickness d (mm) between the cylindrical surface of radius $r_0$ (mm) and the cylindrical surface of radius r (mm), and S represents the area of the cylindrical surface of radius r. When a radial heat flux $q_r$ (W/m$^2$) flows with a temperature difference dT (K) across a micro-radius dr, the heat resistance is dR (K/W). This relationship is expressed by the following Eq. 6:

$$dT=S\cdot q_r dR \tag{6}$$

From the definition of heat conductivity λ, the heat flux $q_r$ is expressed by the following Eq. 7:

$$q_r=\lambda\frac{dT}{dr} \tag{7}$$

Substituting Eq. 7 into Eq. 6, the heat resistance dR is expressed by Eq. 8:

$$dR=\frac{dr}{S\cdot\lambda} \tag{8}$$

Since the heat resistance R is a heat resistance from a cylindrical surface of radius $r_0$ to a cylindrical surface of radius r, Eq. 8 becomes $$R=\int_{r_0}^{r}\frac{dr}{S\cdot\lambda} \tag{9}$$

Since the area S of a cylindrical surface is S=2πrd, we obtain $$\begin{aligned}R&=\int_{r_0}^{r}\left(\frac{dr}{2\pi rd\lambda}\right)\\&=\frac{1}{2\pi d\lambda}\int_{r_0}^{r}\frac{1}{r}dr\end{aligned}$$

-continued $$= \frac{1}{2\pi d\lambda}[\ln r]_{r_0}^{r}$$

$$= \frac{1}{2\pi\lambda d}(\ln r - \ln r_0)$$

$$= \frac{1}{2\pi\lambda d}\ln\left(\frac{r}{r_0}\right)$$

From the foregoing description, the heat resistance R (K/W) of the baseplate 101 of thickness d (mm) between the cylindrical surface of radius $r_0$ (mm) and the cylindrical surface of radius r (mm) is expressed by Eq. 4.

Figure 5:
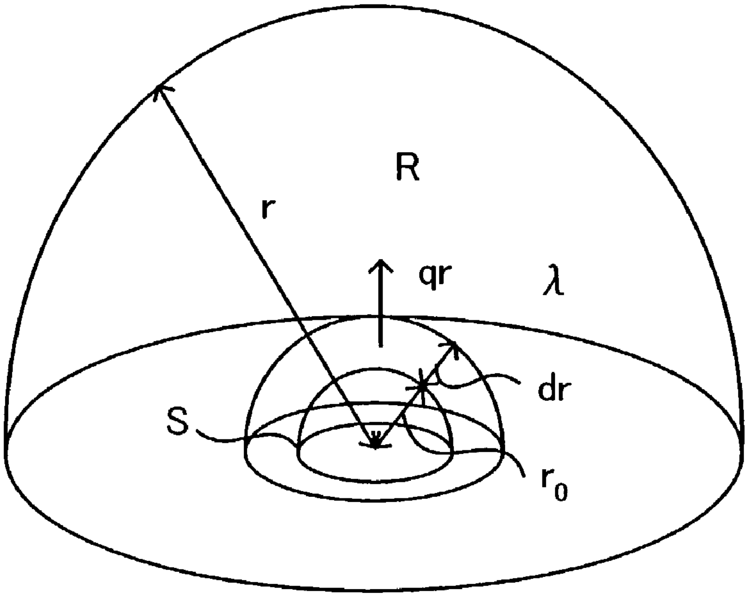
FIG. 5 is an explanatory diagram used for calculating of the heat resistance of air.

FIG. 5 is an explanatory diagram for calculating the heat resistance $R_{air}$ of air. In the figure, R (K/W) represents the heat resistance of air between a semi spherical surface of radius $r_0$ (mm) and a semi spherical surface of radius r (mm), λ represents the heat conductivity of a material with which the hemisphere is filled, and S represents the area of the semi spherical surface of radius r. When a radial heat flux $q_r$ ($W/m^2$) flows with a temperature difference dT (K) across a micro-radius dr, the heat resistance is dR (K/W). This relationship is expressed by the following Eq. 10:

$$dT = S \cdot q_r \cdot dR \tag{10}$$

From the definition of heat conductivity λ, the heat flux $q_r$ is expressed by the following Eq. 11:

$$q_r = \lambda \frac{dT}{dr} \tag{11}$$

Substituting Eq. 11 into Eq. 10, the heat resistance dR is expressed by Eq. 12:

$$dR = \frac{dr}{S \cdot \lambda} \tag{12}$$

Since the heat resistance R is a heat resistance from a semi spherical surface of radius $r_0$ to a semi spherical surface of radius r, Eq. 12 becomes $$R = \int_{r_0}^{r}\left(\frac{dr}{S \cdot \lambda}\right)$$

Since the area S of a semi spherical surface is $S=2\pi r^2$, we obtain $$R = \int_{r_0}^{r}\left(\frac{dr}{2\pi r^2\lambda}\right)$$

$$= \frac{1}{2\pi\lambda}\int_{r_0}^{r}\frac{1}{r^2}dr$$

$$= \frac{1}{2\pi\lambda}\left[\frac{-1}{1}\right]_{r_0}^{r}$$

$$= \frac{1}{2\pi\lambda}\left\{-\frac{1}{r} - \left(-\frac{1}{r_0}\right)\right\}$$

-continued $$= \frac{1}{2\pi\lambda}\left(\frac{1}{r_0} - \frac{1}{r}\right)$$

From the foregoing description, the heat resistance R (K/W) of air between a semi spherical surface of radius $r_0$ (mm) and a semi spherical surface of radius r (mm) is expressed by Eq. 5.

Using $r_0$=2 mm, r=15 mm, and $\lambda_{air}$=0.024 W/mK as actual dimensions for the heat sensing portion of the fire sensor, Eq. 4 and Eq. 5 become Eq. 13 and Eq. 14:

$$R_{disk} = \frac{0.32}{\lambda_{disk} \cdot d}[\text{K/W}] \tag{13}$$

$$R_{air} = 2.9E+03\ [\text{K/W}] \tag{14}$$

Note that since the temperature detecting element 102 is confined within the sensor main body 103, air has been handled as a solid on the assumption that there is no convection. However, in consideration of a natural convection, etc., an analysis may be made using the heat conductivity of air.

On the other hand, to make $Q_{loss}$ smaller, it is desirable that the thermal energy $Q_{disk}$ (which escapes through the baseplate 101) be made less than or equal to the thermal energy $Q_{air}$ (which escapes through air)($Q_{disk} \leqq Q_{air}$). Using this condition and Eq. 3, we obtain $$R_{disk} \leqq R_{air} \tag{15}$$

Substituting Eq. 13 and Eq. 14 into Eq. 15, we obtain $$d \cdot \lambda_{disk} \leqq 1.1 \times 10^{-4} (W/K) \tag{16}$$

For instance, in the case where the thickness of the baseplate 101 is d=0.1 mm, $$\lambda_{disk} \leqq 1.1 \text{ (W/m·K)}$$

is determined from Eq. 16 as the condition of the heat conductivity of the baseplate 101.

It is found that polycarbonate resin for the material of the outer cover of a fire sensor ($\lambda_{disk} \approx 0.23$ W/m·K), epoxy resin for circuit-printed boards ($\lambda_{disk} \approx 0.30$ W/m·K), and borosilicate glass ($\lambda_{disk} \approx 1.1$ W/m·K) meet the condition of the heat conductivity.

For example, consider the case in which the thickness d of the baseplate 101 is greater than the desirable range (0.1 mm≦d≦0.8 mm). By substituting d=1.0 mm into Eq. 16, $$\lambda_{disk} \leqq 0.11 \text{ (W/m·K)}$$

is obtained as the condition of the heat conductivity. Therefore, in the case where the baseplate 101 is thick, it is difficult to obtain materials which have a mechanical strength of some magnitude or greater and meet $\lambda_{disk} \leqq 0.11$ (W/m·K).

On the other hand, in the case where the baseplate 101 is thinner than the desirable range (0.1 mm≦d≦0.8 mm), the condition of the heat conductivity becomes $$\lambda_{disk} \leqq 2.2 \text{ (W/m·K)}$$

Almost all plastics and glasses satisfy the condition of the heat conductivity. However, in the case where the thickness of the baseplate 101 is less than 0.1 mm, it is difficult to obtain sufficient mechanical strength.

A description will be given of the use of materials whose heat conductivity is higher than plastics and glasses. In the case of using aluminum (metal) as the material of the baseplate 101, $\lambda_{disk} \approx 237$ (W/m·K) is inserted into Eq. 16 and therefore the conditional equation becomes $$d \leqq 4.6 \times 10^{-3} \text{ (mm)}$$

In this case, the baseplate 101 has to be extremely thinned and therefore it is difficult to obtain sufficient mechanical strength. In the case of using aluminum (ceramic) as the material of the baseplate 101, $\lambda_{disk} \approx 36$ (W/m·K) is inserted into Eq. 16 and therefore the conditional equation becomes $$d \leqq 3.1 \times 10^{-2} \text{ (mm)}$$

Similarly, the baseplate 101 must be extremely thinned and therefore it is difficult to obtain sufficient mechanical strength.

Figures 6, 7:
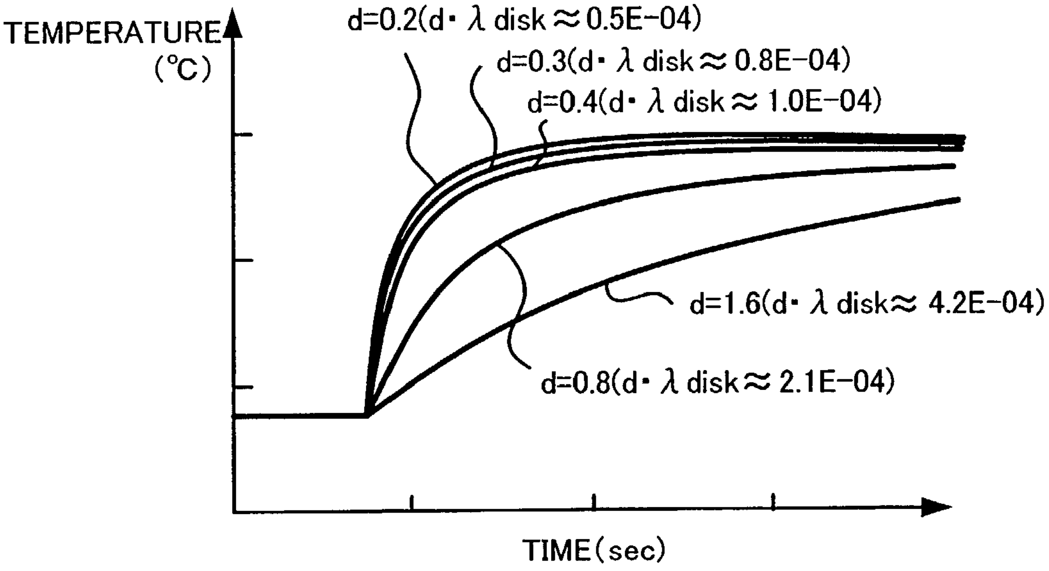
FIG. 6 is a characteristic diagram showing how the temperature of the temperature detecting element of the fire sensor rises when the thickness of the baseplate is changed.
FIG. 7 is a graph used to explain the conditional equations when the radius of the heat sensing portion and the radius of the baseplate are changed.

FIG. 6 shows how the temperature of the temperature detecting element 102 rises in the case where a plastic material of $\lambda_{disk} \approx 0.26$ (W/m·K) is used with thickness d=0.2, 0.3, 0.4, 0.8, and 1.6 mm. When the product of thickness d and heat conductivity $\lambda_{disk}$ meets $$d \cdot \lambda_{disk} \leqq 1.1 \times 10^{-4} \text{ (W/K)}$$

the temperature rise becomes high.

As set forth above, in fire sensors of ordinary sizes, when the thickness d and heat conductivity $\lambda_{disk}$ of the baseplate 101 satisfy $$d \cdot \lambda_{disk} \leqq 1.1 \times 10^{-4} \text{ (W/K)}$$

sufficient mechanical strength and optimum response are obtained.

FIG. 7 lists the values of the coefficient $\alpha$ in the conditional equation $d \cdot \lambda_{disk} \approx \alpha \times 10^{-4}$ (W/K) , which satisfies Eq. 15 employing heat resistances $R_{disk}$ and $R_{air}$, obtained from Eqs. 13 and 14 when the radius $r_0$ of the heat sensing portion and the radius r of the baseplate 101 are varied.

As previously mentioned, it is desirable from a practical viewpoint that the coefficient $\alpha$ be 1.1 with $r_0$=2.0 mm and r=15 mm. When $r_0$ and r are values other than 2.0 mm and 15 mm, shapes and materials may be determined so that the product of the thickness d and heat conductivity $\lambda_{disk}$ of the baseplate 101 meets conditions corresponding to respective values.

Figure 8:
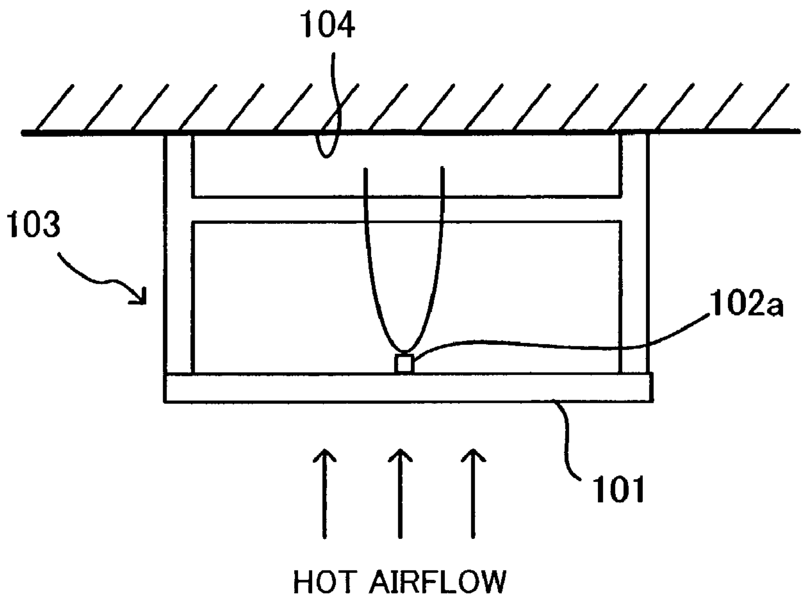
FIG. 8 is a sectional side view of a fire sensor constructed in accordance with a second embodiment of the present invention.

Referring to FIG. 8, there is depicted a fire sensor constructed in accordance with a second embodiment of the present invention. The second embodiment is characterized in that it employs a thermocouple as a temperature detecting element. The fire sensor of the second embodiment includes a baseplate 101 whose material and shape satisfy the condition of Eq. 1, a thermocouple 102*a* disposed as a temperature detecting element on the inside of the baseplate 101, and a sensor main body 103 provided as a protective case so as to surround the thermocouple 102*a*. The sensor main body 103 is installed on a mounting surface 104 such as a ceiling surface. The thermocouple 102*a* of the second embodiment is not a flat heat sensing portion such as the temperature detecting element 102 of the first embodiment FIG. 1. However, if the practical radius r is, for example, $r_0$=about 2 mm, the thermocouple 102*a* can be constructed as a flat heat sensing portion.

Figure 9:
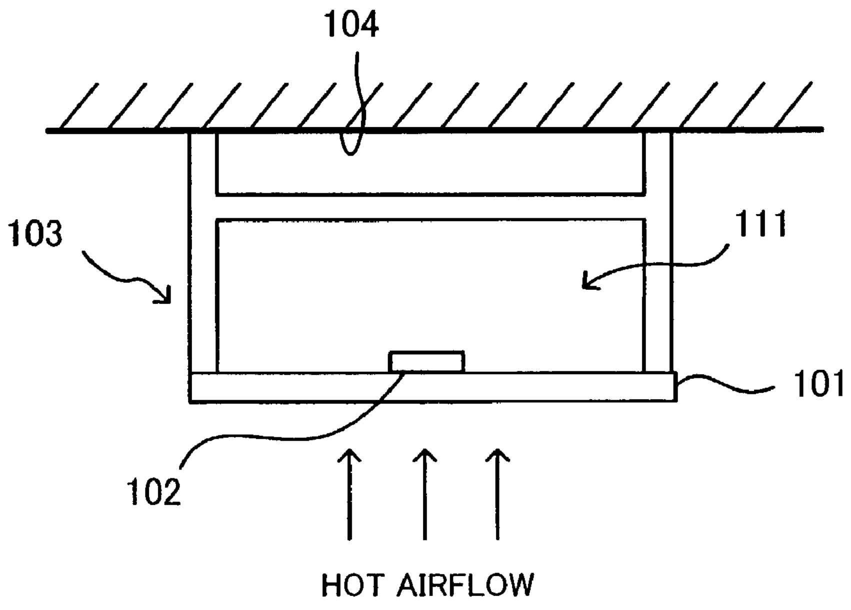
FIG. 9 is a sectional side view of a fire sensor constructed in accordance with a third embodiment of the present invention.

Referring to FIG. 9, there is depicted a fire sensor constructed in accordance with a third embodiment of the present invention. The third embodiment is characterized in that a filler is provided in the space between a baseplate and a heat sensing portion. Unlike the first embodiment of FIG. 1, a filler 111 is provided in the space of the interior of a sensor main body 103 disposed so as to surround a temperature detecting element 102 mounted on the interior surface of a base plate 101. The filler 111 may consist of a plastic foam or heat insulating material whose heat conductivity is sufficiently small.

Figure 10:
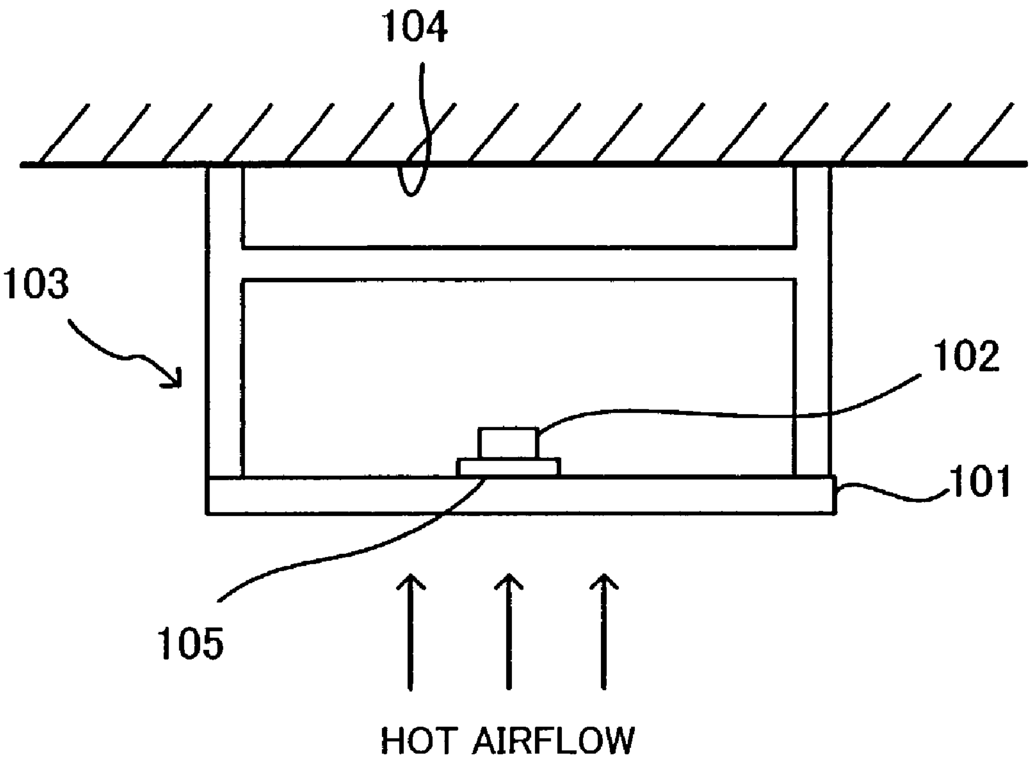
FIG. 10 is a sectional side view of a fire sensor constructed in accordance with a fourth embodiment of the present invention.

Referring to FIG. 10, there is depicted a fire sensor constructed in accordance with a fourth embodiment of the present invention. In the fourth embodiment, metal foil 105 is sandwiched between a baseplate 101 and a temperature detecting element 102. If the metal foil 105 is sandwiched between the baseplate 101 and the temperature detecting element 102, the thermal energy of a hot airflow transferred to the baseplate 101 is stored in the metal foil 105 and therefore a rise in temperature of the temperature detecting element 102 is facilitated.

Figure 11:
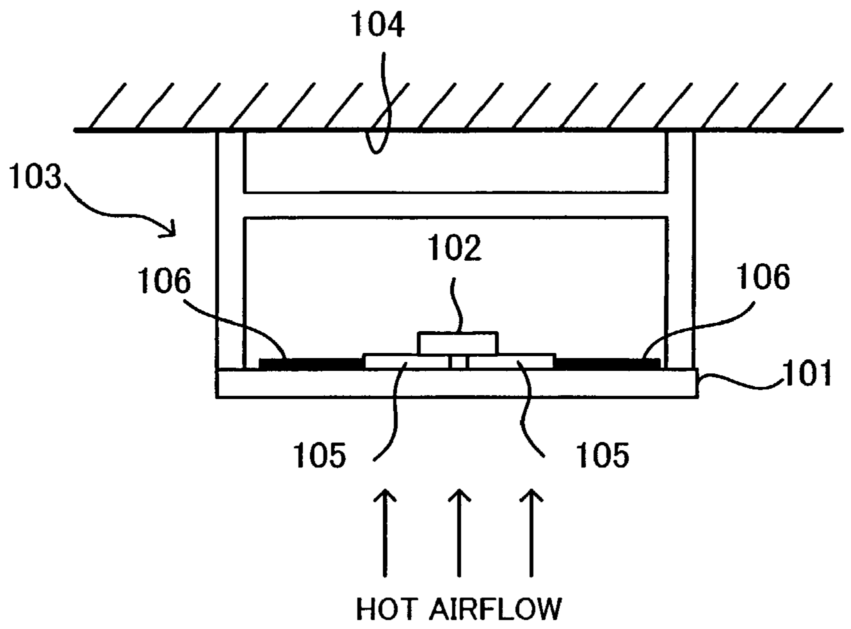
FIG. 11A is a sectional side view of a fire sensor constructed in accordance with a fifth embodiment of the present invention.
FIG. 11B is a plan view of the baseplate of the fire sensor shown in FIG. 11A.
Figure 11:
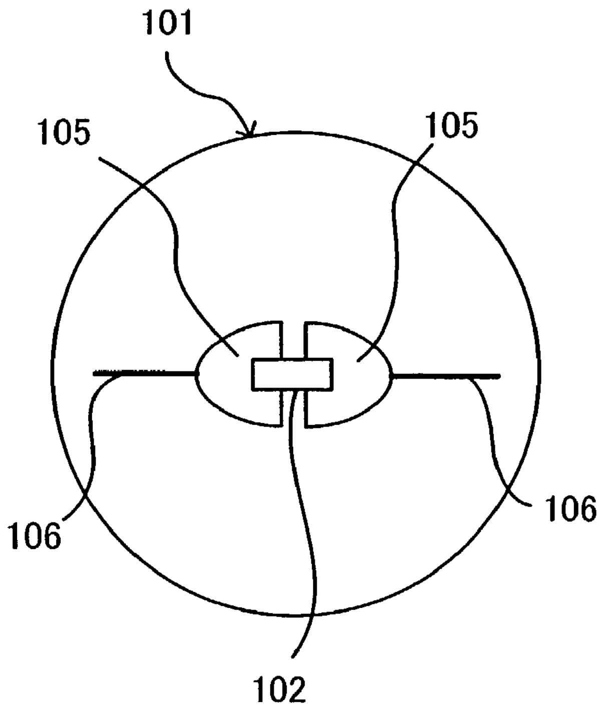

Referring to FIG. 11, there is depicted a fire sensor constructed in accordance with a fifth embodiment of the present invention. The fire sensor of the fifth embodiment is characterized in that metal foil is disposed as electrodes for a temperature detecting element. In the fire sensor, when disposing the temperature detecting element 102 on approximately the central portion of the inside surface of a baseplate 101, two pieces of metal foil 105, for example, are disposed on both sides of the temperature detecting element 102 as the electrodes and are sandwiched between the temperature detecting element 102 and the baseplate 101. A wire 106 is pulled out from each metal foil 105. As with the fourth embodiment of FIG. 10, the metal foil 105 stores the thermal energy of a hot airflow transferred to the baseplate 101 and therefore facilitates a rise in temperature of the temperature detecting element 102.

Figure 12:
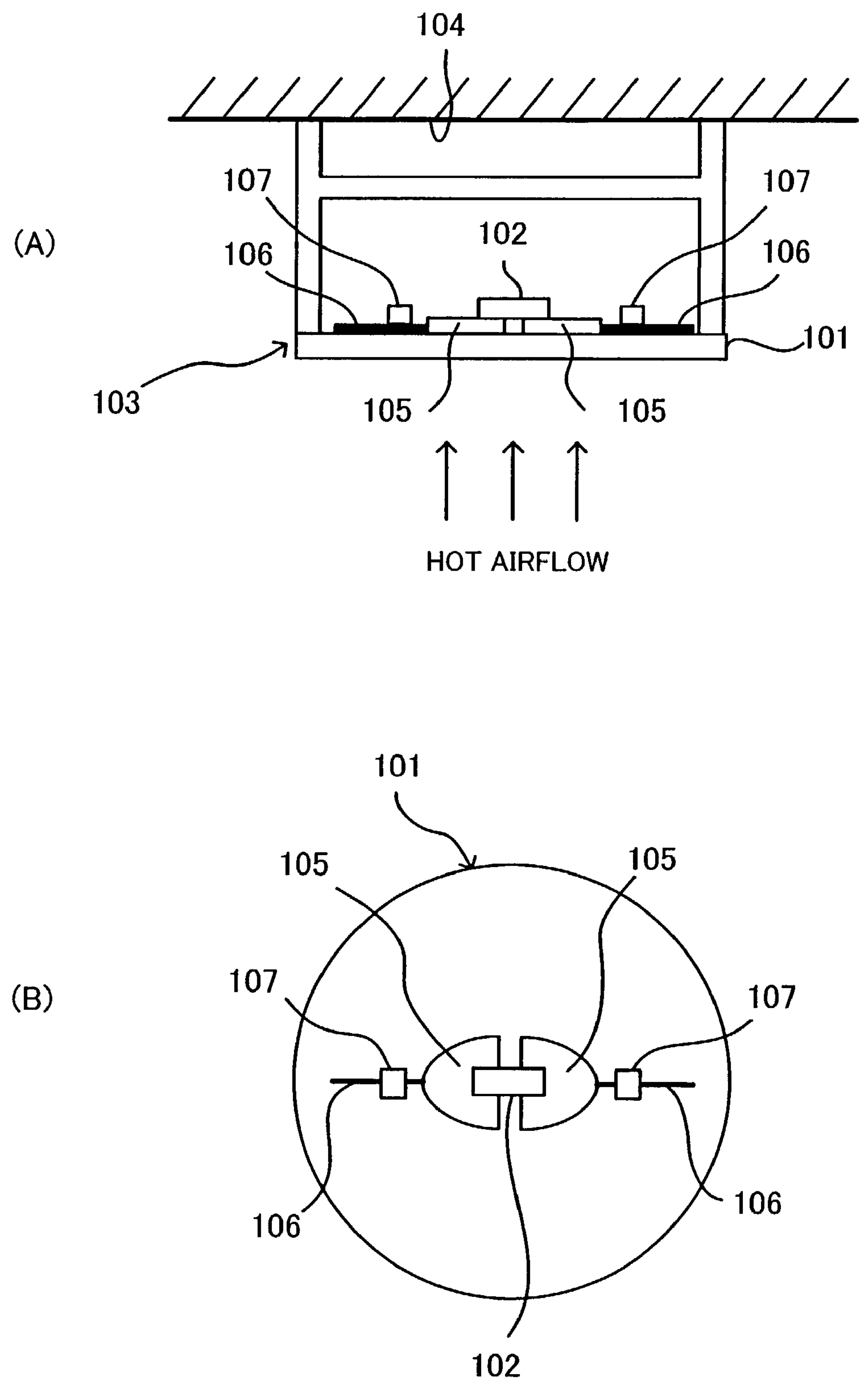
FIG. 12A is a sectional side view of a fire sensor constructed in accordance with a sixth embodiment of the present invention.
FIG. 12B is a plan view of the baseplate of the fire sensor shown in FIG. 12A.

Referring to FIG. 12, there is depicted a fire sensor constructed in accordance with a sixth embodiment of the present invention. The fire sensor of the sixth embodiment is characterized in that in addition to the fifth embodiment of FIG. 5, electric components other than a temperature detecting element are further disposed on the inside surface of a baseplate. In the fire sensor, the temperature detecting element 102 is disposed on the center of the inside surface of the baseplate 101 through two pieces of metal foil 105 serving as electrodes. Two wires 106 extend from the two pieces of metal foil 105, respectively. On the wires 106, there are provided electric components 107 as occasion demands. If the electric components 107 are mounted on the inside surface of the baseplate 101 in this manner, mounting efficiency can be enhanced when a mounting board for circuitry is added.

Figure 13:
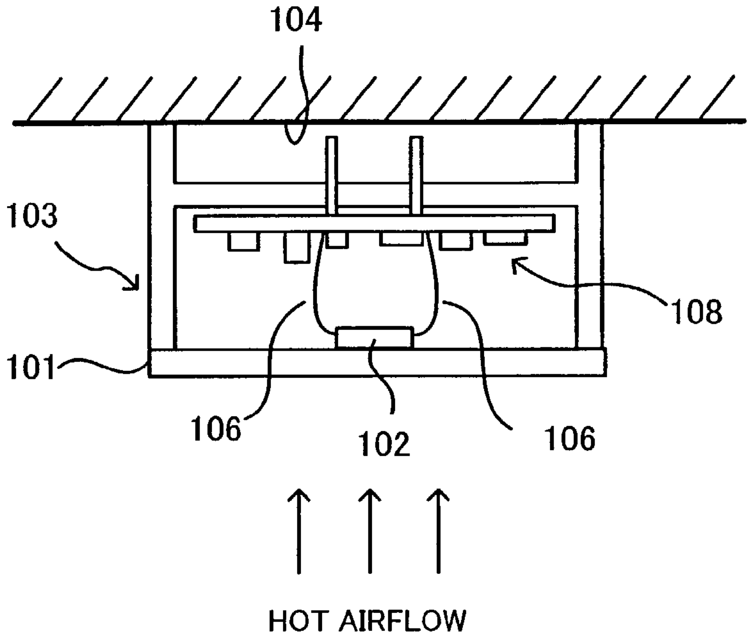
FIG. 13 is a sectional side view of a fire sensor constructed in accordance with a seventh embodiment of the present invention.

Referring to FIG. 13, there is depicted a fire sensor constructed in accordance with a seventh embodiment of the present invention. The fire sensor of the seventh embodiment is characterized in that circuitry is disposed between a baseplate and a sensor main body. In the fire sensor, the sensor main body 103 is provided to surround a temperature detecting element 102 provided on approximately the center of the inside surface of the base plate 101. The circuitry 108 is provided in the interior space between the sensor main body 103 and the baseplate 101 and is connected to the temperature detecting element 102 through wires 106. If the circuitry 108 is provided in the hermetically sealed space between the baseplate 101 and the sensor main body 103, the circuitry 108 can be isolated from air, as with the temperature detecting element 102. Since the circuitry 108 is not exposed to humidity and corrosive gases, its durability can be enhanced.

Figure 14:
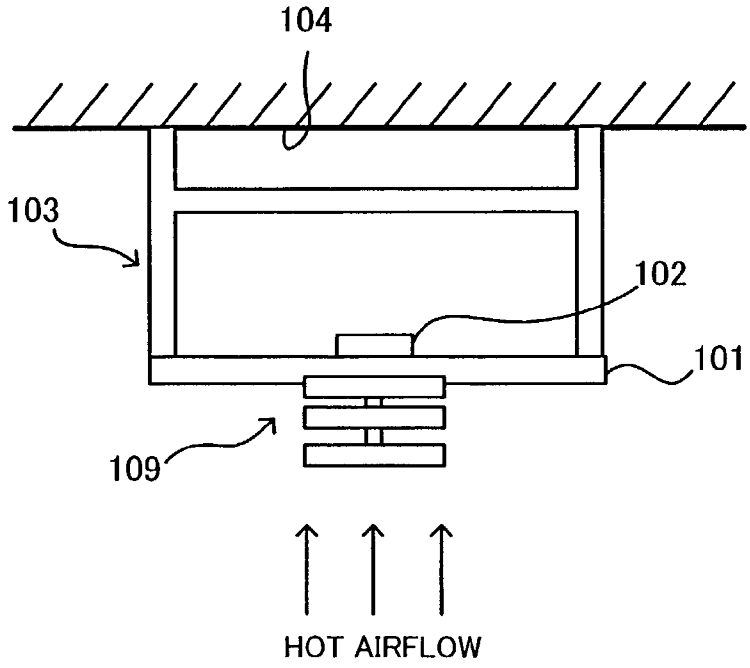
FIG. 14 is a sectional side view of a fire sensor constructed in accordance with an eighth embodiment of the present invention.

Referring to FIG. 14, there is depicted a fire sensor constructed in accordance with an eighth embodiment of the present invention. In the fire sensor of the eighth embodiment, a heat collecting structure 109 such as a heat collecting metal plate is provided on the central portion of the outside surface of a baseplate 101 which has a temperature detecting element 102 on the central portion of the inside surface thereof. If the heat collecting structure 109 is thus disposed on approximately the central portion of the outside surface of the baseplate 101 so that it faces the temperature detecting element 102 through the baseplate 101, a rise in temperature of the temperature detecting element 102 due to a hot airflow generated by a fire can be further accelerated by the heat collecting structure 109.

Figure 15:
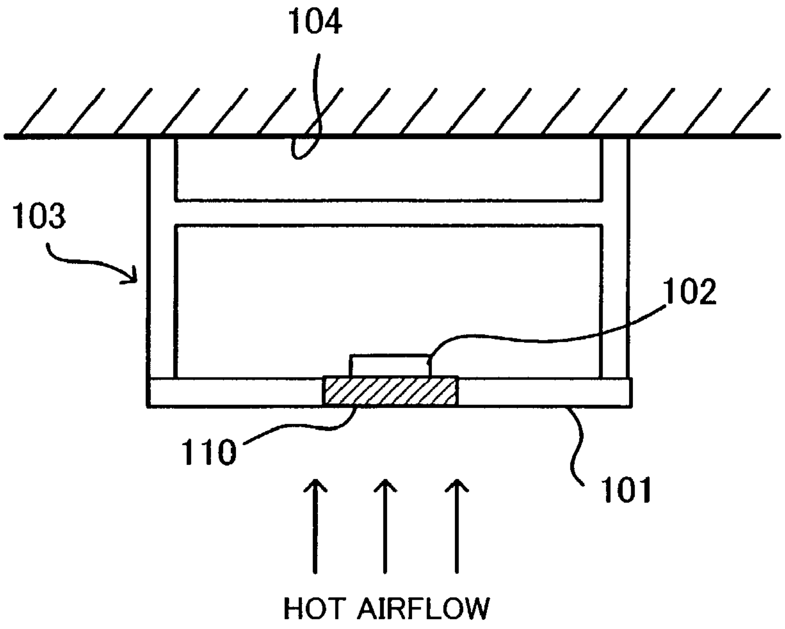
FIG. 15 is a sectional side view of a fire sensor constructed in accordance with a ninth embodiment of the present invention.

Referring to FIG. 15, there is depicted a fire sensor constructed in accordance with a ninth embodiment of the present invention. The fire sensor of the ninth embodiment includes a metal member 110 whose heat conductivity is high, such as aluminum. The metal member 110 is buried in the central portion of a baseplate 101 and contacted by a temperature detecting element 102. The temperature detecting element 102 is surrounded by a sensor main body 103 serving as a protective case. If the metal member 110 provided in the central portion of the baseplate 101 is exposed to a hot airflow generated by a fire, the thermal energy is transferred to the temperature detecting element 102 through the metal member 110. Therefore, a rise in temperature of the temperature detecting element 102 can be quickened without being retarded by the baseplate 101.

Figure 16:
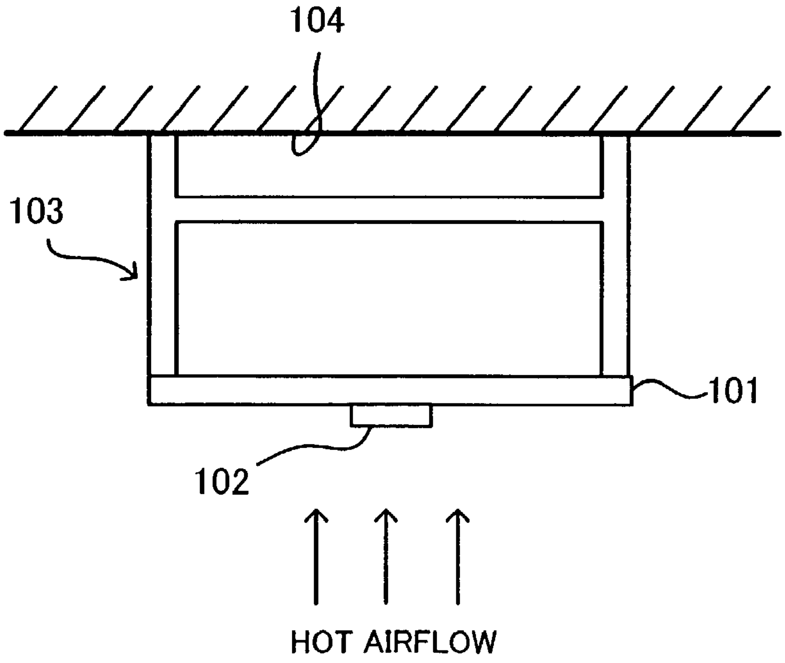
FIG. 16 is a sectional side view of a fire sensor constructed in accordance with a tenth embodiment of the present invention.

Referring to FIG. 16, there is depicted a fire sensor constructed in accordance with a tenth embodiment of the present invention. In the fire sensor of the tenth embodiment, a temperature detecting element 102 is disposed on approximately the central portion of the exterior surface of a baseplate 101. Since the temperature detecting element 102 is exposed directly to a hot airflow generated by a fire, a rise in temperature can be quickened. The temperature detecting element 102 is coated with resin so that it is not exposed to humidity and corrosive gases. Wiring of the temperature detecting element 102 is passed through the baseplate 101 and is performed within a sensor main body 103.

As set forth in the embodiments shown in FIGS. 1 through 16, the present invention has the following advantages:

According to the fire sensor of the present invention, the exterior surface of the baseplate is exposed to a hot airflow, and the temperature detecting element is disposed on the interior surface of the baseplate. The protective case contacts the radially outer portion of the baseplate to form a closed space, in which the temperature detecting element is confined. Since the heat sensing portion, which is constructed of the baseplate and the temperature detecting element, is flat in shape, a reduction in thickness and size of the fire sensor can be easily achieved.

With the temperature detecting element disposed on approximately the center of the interior surface of the baseplate, the shape and material of the baseplate are determined so that the product of the thickness and heat conductivity of the baseplate is $1.1\times10^{-4}$ (W/K) or less. Under this condition, the baseplate can be considered practically the same as air with respect to the flow of thermal energy. Therefore, since heat response is obtained with the temperature detecting element being floated in air, a quick heat response and a great rise in temperature can be obtained when exposed to a hot airflow generated by a fire.

(B) Embodiments of a Fire Heat Sensor

Next, a description will be given of embodiments of the present invention applied to a fire heat sensor that performs differential heat sensing in which a fire is detected by judging the rate of a rise in temperature by a plurality of temperature detecting elements and a heat conduction structure thereof.

Referring to FIG. 17A, there is depicted a fire heat sensor constructed in accordance with an eleventh embodiment of the present invention. In the figure, the fire heat sensor 210 of the eleventh embodiment includes a fixing member 212, which serves as a baseplate. The fixing member 212 is supported by an outer cover 214 and installed on a mounting surface 211 such as a ceiling. In FIG. 17A, the fire heat sensor 210 is turned upside down.

The fixing member 212 is a thin plate made of a material whose thermal diffusivity is small. For example, the fixing member 212 consists of a material whose thermal diffusivity is less than $10^{-6}$ ($m^2$/s). More specifically, the fixing member 212 is formed from synthetic resin (such as polyimide, glass epoxy, etc.) or glass.

The fixing member 212, which is exposed to a hot airflow generated by a fire, includes a low-temperature detecting portion 216, and first and second high-temperature detecting portions 218-1 and 218-2 disposed on both sides of the low-temperature detecting portion 216. The high-temperature detecting portions 218-1, 218-2 and low-temperature detecting portion 216 have heat collectors 220-1, 220-2, and 220-3 and temperature detecting elements 222-1, 222-2, and 222-3, respectively.

The heat collectors 220-1, 220-2, and 220-3 consist of a material whose thermal diffusivity is $10^{-6}$ to $10^{-3}$ ($m^2$/s). The heat capacity is on the order of $10^{-5}$ or less (J/K). More specifically, the heat collectors 220-1, 220-2, and 220-3 may be formed from metal such as copper, aluminum, etc.

It is desirable that the temperature detecting elements 220-1 to 220-3 consist of a transistor. In addition to this, the temperature detecting elements 220-1 to 220-3 may consist of a thermocouple, a thermistor, a diode, etc.

The heat collector 220-3 of the low-temperature detecting portion 216 is contacted with a heat accumulator 223 for slowly raising the temperature of the heat collector 220-3 when exposed to a hot airflow generated by a fire. The heat accumulator 223 consists of a material whose thermal diffusivity is $10^{-6}$ to $10^{-3}$ ($m^2$/s). The heat capacity is on the order of $10^{-1}$ (J/K). More specifically, the heat accumulator 223, as with the heat collectors 220-1 to 220-3, may be formed from metal such as copper, aluminum, etc.

Thus, the heat collectors 220-1 and 220-2 of the high-temperature detecting portions 218-1 and 218-2 have no heat accumulator, unlike the low-temperature detecting portion 216. Because of this, the temperature of heat collectors 220-1, 220-2 can rise quickly when exposed to a hot airflow generated by a fire.

As shown in FIG. 17B, the first and second high-temperature detecting portions 218-1 and 218-2 are disposed at symmetrical positions with respect to the low-temperature detecting portion 216. That is, the first high-temperature detecting portion 218-1, low-temperature detecting portion 216, and second high-temperature detecting portion 218-2 have an arrangement condition for axial symmetry where the three portions are arranged on a straight line at equal distances from the intermediate portion. In other words, the heat collector 220-3 of the low-temperature detecting portion 216 is at the center of a circle, and the heat collectors 220-1 and 220-2 of the high-temperature detecting portions 218-1 and 218-2 are on the circle and on a center line passing through the center of the circle.

Figure 17:
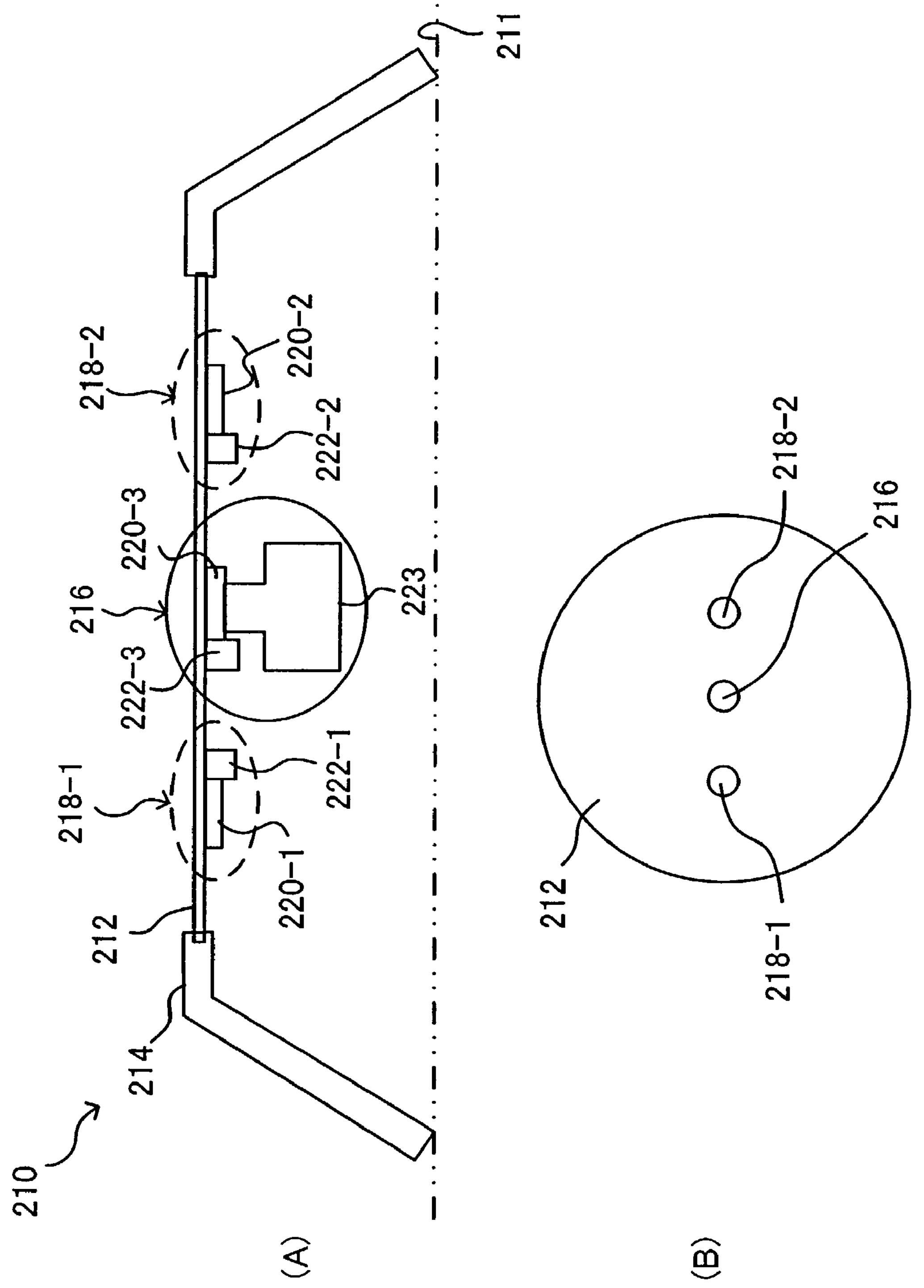
FIG. 17A is a sectional side view of a fire heat sensor constructed in accordance with an eleventh embodiment of the present invention.
FIG. 17B is a plan view of the fixing member of the fire heat sensor shown in FIG. 17A.

If the two high-temperature detecting portions 218-1, 218-2 are arranged at positions of axial symmetry with respect to the low-temperature detecting portion 216, as in the eleventh embodiment of FIG. 17, differential heat sensing can be performed without being influenced by the direction of a hot airflow generated by a fire.

Figure 18:
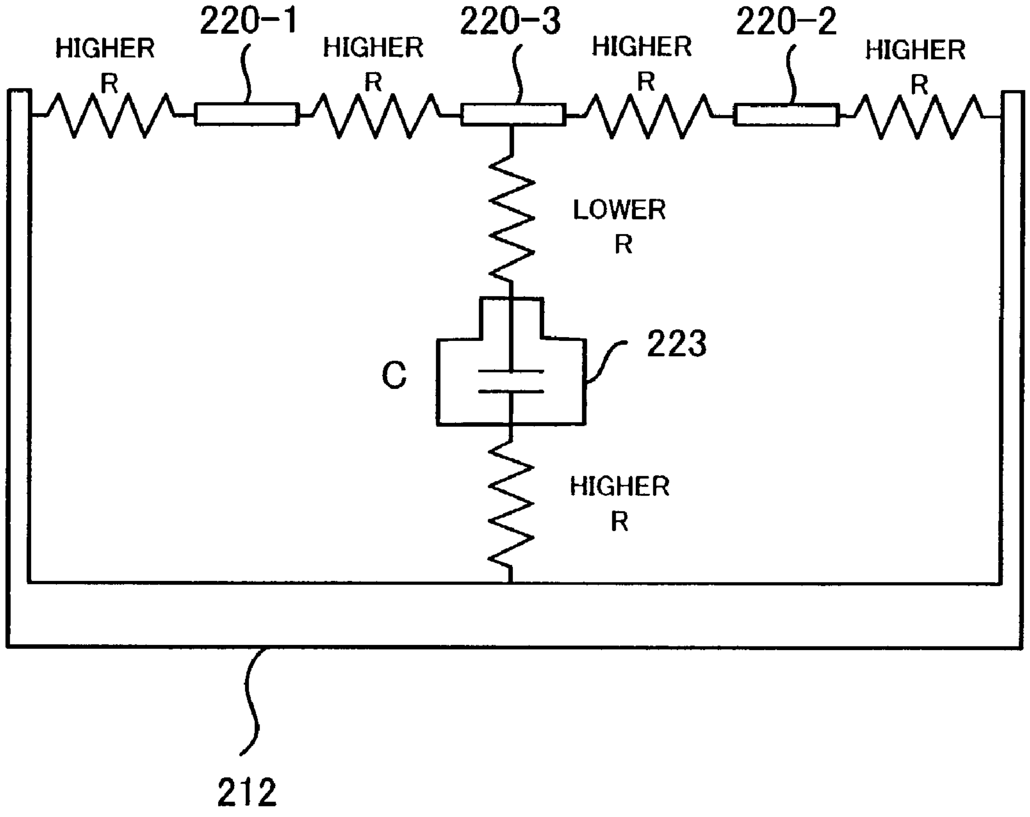
FIG. 18 is a diagram showing an electrical circuit equivalent to a heat conduction path for the fire heat sensor shown in FIG. 17.

Referring to FIG. 18, a heat conduction path in the fire heat sensor 210 of the eleventh embodiment shown in FIG. 17 is represented by an electrical equivalent circuit. The heat collectors 220-1 to 220-3, the heat accumulator 223, and the fixing member 212 are connected with one another through thermal resistors R. The heat collector 223 can be considered a thermal capacitor C. The thermal resistor lower R (lower heat resistance) between the heat accumulator 223 and the heat collector 220-3 is small and the remaining thermal resistors higher R (higher heat resistance) are large. With this construction, the first heat collector 220-1 and the second heat collector 220-2 are arranged so that they are thermally isolated when exposed to a hot airflow generated by a fire.

Figure 19:
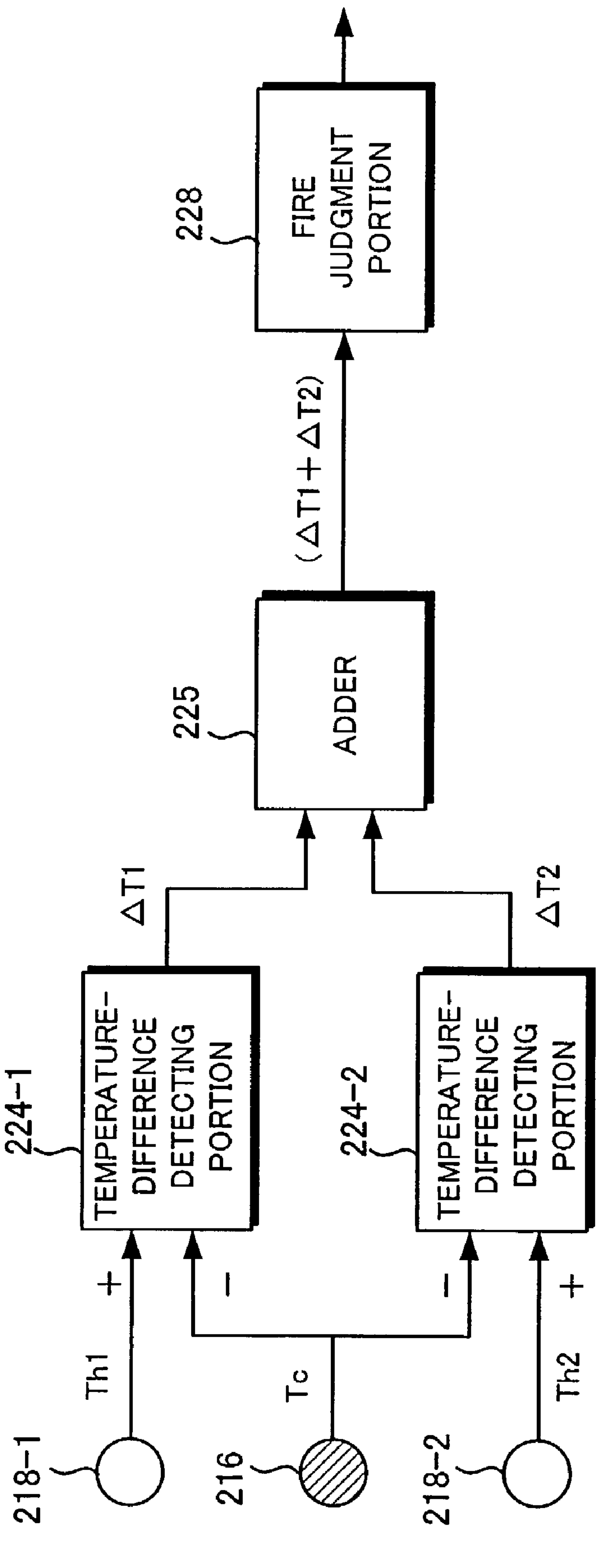
FIG. 19 is a block diagram of a heat sensing circuit for the fire heat sensor of the eleventh embodiment shown in FIG. 17A.

FIG. 19 shows the heat sensing circuit of the fire heat sensor 210 of FIG. 17 which performs differential heat sensing. In FIG. 19, the low-temperature detecting portion 216 generates an output which corresponds to temperature Tc detected by the temperature detecting element 222-3 of FIG. 17. The first high-temperature detecting portion 218-1 generates an output which corresponds to temperature Th1 detected by the temperature detecting element 222-1 of FIG. 17. Similarly, the second high-temperature detecting portion 218-2 generates an output which corresponds to temperature Th2 by the temperature detecting element 222-2 of FIG. 17. Note that in the following description, circuitry will be described by temperature instead of signals.

A first temperature-difference detecting portion 224-1 outputs a first temperature difference $\Delta T1$ by subtracting the temperature Tc detected by the low-temperature detecting portion 216 from the temperature Th1 detected by the first high-temperature detecting portion 218-1. Likewise, a second temperature-difference detecting portion 224-2 outputs a second temperature difference $\Delta T2$ by subtracting the temperature Tc detected by the low-temperature detecting portion 216 from the temperature Th2 detected by the second high-temperature detecting portion 218-2.

An adder 225 adds the first temperature difference $\Delta T1$ and second temperature difference $\Delta T2$ output by the first and second temperature-difference detecting portions 224-1 and 224-2, and then outputs $(\Delta T1+\Delta T2)$ to a fire judging portion 228 as a temperature difference signal for differential heat sensing. The fire judging portion 228 has a predetermined threshold value for judging a fire. If the output $(\Delta T1+\Delta T2)$ from the adder 225 exceeds this threshold value, the fire judging portion 228 judges that a fire has occurred, and outputs a fire signal.

Figure 20:
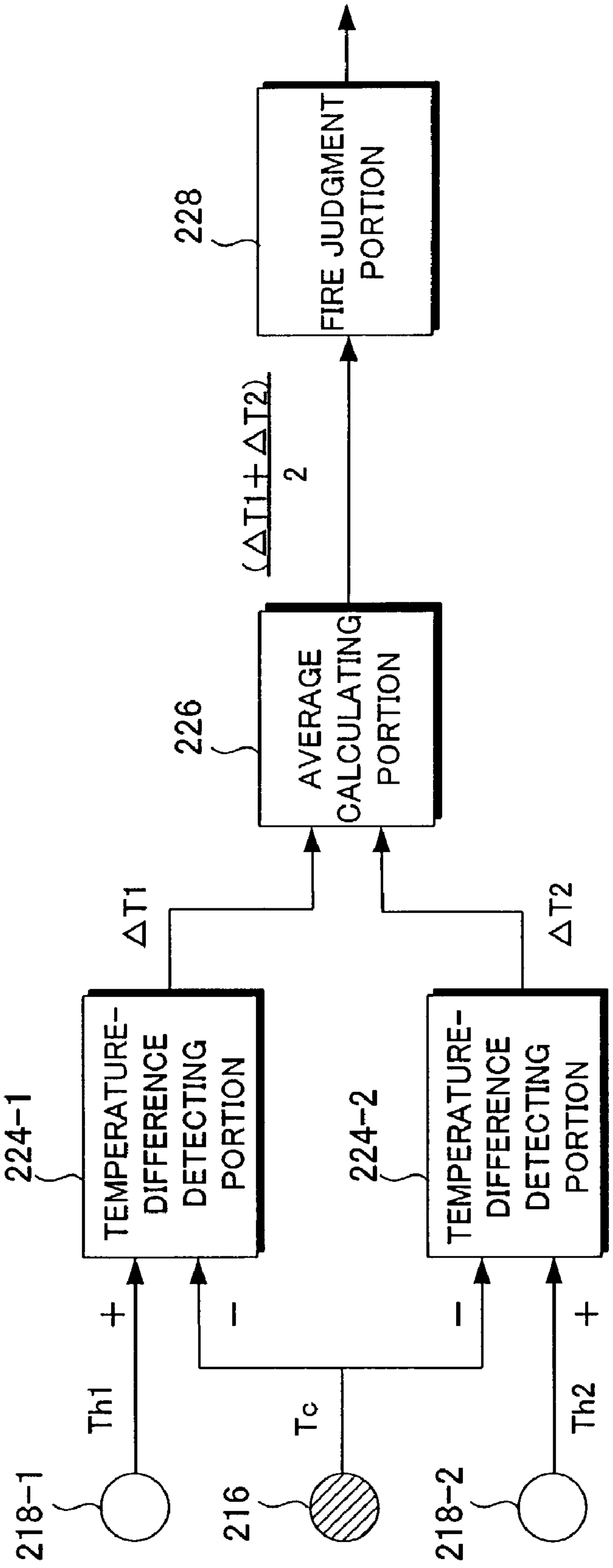
FIG. 20 is a block diagram of a heat sensing circuit for a fire heat sensor constructed in accordance with a twelfth embodiment of the present invention.

Referring to FIG. 20, there is depicted a fire heat sensor constructed in accordance with a twelfth embodiment of the present invention. While the eleventh embodiment of FIG. 19 adds two temperature differences $\Delta T1$ and $\Delta T2$, the twelfth embodiment is characterized in that it calculates an average value of the two temperature differences.

That is, first and second temperature-difference detecting portions 224-1 and 224-2 are identical with those of the eleventh embodiment of FIG. 19. Two temperature differences $\Delta T1$ and $\Delta T2$ from the first and second temperature-difference detecting portions 224-1 and 224-2 are input to an average calculating portion 226. The average calculating portion 226 calculates an average value $\{(\Delta T1+\Delta T2)/2\}$ of the two temperature differences $\Delta T1$ and $\Delta T2$ and inputs the average value to a fire judging portion 228. If the average value $\{(\Delta T1+\Delta T2)/2\}$ from the average calculating portion 226 exceeds a predetermined threshold value, the fire judging portion 228 judges that a fire has occurred, and outputs a fire signal.

Thus, by adding or averaging the two temperature differences $\Delta T1$ and $\Delta T2$ obtained by one low- temperature detecting portion 216 and two high-temperature detecting portions 218-1 and 218-2 shown in FIGS. 19 and 20, the fire heat sensor of the present invention is capable of performing differential heat sensing without depending on the direction of a hot airflow generated by a fire. The reason for this will be described as follows.

FIG. 21A shows a plan view of the low-temperature detecting portion 216 and two high-temperature detecting portions 218-1 and 218-2 provided on the fixing member 212 of the fire heat sensor 210 of the eleventh embodiment of FIG. 17. With respect to the direction in which the first high-temperature detecting portion 218-1, the low-temperature detecting portion 216, and the second high-temperature detecting portion 218-2 are arranged, a hot airflow is applied in a first direction 227 indicated by an arrow. The results of measurement ($\Delta T1$, $\Delta T2$, and ($\Delta T1$ and $\Delta T2$)) are shown in FIG. 21B.

When a hot airflow is applied in the first direction 227 shown in FIG. 21A, the rate of a rise in temperature of the first temperature difference $\Delta T1$ between the first high-temperature detecting portion 218-1 and the low-temperature detecting portion 216 (which are to the windward of the hot airflow) is faster and greater than that of the second temperature difference $\Delta T2$ between the second high-temperature detecting portion 218-2 and the low-temperature detecting portion 216 (which are to the leeward of the hot airflow). In FIG. 21B, the total of the two temperature differences $\Delta T1$ and $\Delta T2$ is shown by a broken line.

FIG. 22A shows a plan view of the low-temperature detecting portion 216 and two high-temperature detecting portions 218-1 and 218-2 arranged on the fixing member 212 of the fire heat sensor 210. With respect to the direction in which the first high-temperature detecting portion 218-1, the low-temperature detecting portion 216, the second high-temperature detecting portion 218-2 are arranged, a hot airflow is applied in a second direction 227 differing from the first direction 227 shown in FIG. 21A. The results of measurement ($\Delta T1$, $\Delta T2$, and ($\Delta T1$ and $\Delta T2$)) are shown in FIG. 22B. In this case, there is a greater difference between the first temperature difference $\Delta T1$ (between the first high-temperature detecting portion 218-1 and the low-temperature detecting portion 216 which are on the windward of the airflow direction 227) and the second temperature difference $\Delta T2$ (between the second high-temperature detecting portion 218-2 and the low-temperature detecting portion 216 which are on the leeward of the airflow direction 227).

Figure 21:
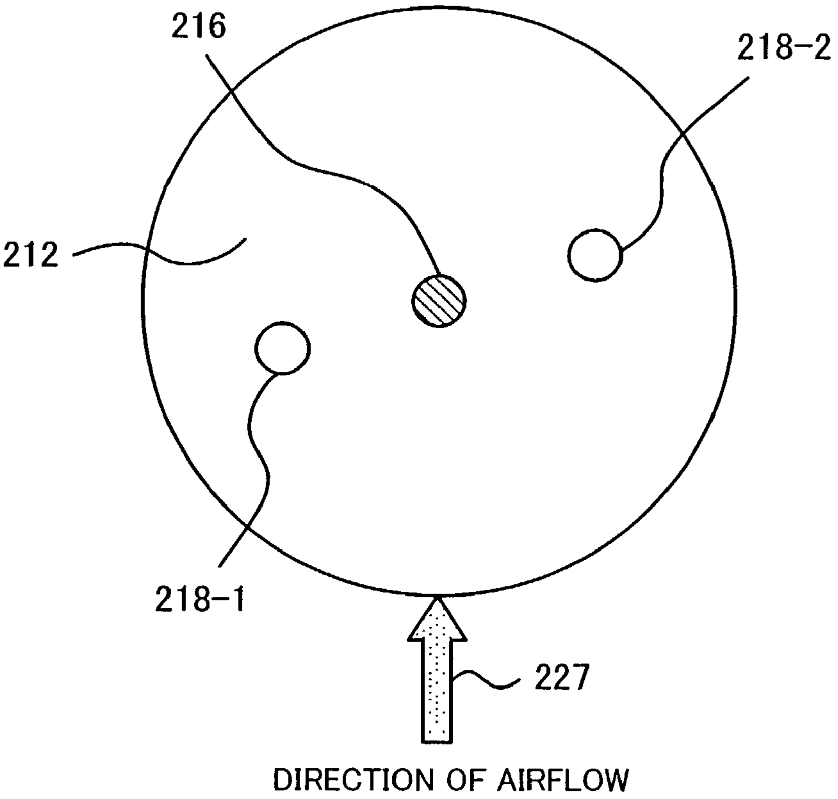
FIG. 21A shows a plan view of the low-temperature detecting portion and two high-temperature detecting portions provided on the fixing member of the fire heat sensor of the eleventh embodiment of FIG. 17.
FIG. 21B is a graph showing the results of measurement obtained when a hot airflow is applied in the direction shown in FIG. 21A.
Figure 21:
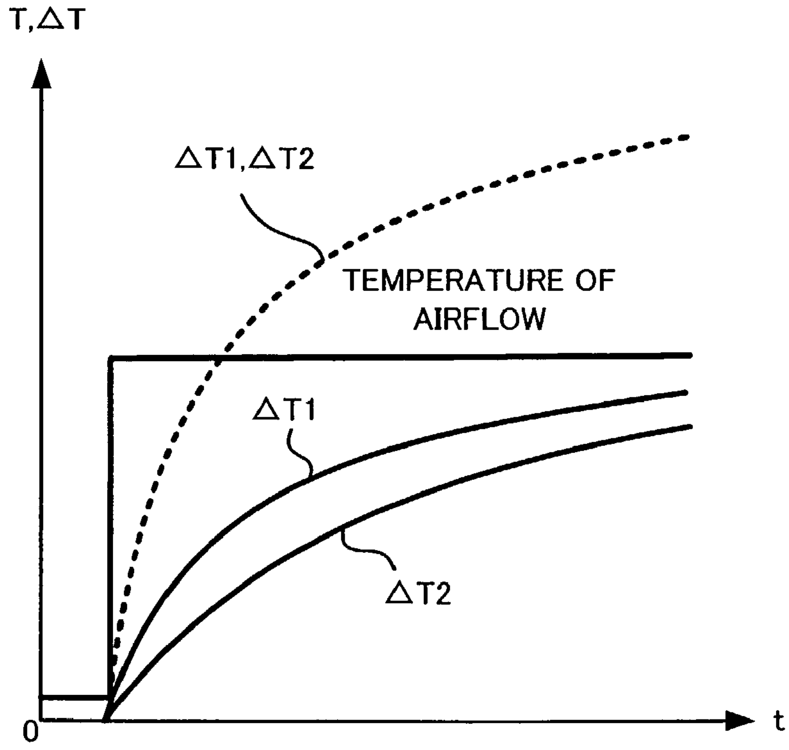
Figure 22:
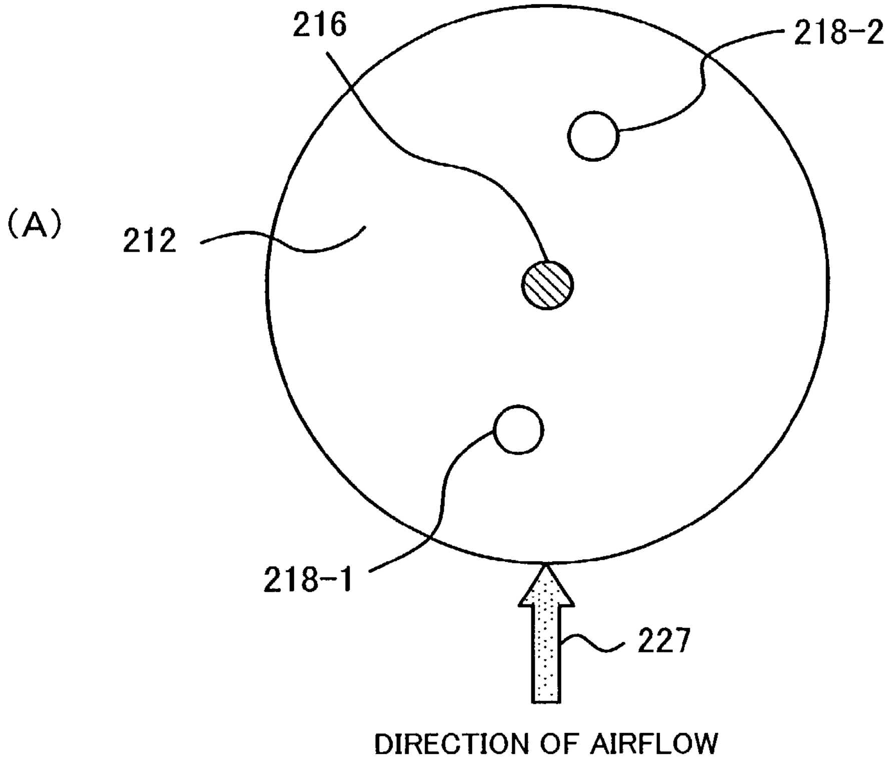
FIG. 22A shows a plan view of the low-temperature detecting portion and two high-temperature detecting portions provided on the fixing member of the fire heat sensor of the eleventh embodiment of FIG. 17.
FIG. 22B is a graph showing the results of measurement obtained when a hot airflow is applied in the direction shown in FIG. 22A.
Figure 22:
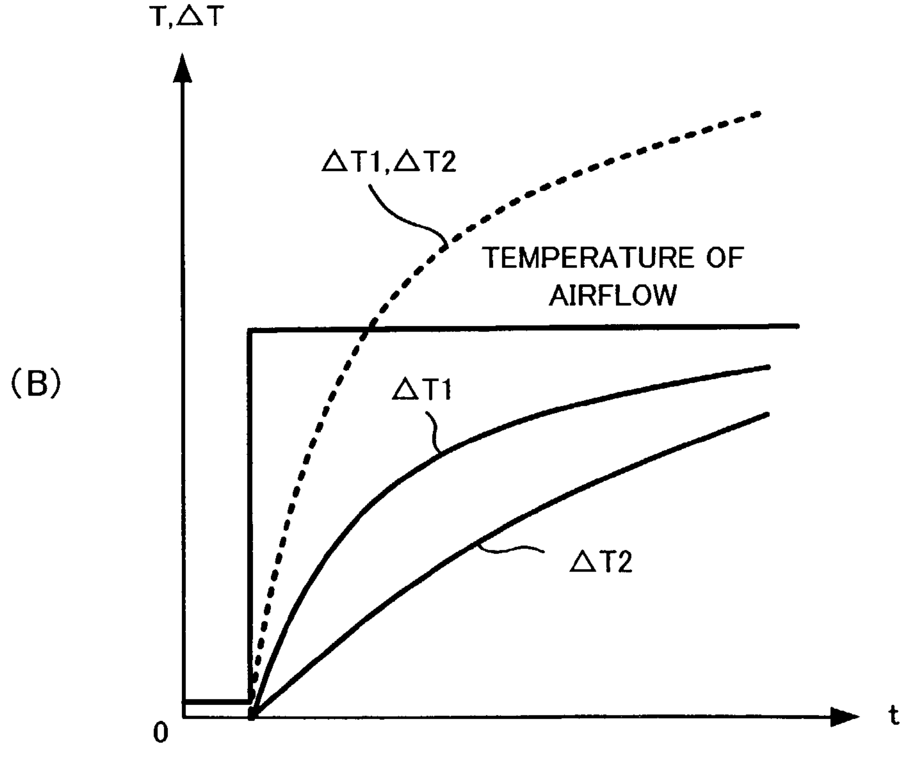

With respect to the change in direction between the first airflow direction 227 of FIG. 21 and the second airflow direction 227 of FIG. 22, the rate of a rise in temperature of the temperature difference $\Delta T1$ between the first high-temperature detecting portion 218-1 and the low-temperature detecting portion 216 changes according to the direction of a hot airflow and therefore depends on the hot airflow direction. Similarly, the rate of a rise in temperature of the temperature difference $\Delta T2$ between the second high-temperature detecting portions 218-2 and the low-temperature detecting portion 216 changes according to the direction of a hot airflow and depends on the hot airflow direction.

The present inventors have repeated the process of changing the direction of a hot airflow relative to the fire heat sensor of the present invention and then measuring the above-described temperature differences and the total of the temperature differences, and found the following fact. That is, if the first high-temperature detecting portion 218-1 and the second high-temperature detecting portion 218-2 are arranged at positions of axial symmetry of 180 degrees across the low-temperature detecting portion 216, the first and second temperature differences ΔT1 and ΔT2 vary with a change in direction of a hot airflow. However, the total (ΔT1+ΔT2) of the two temperature differences varies as shown by a broken line in FIGS. 21B and 22B and is independent of the direction of a hot airflow.

Thus, the present invention has been made based on the above-described fact that the total (ΔT1+ΔT2) of two temperature differences is independent of the direction of a hot airflow. As in the heat sensing circuit of FIG. 19, differential heat sensing can be performed by calculating the total (ΔT1+ΔT2) of two temperature differences and then comparing the total with a threshold value. Alternatively, as in FIG. 20, differential heat sensing can be performed by calculating an average {(ΔT1+ΔT2)/2} of two temperature differences and then comparing the average with a threshold value.

Figure 23:
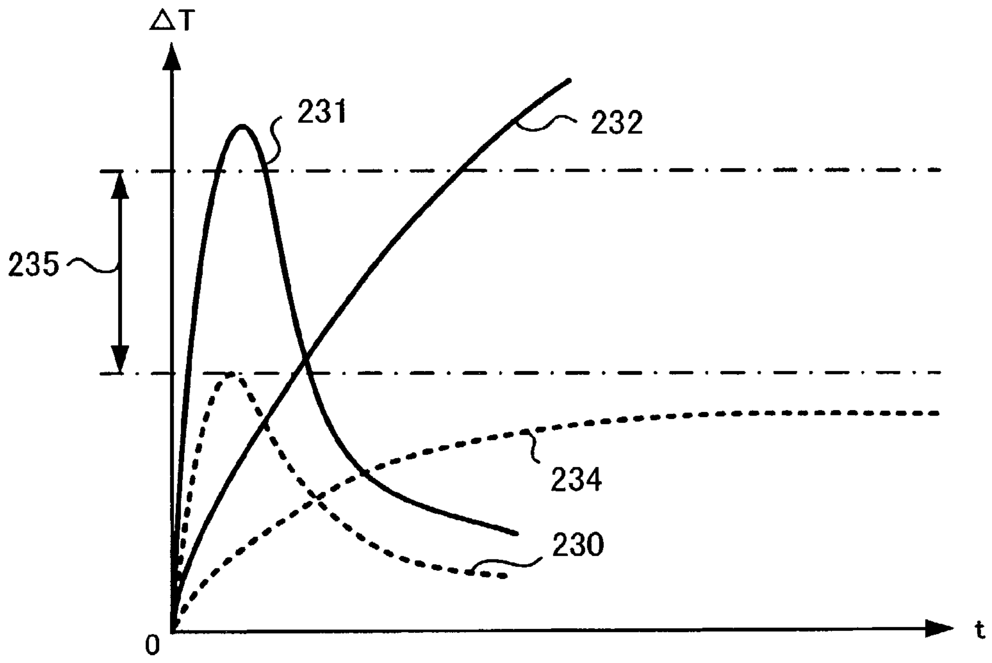
FIG. 23 is a characteristic diagram of operation tests and non-operation tests on the fire heat sensor of the present invention.

FIG. 23 shows the response curves of the fire heat sensor 210 with respect to the operation and non-operation tests in linear rise and step rise tests for evaluating domestic inspection standards for differential heat sensing in the case of employing the total (ΔT1+ΔT2) of two temperature differences.

In the step rise test, the temperature of an airflow was stepwise raised +20°C. and a characteristic such as a step rise operation test 231 was obtained. In the step rise operation test 231, a fire heat sensor has to operate within 30 seconds. On the other hand, in the non-operation test of the step rise test, the temperature of an airflow was stepwise raised +10° C. and a characteristic such as a step rise non-operation test 230 was obtained. In the non-operation test, a fire heat sensor has to be inoperative for 10 minutes or greater at a rise of 10° C.

In the operation test in the linear rise test, a rise in temperature was performed, for example, at the rate of 10° C./min. In this case, a characteristic such as a linear rise operation test 232 was obtained. In the linear rise operation test 232, a fire heat sensor must operate within 4.5 minutes from the start of the test. In the linear rise non-operation test, the temperature of an airflow was raised at the rate of 2° C./min. In this case, a characteristic such as a linear rise non-operation test 234 was obtained. In the linear rise non-operation test 234, a fire heat sensor must be inoperative for 15 minutes or greater from the start of the test.

Because of this, a set range 235 of threshold values can be assured which meets the inspection standards for the operation and non-operation tests for the liner rise and step rise tests of FIG. 23. Therefore, the fire heat sensor of the present invention is capable of easily meeting domestic inspection standards.

Figure 24:
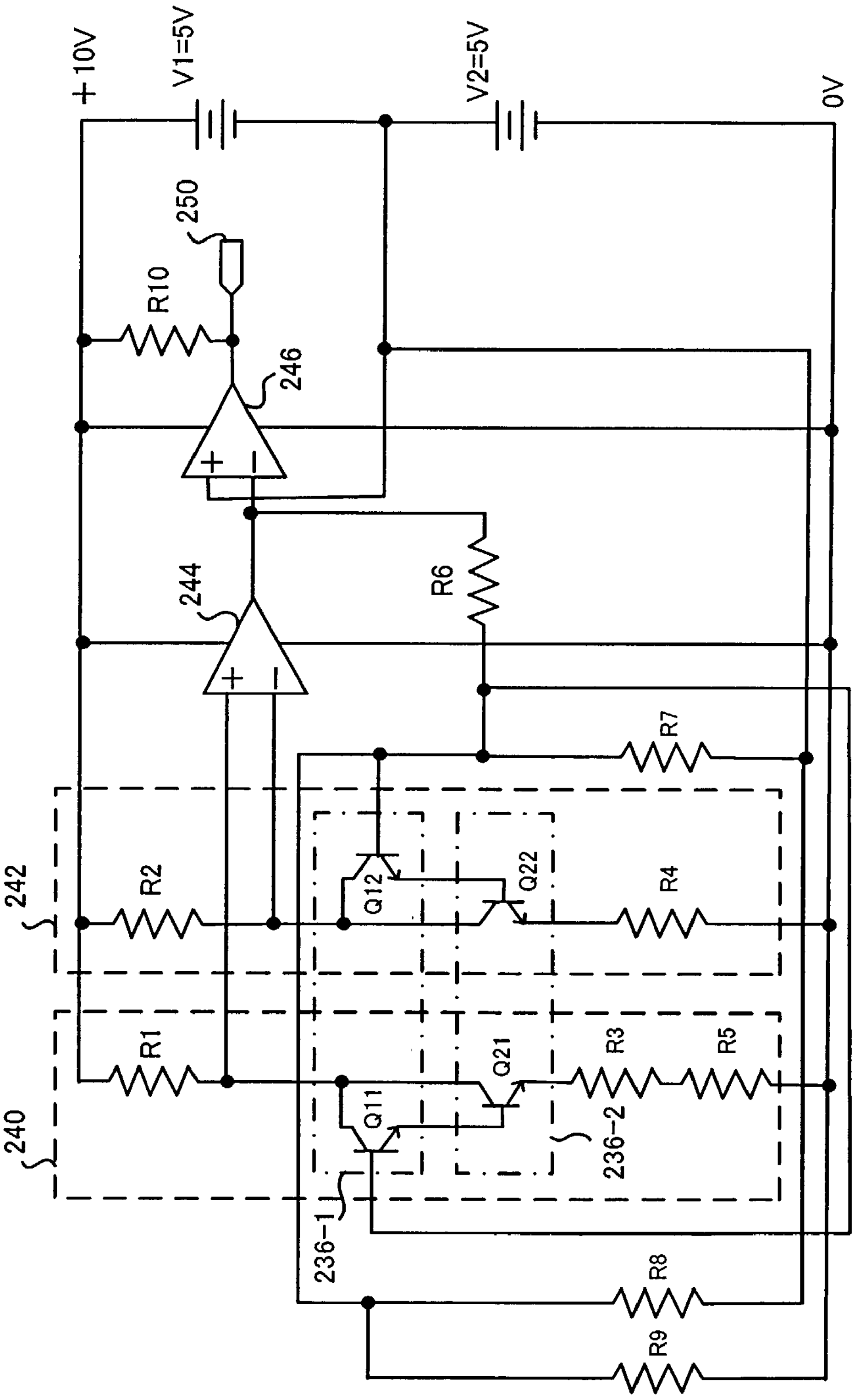
FIG. 24 is a circuit diagram showing the heat sensing circuit of the fire heat sensor of the eleventh embodiment of FIG. 17 that performs differential heat sensing.

FIG. 24 shows the heat sensing circuit of the fire heat sensor of the eleventh embodiment of FIG. 17 that performs differential heat sensing. The heat sensing circuit is equipped with a low-temperature detection circuit portion 240 and a high-temperature detection circuit portion 242. The low-temperature detection circuit portion 240 includes two transistors Q11 and Q21, which correspond to the temperature detecting element 222-3 of the center low-temperature detecting portion 216 of FIG. 17. The high-temperature detection circuit portion 242 includes two transistors Q12 and Q22, which correspond to the temperature detecting elements 220-1 and 220-2 of the first and second high-temperature detecting portions 218-1 and 218-2 of FIG. 17.

The transistors Q11 and Q21 of the low-temperature detection circuit portion 240 are Darlington-connected. Similarly, the transistors Q12 and Q22 of the high-temperature detection circuit portion 242 are Darlington-connected. In addition, the base-emitter voltages $V_{be}$ of the transistors Q11 and Q21 of the low-temperature detection circuit portion 240 are added together. Likewise, the base-emitter voltages $V_{be}$ of the transistors Q12 and Q22 of the high-temperature detection circuit portion 242 are added together. With this construction, a temperature coefficient for the base-emitter junction is doubled and therefore a temperature difference output can be made greater.

The low-temperature detection circuit portion 240 and the high-temperature detection circuit portion 242 are connected to an operational amplifier 244. The low-temperature detection circuit portion 240 and the high-temperature detection circuit portion 242 constitute a bridge circuit when viewed from the operational amplifier 244. This bridge circuit consists of four impedance elements: (R1); (R2); (Q11, Q21, R3, R5); and (Q12, Q22, R4).

The output of the operational amplifier 244 is input to a comparator 246. The comparator 246 has a reference voltage (threshold voltage) for a fire judgement. This circuit operates with two power sources V1 (5 V) and V2 (5 V) and is supplied with a circuit voltage of 10 V.

The transistor Q12 of the high-temperature detection circuit portion 242 is biased by the partial voltage of resistors R8 and R9. The transistor Q11 of the low-temperature detection circuit portion 240 is likewise biased by the partial voltage of resistors R6 and R7. Furthermore, the resistor R5 of the low-temperature detection circuit portion 240 is an adjusting resistor for absorbing transistor variations.

A description will be given of operation of the heat sensing circuit of FIG. 24. Initially, in afire monitoring state (i.e., in an ordinary temperature state or a room temperature state), a current flowing through the resistor R1, transistors Q11 and Q12, and resistors R3 and R5 of the low-temperature detection circuit portion 240 is equal to a current flowing through the resistor R2, transistors Q12 and Q22, and resistor R4 of the high-temperature detection circuit portion 242. Because of this, there is no potential difference between the input terminals of the operational amplifier 244.

In this equilibrium state, if the heat sensing circuit is exposed to a hot airflow generated by a fire, heat is transferred to the first and second high-temperature detecting portions 218-1 and 218-2 of FIG. 17, and the base-emitter voltages $V_{be}$ of the transistors Q12 and Q22 of the high-temperature detection circuit portion 242, provided in the first and second high-temperature detecting portions 218-1 and 218-2, are changed according to a temperature coefficient ($V_{tc}$) for the base-emitter junction (which a transistor has), for example, −2.3 mV/° C.

Because of this, the base currents of the transistors Q12 and Q22 increase. Therefore, the current flowing in the high-temperature detection circuit portion 242 increases and the voltage on the negative input terminal of the operational amplifier 244 decreases. Because of this, the operational amplifier 244 amplifies the potential difference between the input terminals thereof and outputs it to the comparator 246.

That is, assuming the output voltage of the operational amplifier 244 is $V_d$, the output $V_d$ due to a difference in temperature has the following value with respect to a midpoint voltage of 5 V:

$$V_d = (\text{temperature at a low temperature point} - \text{temperature at a high temperature point}) \times \{(R6+R7)/R7\} \times V_{tc}$$

In the high-temperature detection circuit portion 242 of FIG. 24, the transistors Q12 and Q22 are Darlington-connected. Therefore, a temperature coefficient for the base-emitter junction is doubled compared with the case of a single transistor.

Next, a description will be given of the adjusting resistor R5 which absorbs variations in the transistors provided in the high-temperature detection circuit portion 242. In the embodiment of FIG. 24, a single reference voltage is utilized and the operating point of the sensor is adjusted at the single resistor R5 in consideration of component variations.

The resistors R1 to R5 and transistors Q11, Q12, Q21, and Q22 of the low-temperature detection circuit portion 240 and high-temperature detection circuit portion 242 have an element variation. If they are not adjusted, the output of the operational amplifier 244 will not reach a midpoint potential of 5V.

The voltage across a series circuit, which consists of the resistor R2, transistors Q12 and Q22, and resistor R4 of the high-temperature detection circuit portion 242, is 10 V in total. The negative input terminal of the operational amplifier 244 has a higher voltage than the base voltage of the transistor Q12 by the voltage $V_c$ between the collector and the base. The base voltage of the transistor Q12 is always smaller in a voltage dividing circuit (which consists of resistors R8 and R9) than 5 V (which is the midpoint voltage) by a value equal to 5V×R8/(R8+R9) {i.e., 5V−5V×R8/(R8+R9)}.

In this state, if the resistor R5 is adjusted, a current that flows in the resistor R1, transistors Q11 and Q21, and resistors R3 and R5 of the low-temperature detection circuit portion 240 can be varied. Therefore, by adjusting the value of the resistor R5, the voltage on the positive input terminal of the operational amplifier 244 can be adjusted so that the equilibrium of the bridge circuit is maintained.

In the embodiment of FIG. 24, the output of the operational amplifier 244 is connected to the comparator 246 that has a midpoint potential of 5V as a reference voltage. The output of the operational amplifier 244 is compared with the midpoint potential 5V.

In the case where the resistor R5 is adjusted so that the output of the operational amplifier 244 is 4V, and the amplification degree of the operational amplifier 244 is set to about 43 times, $$V_d = (-2.3\text{ mV}) \times (-2) \times 43 = 0.2\text{V},$$

if the difference in temperature between the high-temperature detecting portion and the low-temperature detecting portion is 1° C. Therefore, the output of the operational amplifier 244 is changed 0.2V per temperature difference 1° C.

If the temperature difference between the high-temperature detecting portion and the low-temperature detecting portion is 5° C. or greater, the output of the operational amplifier 244 becomes 5V or greater. Therefore, if the output of the operational amplifier 244 exceeds the reference voltage 5V of the comparator 246, the output of the comparator 246 is inverted and a fire detection signal is output from an output terminal 250 to an external unit.

Figure 25:
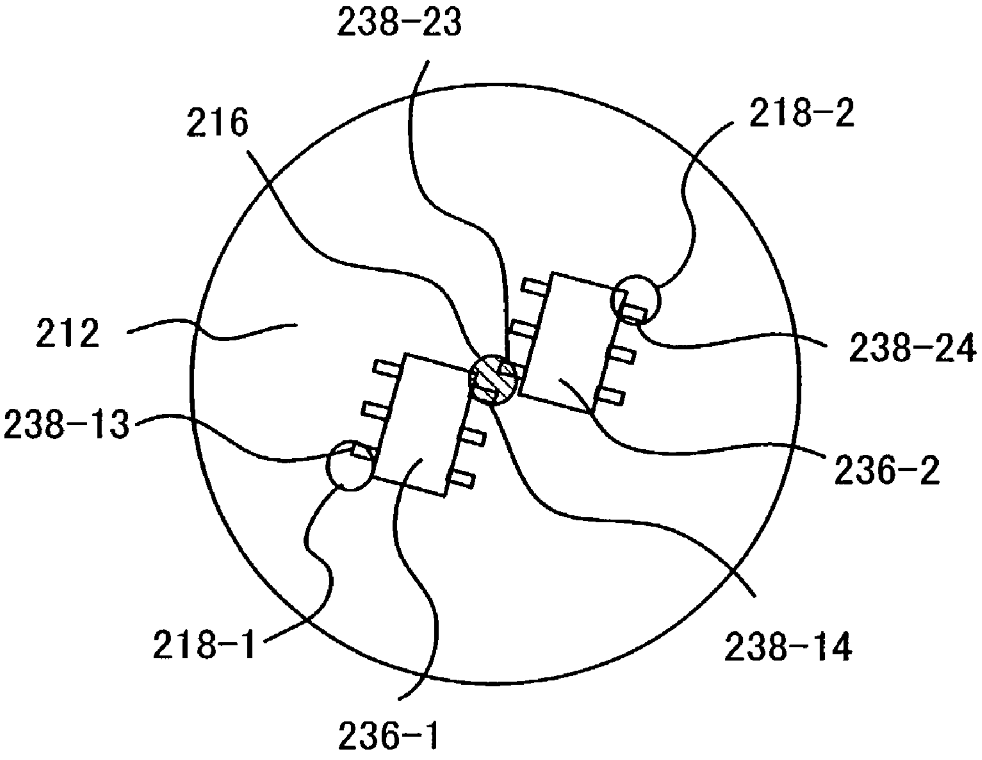
FIG. 25A is a plan view showing the temperature detecting elements that comprise composite transistors.
FIG. 25B is a diagram showing one of the composite transistors.
Figure 25:
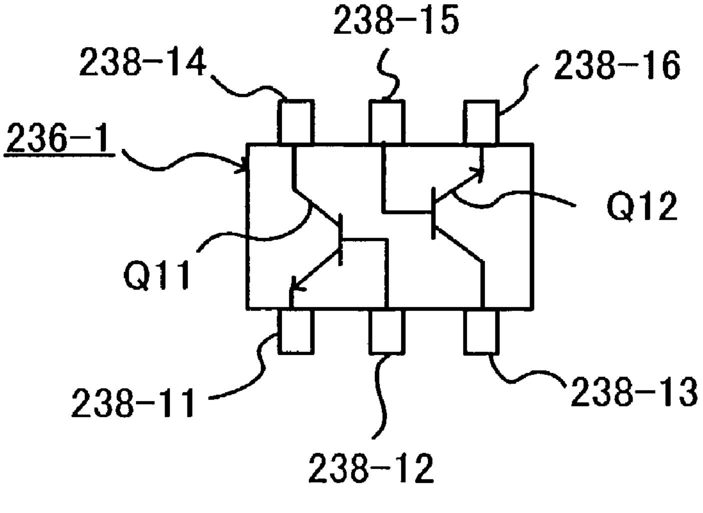

FIG. 25 shows how the transistors Q11, Q12, Q21, and Q22 of the low-temperature detection circuit portion 240 and high-temperature detection circuit portion 242 of the heat sensing circuit of FIG. 24 are mounted with respect to the low-temperature detecting portion 216 and high-temperature detecting portions 218-1 and 218-2.

In FIG. 25A, a first composite transistor 236-1 is disposed between the first high-temperature detecting portion 218-1 and the center low-temperature detecting portion 216, and a second composite transistor 236-2 is disposed between the center low-temperature detecting portion 216 and the second high-temperature detecting portion 218-2. Each composite transistor has a package structure in which two transistors are arranged by resin molding.

The first composite transistor 236-1 is shown in FIG. 25B. This composite transistor 236-1 includes two transistors Q11 and Q12. The transistor Q11 is used in the low-temperature detection circuit portion 240, while the transistor Q12 is used in the high-temperature detection circuit portion 242.

The transistors Q11 and Q12 in the first composite transistor 236-1 have leads 238-11 to 238-16. Among them, the collector lead 238-14 is connected to the collector of the transistor Q11, and the collector lead 238-13 is connected to the collector of the transistor Q12.

The first composite transistor 236-1 may consist of HN1C01F (Toshiba). In this composite transistor 236-1 (Toshiba), transistors Q11 and Q12 are mounted on collector leads 238-13 and 238-14. If the collector leads 238-13 and 238-14 are connected to the low-temperature detecting portion 216 and the high-temperature detecting portion 218-1, as shown in FIG. 25A, heat applied to the heat collectors can be transferred directly to the collectors of the transistors Q11 and Q12.

On the other hand, when employing a composite transistor where transistors are mounted on emitter leads, the emitter leads may be connected to the low-temperature detecting portion 216 and the high-temperature detecting portions 218-1 and 218-2. That is, the lead on which a transistor is mounted may be connected directly to the high-temperature detecting portion or low-temperature detecting portion. Note that the description of the present invention will be given in the case where a transistor is mounted on a collector lead.

The second composite transistor 236-2 of FIG. 25A, disposed between the low-temperature detecting portion 216 and the second high-temperature detecting portion 218-2, has the same structure as the first composite transistor 236-1.

By using the two composite transistors 236-1 and 236-2, the transistor Q11 of the first composite transistor 236-1 is provided on the side of the low-temperature detection circuit portion 240 of FIG. 24, and the transistor Q12 is provided on the side of the high-temperature detection circuit portion 242. The transistor Q21 of the second composite transistor 236-2 is provided on the side of the low-temperature detection circuit portion 240 of FIG. 24, and the transistor Q22 is provided on the side of the high-temperature detection circuit portion 242.

Although the transistors Q11 and Q12 are disposed on the low temperature and high temperature sides, they are housed within a single package circuit by resin molding. Because of this, if the temperature on the high temperature side rises, the flow of heat through the molded resin of the first composite transistor 236-1 will occur, although the heat collectors are thermally isolated. Therefore, the rise in temperature of the transistor Q12 on the high temperature side causes the temperature of the transistor Q11 on the low temperature side to rise. Thus, the rise rate of temperature on the high temperature side is made nearly the same as the rise rate of temperature on the low temperature side by the flow of heat through the resin molding of the first composite transistor 236-1.

The same applies to the second composite transistor 236-2 of FIG. 25A in which transistors Q21 and Q22 are connected between the low-temperature detecting portion 216 and the second high-temperature detecting portion 218-2.

If the rise rate of temperature on the high temperature side is made approximately the same as the rise rate of temperature on the low temperature side by the flow of heat through the composite transistors 236-1 and 236-2 which have two transistors, a property which reaches a fixed value with the lapse of time can be obtained in the linear rise non-operation test of FIG. 23.

That is, if the rise rates of temperature on the high temperature side and low temperature side differ in the linear rise non-operation test, a property in the linear rise non-operation test increases with the lapse of time, particularly when the rise rate of temperature on the low temperature side is lower than that of the high temperature side. As a result, inspection conditions for the non-operation test cannot be satisfied. However, in the present invention, the rise rates of temperature are made uniform by the flow of heat through the composite transistors from the high temperature side to the low temperature side. Because of this, ideal performance can be realized in which a property in the linear rise non-operation test reaches a fixed value.

Figure 26:
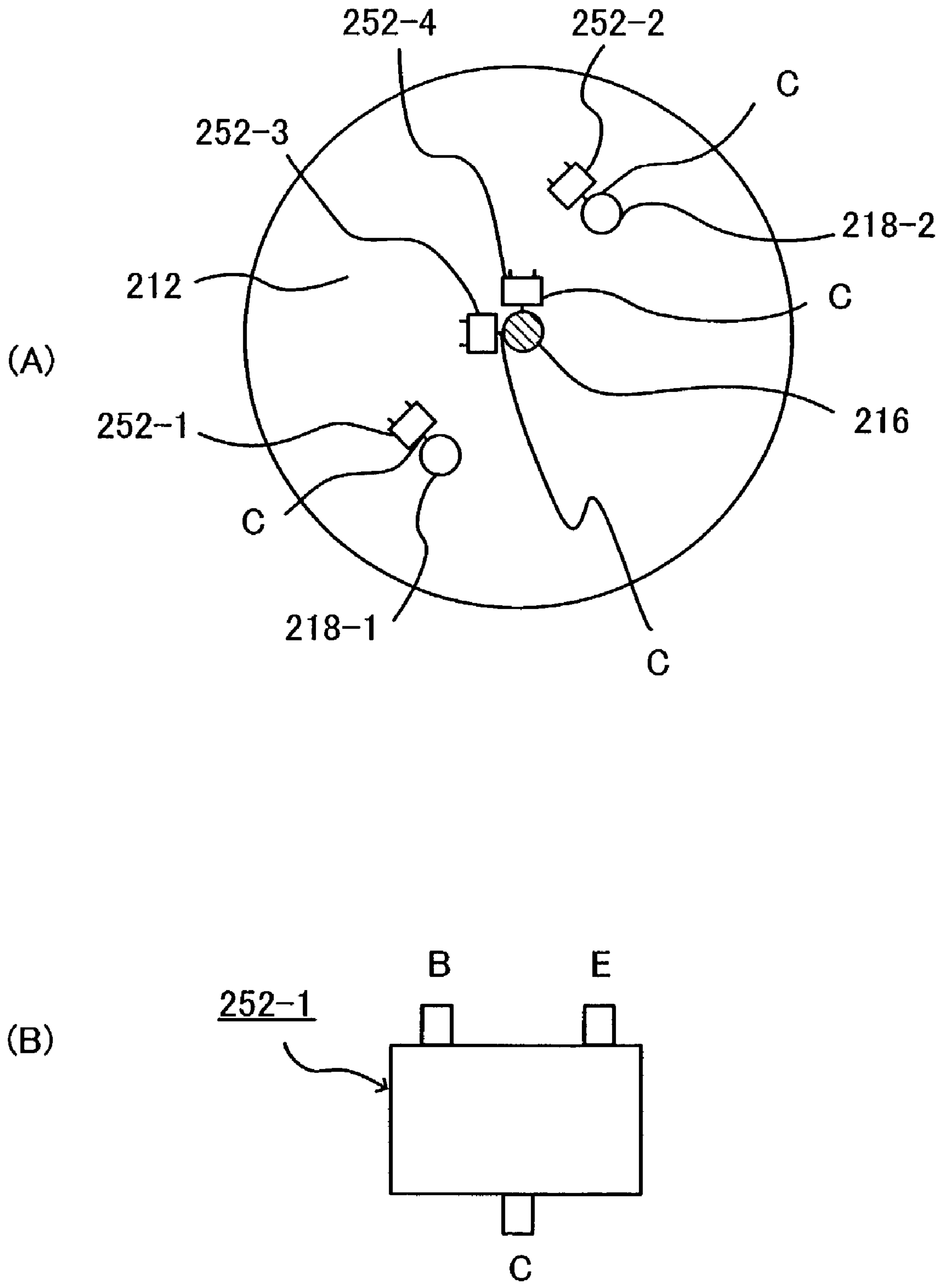
FIG. 26A is a plan view showing the fixing plate of a fire heat sensor constructed in accordance with a thirteenth embodiment of the present invention.
FIG. 26B is a diagram showing a single transistor employed in the fire heat sensor of FIG. 26A.

Referring to FIG. 26, there is depicted a fire heat sensor constructed in accordance with a thirteenth embodiment of the present invention. This embodiment employs single transistors. In FIG. 26A, the collector leads C of transistors 252-3 and 252-4 are connected to a center low-temperature detecting portion 216. The collector lead C of a transistor 252-1 is connected to a first high-temperature detecting portion 218-1. The collector lead C of a transistor 252-2 is connected to a second high-temperature detecting portion 218-2. The transistor 252-1 of FIG. 26A is shown in FIG. 26A. In FIG. 26B, a collector lead C, a base lead B, and a emitter lead E extend from the collector, base, and emitter of the transistor 252-1, respectively. Even in the case where 4 (four) single transistors 252-1 to 252-4 are used as described above, the transistors 252-3 and 252-4, which are connected to the low-temperature detecting portion 216 through the collector leads C, are Darlington-connected as the transistors Q11 and Q21 of the low-temperature detection circuit portion 240 of the heat sensing circuit of FIG. 24. In addition, the transistors 252-1 and 252-2, which are connected to the high-temperature detecting portions 218-1 and 218-2 through the collector leads C, are Darlington-connected as the transistors Q12 and Q22 of the high-temperature detection circuit portion 242 of the heat sensing circuit of FIG. 24.

Figure 27:
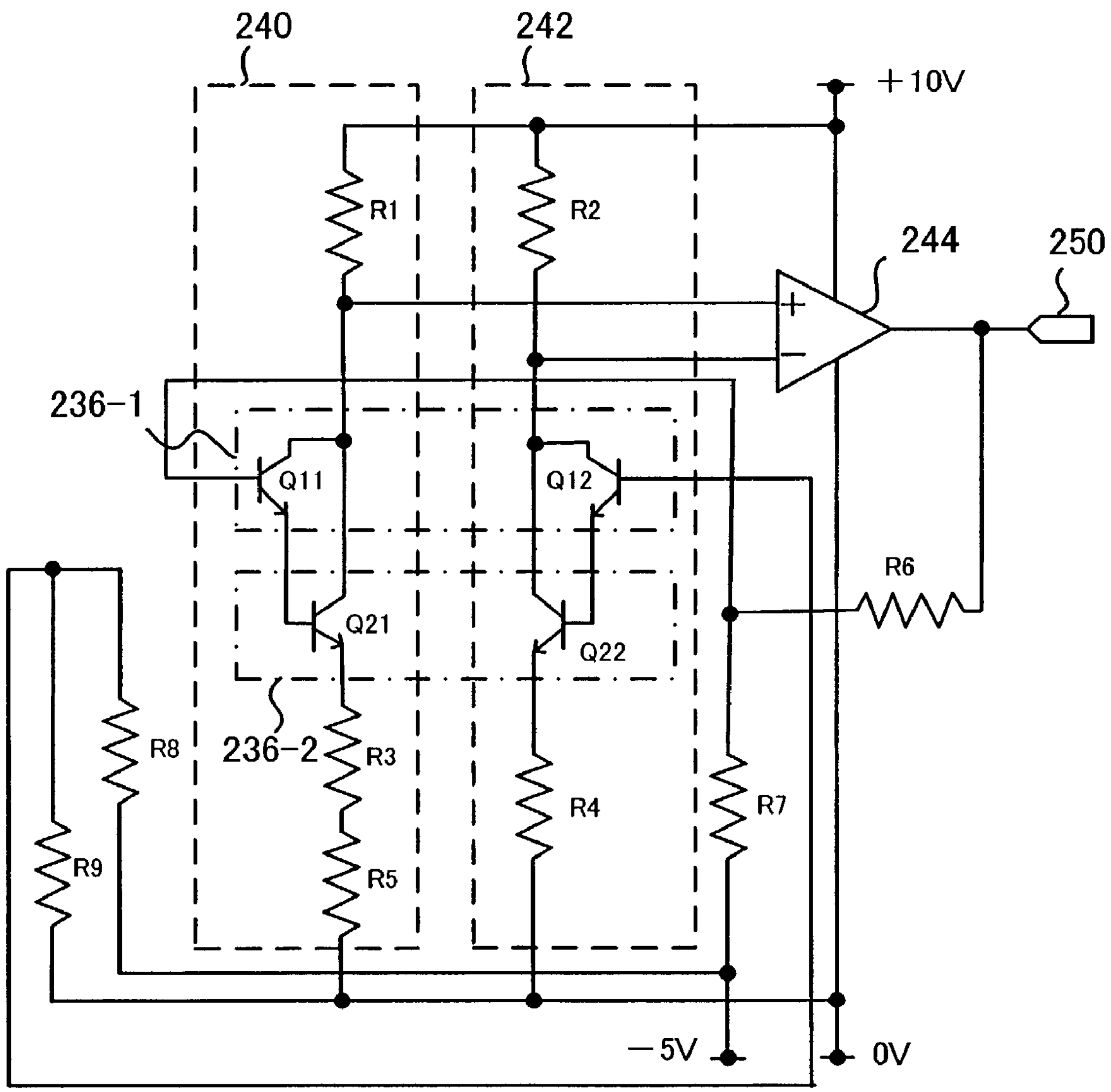
FIG. 27 is a block diagram of the heat sensing circuit of a fire heat sensor constructed in accordance with a fourteenth embodiment of the present invention.

Referring to FIG. 27, there is depicted a fire heat sensor constructed in accordance with a fourteenth embodiment of the present invention. In this embodiment, a low-temperature detection circuit portion 240, a high-temperature detection circuit portion 242, and an operational amplifier 244 are mounted on the side of the fixing member 212 shown in FIG. 17. The comparator 246 and subsequent circuits, shown in FIG. 24, are provided on a sensor base, etc. If the heat sensing circuit portion of FIG. 27 is mounted integrally with the fixing member 212 of FIG. 17B which has the low-temperature detecting portion 216 and the high-temperature detecting portions 218-1 and 218-2, the size of the fire heat sensor can be reduced. Furthermore, since elements up to the amplifier are provided in the vicinity, reliability with respect to external noise can be enhanced.

Figure 28:
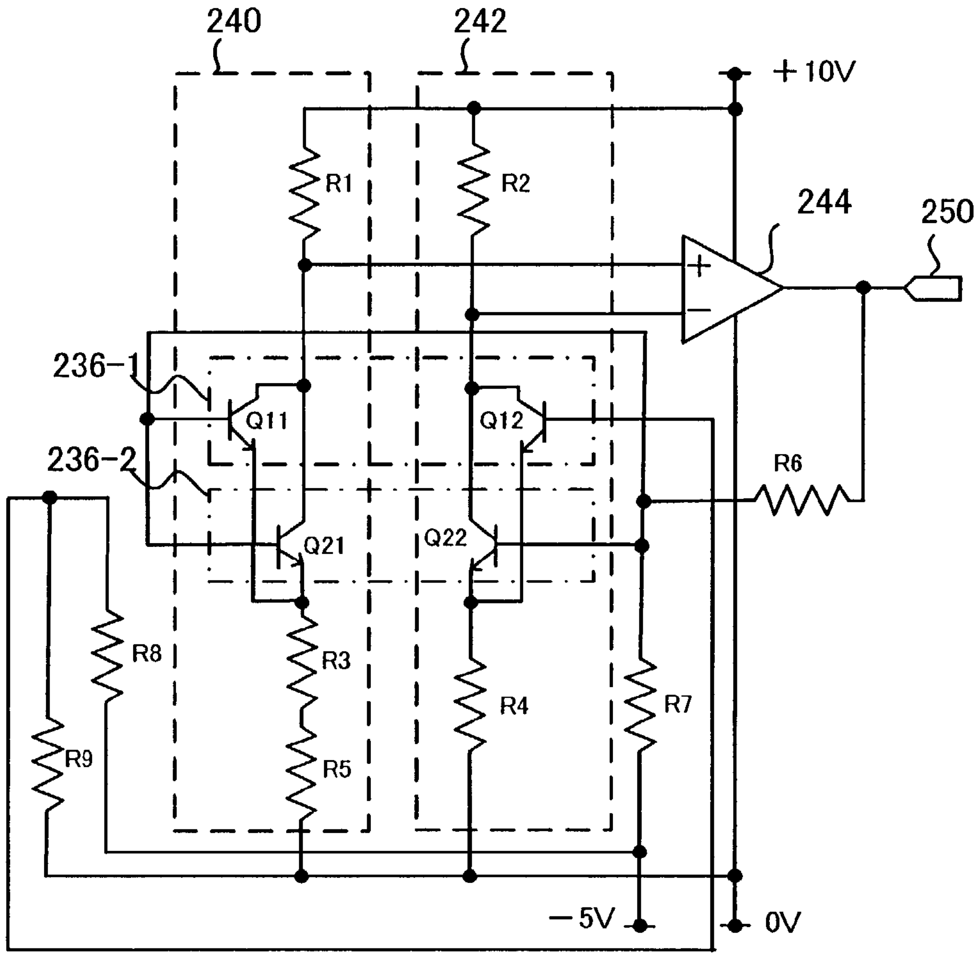
FIG. 28 is a block diagram of the heat sensing circuit of a fire heat sensor constructed in accordance with a fifteenth embodiment of the present invention.

Referring to FIG. 28, there is depicted a fire heat sensor constructed in accordance with a fifteenth embodiment of the present invention. As with the embodiment of FIG. 27, the comparator 246 and subsequent circuits are separated. In the fifteenth embodiment of FIG. 28, two transistors Q11 and Q21 in a low-temperature detection circuit portion 240 are connected in parallel, not a Darlington connection. Similarly, two transistors Q12 and Q22 in a high-temperature detection circuit portion 242 are connected in parallel, not a Darlington connection. In the case of this parallel connection, a temperature coefficient for the base-emitter junction in the low-temperature detection circuit portion 240 and high-temperature detection circuit portion 242 for differential heat sensing is a temperature coefficient per transistor, for example, −2.3 mV/° C. A circuit constitution with such a parallel connection is less likely to be influenced by a fluctuation in power supply voltage and external noise and is able to realize a stable circuit operation.

Note that the transistors Q11 and Q12 of FIG. 28 are incorporated into a composite transistor 236-1. Likewise, the transistors Q21 and Q22 are incorporated into a composite transistor 236-2. The transistors are mounted as shown in FIG. 25. However, they may be mounted as single transistors, as shown in FIG. 26. Furthermore, the parallel connections of the transistors Q11 and Q21 and transistors Q21 and Q22 of FIG. 28 may be replaced with the part of the Darlington connection of FIG. 24 including the operational amplifier 244 of the output stage.

Figure 29:
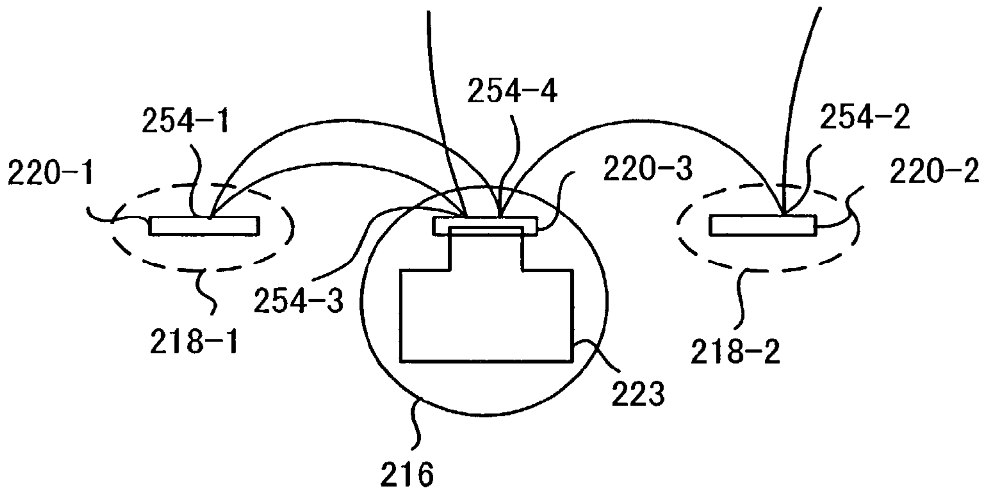
FIG. 29 is a diagram showing a thermocouple employed in a fire heat sensor constructed in accordance with a sixteenth embodiment of the present invention.

Referring to FIG. 29, there is depicted a fire heat sensor constructed in accordance with a sixteenth embodiment of the present invention. This embodiment uses thermocouples instead of the temperature detecting elements of the embodiment of FIG. 17. The heat collectors 220-1 and 220-2 of high-temperature detecting portions 218-1 and 218-2 are contacted with thermocouples 254-1 and 254-2, respectively. The heat collector 220-3 of a center low-temperature detecting portion 216 is contacted with two thermocouples 254-3 and 254-4. In addition to thermocouples, diodes and thermistors may be employed.

Figure 30:
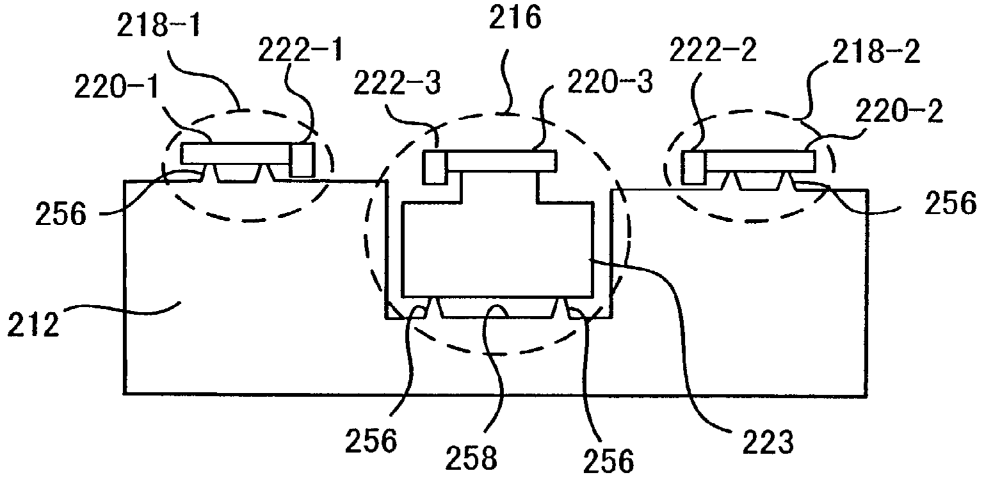
FIG. 30 is a sectional side view showing a fire heat sensor constructed in accordance with a seventeenth embodiment of the present invention.

Referring to FIG. 30, there is depicted a fire heat sensor constructed in accordance with a seventeenth embodiment of the present invention. In this embodiment, a fixing member 212 is formed from a sufficiently thick member. To thermally isolate the fixing member 212 from the heat collectors 220-1, 220-2 of high-temperature detecting portions 218-1, 218-2, the contact area between the heat collectors 220-1, 220-2 and the fixing member 212 is reduced by projections 256. The heat accumulator 223 connected to the heat collector 220-3 of a low-temperature detecting portion 216 is received within a housing portion 258. The heat collector 220-3 is approximately coplanar with the heat collectors 220-1, 220-2 of the high-temperature detecting portions 218-1, 218-2. To thermally isolate the fixing member 212 from the heat accumulator 223 of the low-temperature detecting portion 216, the heat accumulator 223 is supported by projections 256.

Figure 31:
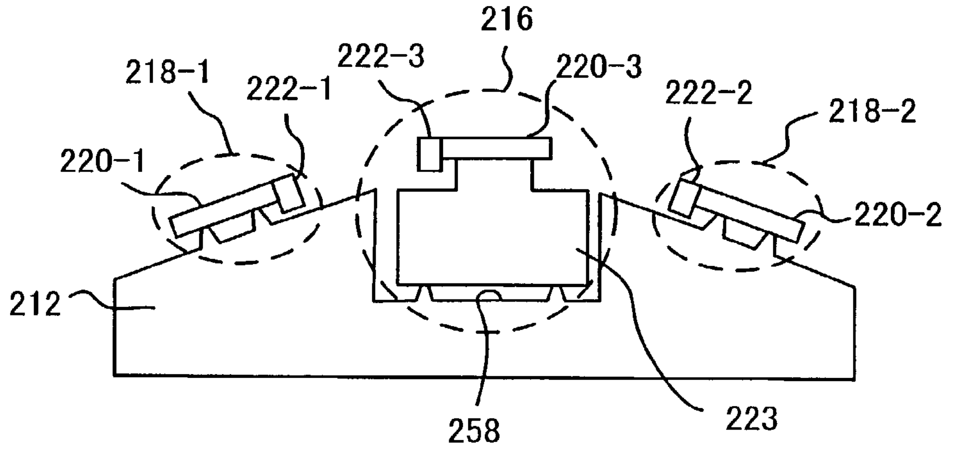
FIG. 31 is a sectional side view showing a fire heat sensor constructed in accordance with an eighteenth embodiment of the present invention.

Referring to FIG. 31, there is depicted a fire heat sensor constructed in accordance with an eighteenth embodiment of the present invention. In this embodiment, the high-temperature detecting portions 218-1, 218-2 of FIG. 30 are provided on inclined surfaces. This embodiment can easily undergo a hot airflow on both sides.

Figure 32:
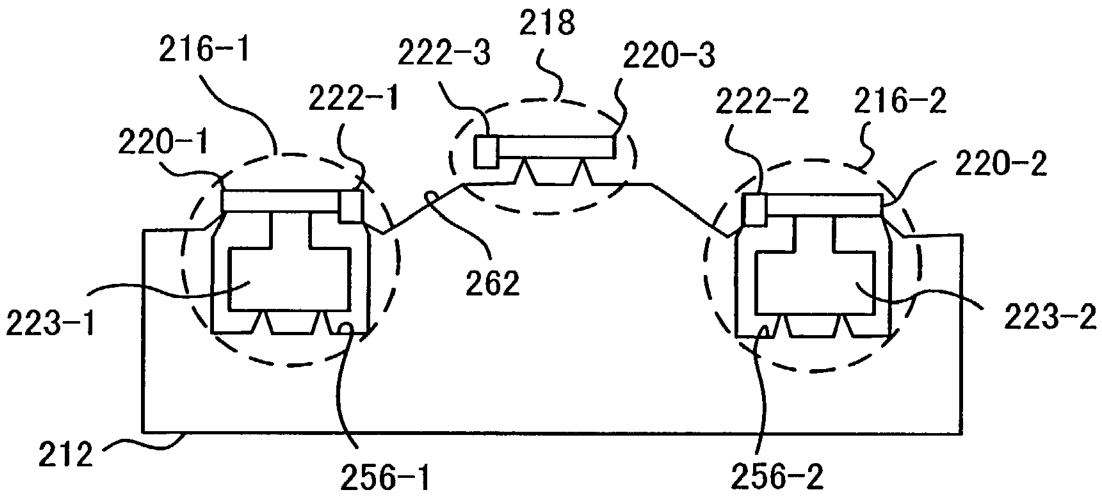
FIG. 32 is a sectional side view showing a fire heat sensor constructed in accordance with a nineteenth embodiment of the present invention.

Referring to FIG. 32, there is depicted a fire heat sensor constructed in accordance with a nineteenth embodiment of the present invention. This embodiment is characterized in that low-temperature detecting portions 216-1, 216-2 are provided on both sides of a center high-temperature detecting portion 218. In this case, the high-temperature detecting portion 218 is mounted on the center flat surface, and on both sides of the high-temperature detecting portion 218, heat accumulators 223-1, 223-2 are housed within housing portions 256-1, 256-2.

In the case where the low-temperature detecting portions 216-1, 216-2 are provided on the end portions of the fixing member 212, the heat energy of a hot air is first transferred to the low-temperature detecting portions 216-1, 216-2 and therefore a rise in temperature of the center high-temperature detecting portion 218 is not sufficiently obtained. Because of this, it is desirable that the high-temperature detecting portion 218 protrude from the inclined surface 262. The low-temperature detecting portions 216-1, 216-2 and high-temperature detecting portion 218 have heat collectors 220-1, 220-2, and 220-3, which are contacted with temperature detecting elements 222-1, 222-2, and 222-3.

Figure 33:
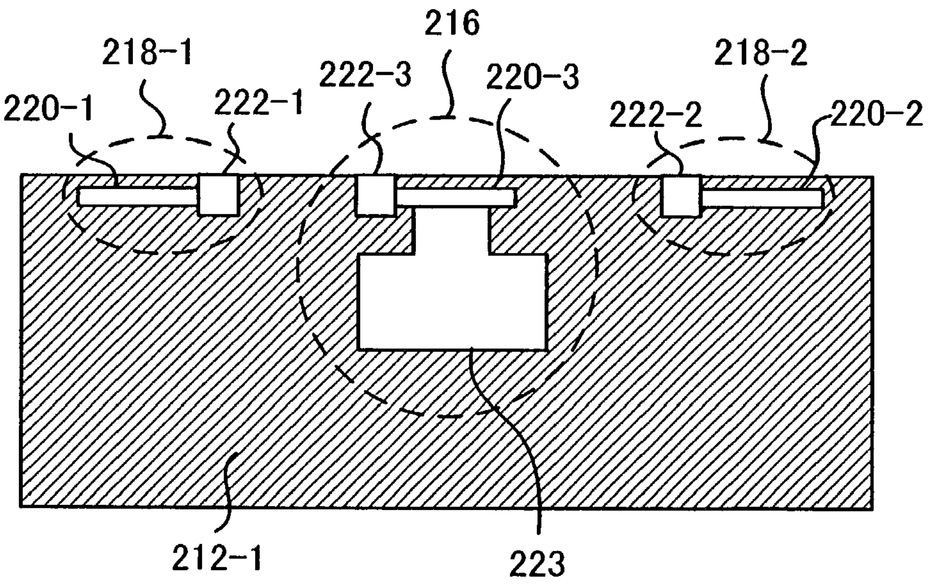
FIG. 33 is a sectional side view showing a fire heat sensor constructed in accordance with a twentieth embodiment of the present invention.

Referring to FIG. 33, there is depicted a fire heat sensor constructed in accordance with a twentieth embodiment of the present invention. This embodiment is characterized in that a foam resin member 212-1 such as urethane foam is employed as the above-described fixing member. The thermal diffusivity of the foam resin member 212-1 is sufficiently small. High-temperature detecting portions 218-1, 218-2 and a low-temperature detecting portion 216 are buried into the foam resin member 212-1 so that heat collectors 220-1 to 220-3 are exposed.

Figure 34:
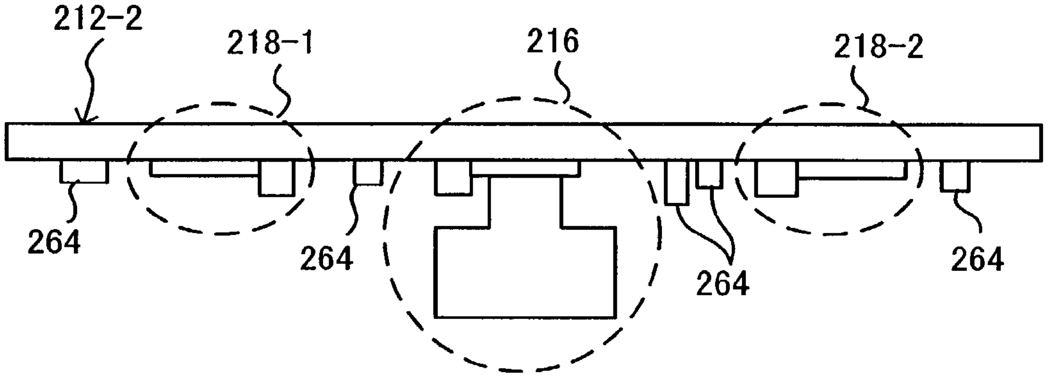
FIG. 34 is a sectional side view showing a fire heat sensor constructed in accordance with a twenty-first embodiment of the present invention.

Referring to FIG. 34, there is depicted a fire heat sensor constructed in accordance with a twenty-first embodiment of the present invention. This embodiment uses a printed board 212-2 as the above-described fixing member. In the case where the printed board 212-2 is used, other circuit components 264 can be mounted in addition to high-temperature detecting portions 218-1, 218-2 and a low-temperature detecting portion 216.

Figure 35:
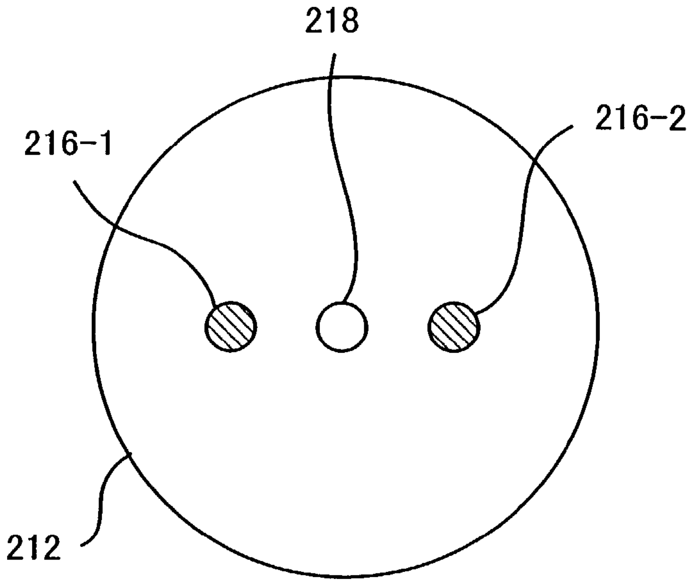
FIG. 35A is a plan view showing the fixing plate of a fire heat sensor constructed in accordance with a twenty-second embodiment of the present invention.
FIG. 35B is a block diagram showing the heat sensing circuit of the fire heat sensor shown in FIG. 35A.
Figure 35:
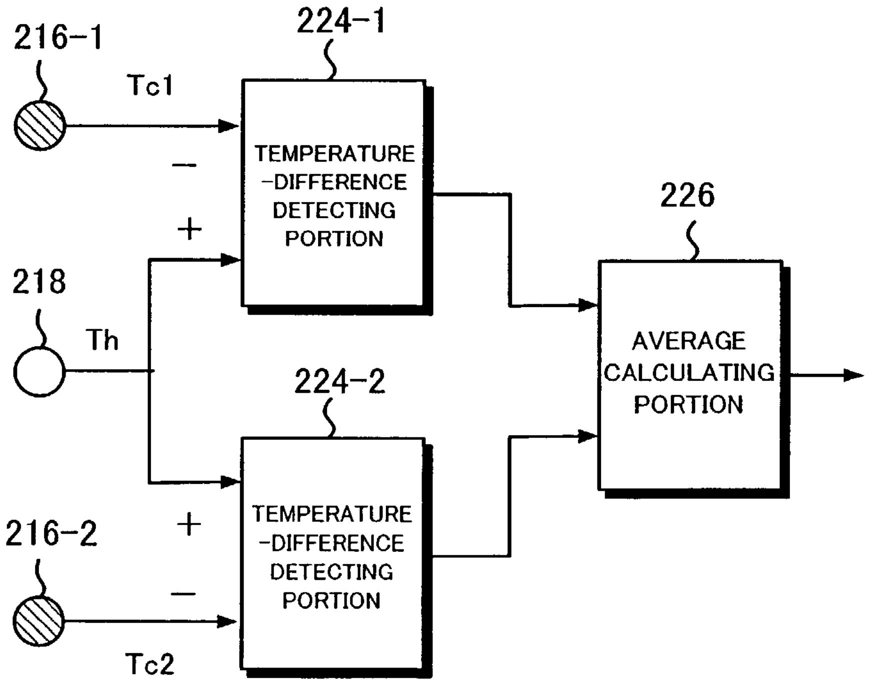

Referring to FIG. 35, there is depicted a fire heat sensor constructed in accordance with a twenty-second embodiment of the present invention. This embodiment is characterized in that it includes a single high-temperature detecting portion and two low-temperature detecting portions.

In FIG. 35A, a high-temperature detecting portion 218 is disposed at the center of a fixing member 212, and low-temperature detecting portions 216-1, 216-2 are disposed at positions of axial symmetry across the high-temperature detecting portion 218. Each detecting portion on the fixing member 212 is disposed as shown in FIG. 32, for example. The low-temperature detecting portions 216-1, 216-2 are connected to heat accumulators 223-1, 223-2.

A heat sensing circuit in this case which performs differential heat sensing is shown in FIG. 35B. That is, a first temperature-difference detecting portion 224-1 detects a first temperature difference ΔT1 between the temperature Th detected by the high-temperature detecting portion 218 and the temperature Tc1 detected by the first low-temperature detecting portion 216-1. A second temperature-difference detecting portion 224-2 detects a second temperature difference ΔT2 between the temperature Th detected by the high-temperature detecting portion 218 and the temperature Tc2 detected by the second low-temperature detecting portion 216-2. An average of the two temperature differences is calculated by an average calculating portion 226. Instead of the average calculating portion 226, an adder may be provided to calculate the total of the two temperature differences.

In the case where the low-temperature detecting portions 216-1, 216-2 are provided across the high-temperature detecting portion 218, as shown in FIG. 35, differential heat sensing can be performed without depending on the direction of a hot airflow by adding or averaging the two temperature differences ΔT1 and ΔT2.

Figure 36:
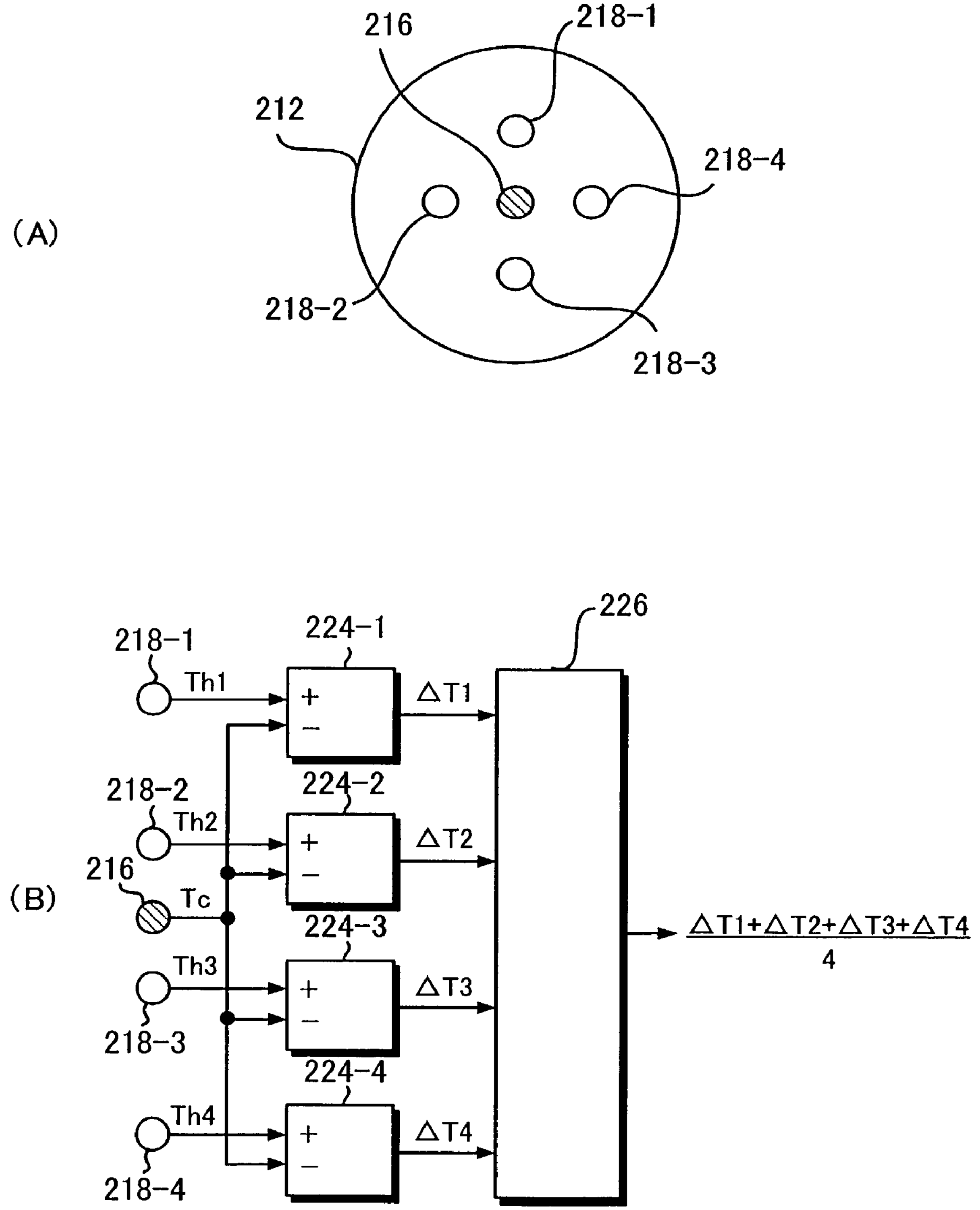
FIG. 36A is a plan view showing the fixing plate of a fire heat sensor constructed in accordance with a twenty-third embodiment of the present invention.
FIG. 36B is a block diagram showing the heat sensing circuit of the fire heat sensor shown in FIG. 36A.

Referring to FIG. 36, there is depicted a fire heat sensor constructed in accordance with a twenty-third embodiment of the present invention. This embodiment is characterized in that 4 (four) high-temperature detecting portions are provided with respect to a single low-temperature detecting portion.

FIG. 36A shows a plan view of a fixing member 212. With respect to a center low-temperature detecting portion 216, high-temperature detecting portions 218-1, 218-3 and high-temperature detecting portions 218-2, 218-4 are disposed at positions of axial symmetry in two directions.

A heat sensing circuit in this case is shown in FIG. 36B. At temperature-difference detecting portions 224-1 to 224-4, temperature differences ΔT1 to ΔT4 are detected between temperatures Th1 to Th4 detected by the four high-temperature detecting portions 218-1 to 218-4 and the temperature Tc detected by the low-temperature detecting portion 216. An average value of the four temperature differences ΔT1 to ΔT4 is calculated by an average-value calculating circuit 226.

In FIG. 36, the four high-temperature detecting portions 218-1 to 218-4 are disposed at positions of axial symmetry in two directions crossing at right angles. However, they may be disposed at positions which do not cross at right angles. The number of high-temperature detecting portions may be increased to 6, 8, . . . .

Conversely, four or more low-temperature detecting portions may be disposed at positions of axial symmetry with respect to a single center high-temperature detecting portion. However, since the low-temperature detecting portion has a heat accumulator of relatively large size, the number of low-temperature detecting portions that can be actually realized will be limited.

Figure 37:
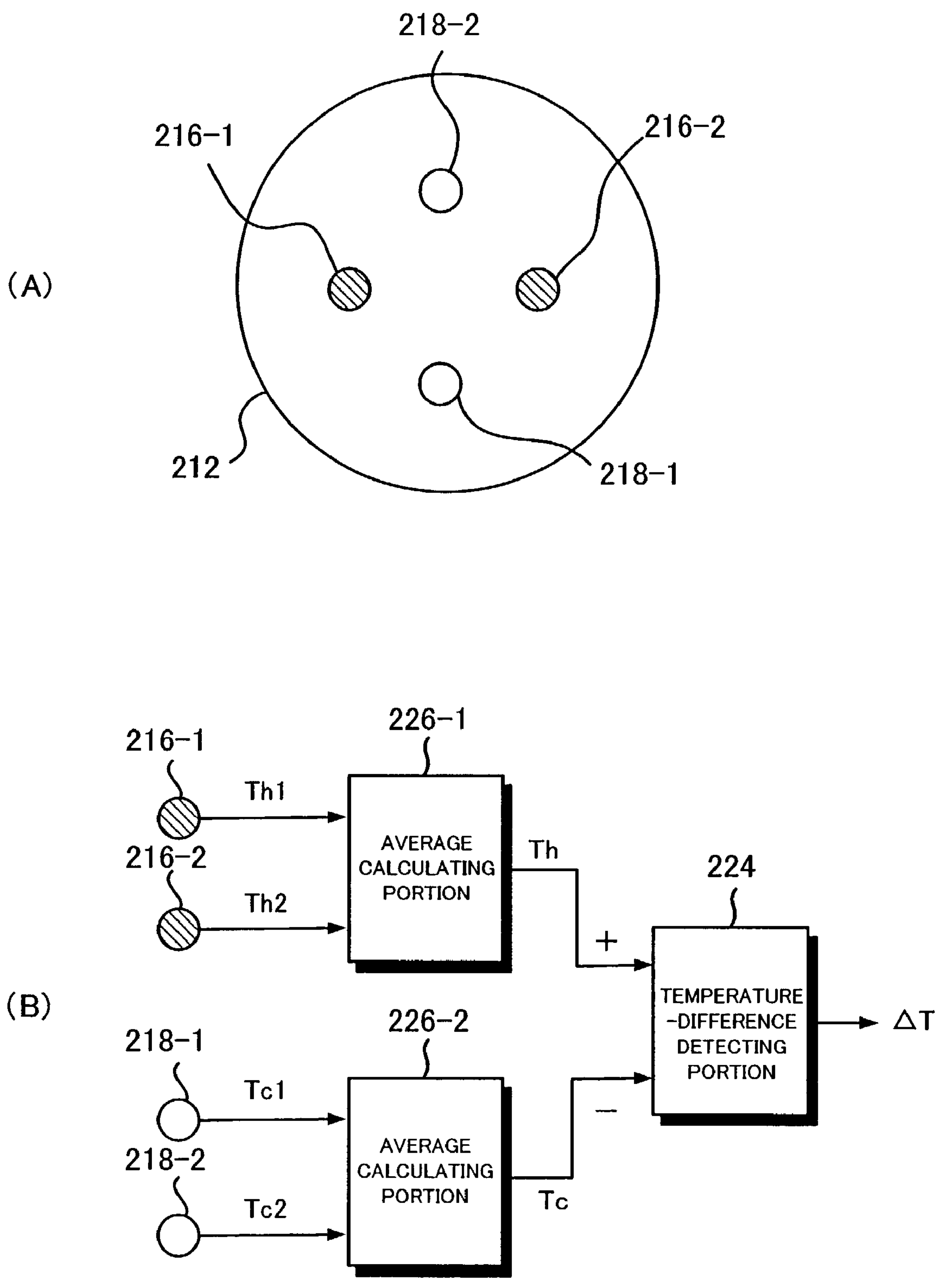
FIG. 37A is a plan view showing the fixing plate of a fire heat sensor constructed in accordance with a twenty-fourth embodiment of the present invention.
FIG. 37B is a block diagram showing the heat sensing circuit of the fire heat sensor shown in FIG. 37A.

Referring to FIG. 37, there is depicted a fire heat sensor constructed in accordance with a twenty-fourth embodiment of the present invention. This embodiment is characterized in that it includes two low-temperature detecting portions and two high-temperature detecting portions.

In FIG. 37A, low-temperature detecting portions 216-1, 216-2 and high-temperature detecting portions 218-1, 218-2 are disposed on a fixing member 212 so that they face each other on the same circle. More specifically, two low-temperature detecting portions 216-1, 216-2 are disposed on a circle and on a center line passing through the center of the circle. Similarly, two high-temperature detecting portions 218-1, 218-2 are disposed on a circle and on a center line passing through the center of the circle. In this case, circles on which the detecting portions are positioned may be the same circle or concentric circles differing in radius.

A heat sensing circuit in this case is shown in FIG. 37B. That is, an average value between the two low-temperature detecting portions 216-1, 216-2 is calculated by an average-value calculating portion 216-1. An average value between the two high-temperature detecting portions 218-1, 218-2 is calculated by an average-value calculating portion 216-2. A temperature difference ΔT between an average value Th on the high temperature side and an average value Tc on the low temperature side is detected by a temperature-difference detecting portion 224 and is output. Instead of an average value, the total may be calculated.

Figure 38:
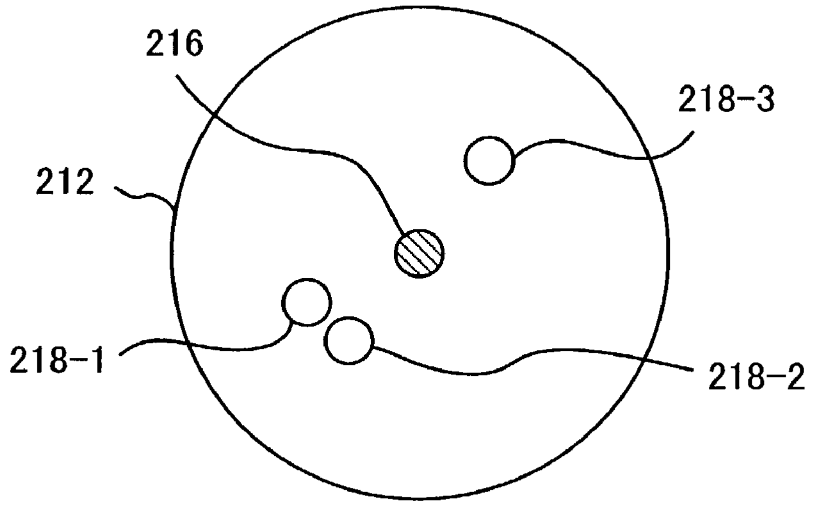
FIG. 38A is a plan view showing the fixing plate of a fire heat sensor constructed in accordance with a twenty-fifth embodiment of the present invention.
FIG. 38B is a block diagram showing the heat sensing circuit of the fire heat sensor shown in FIG. 38A.
Figure 38:
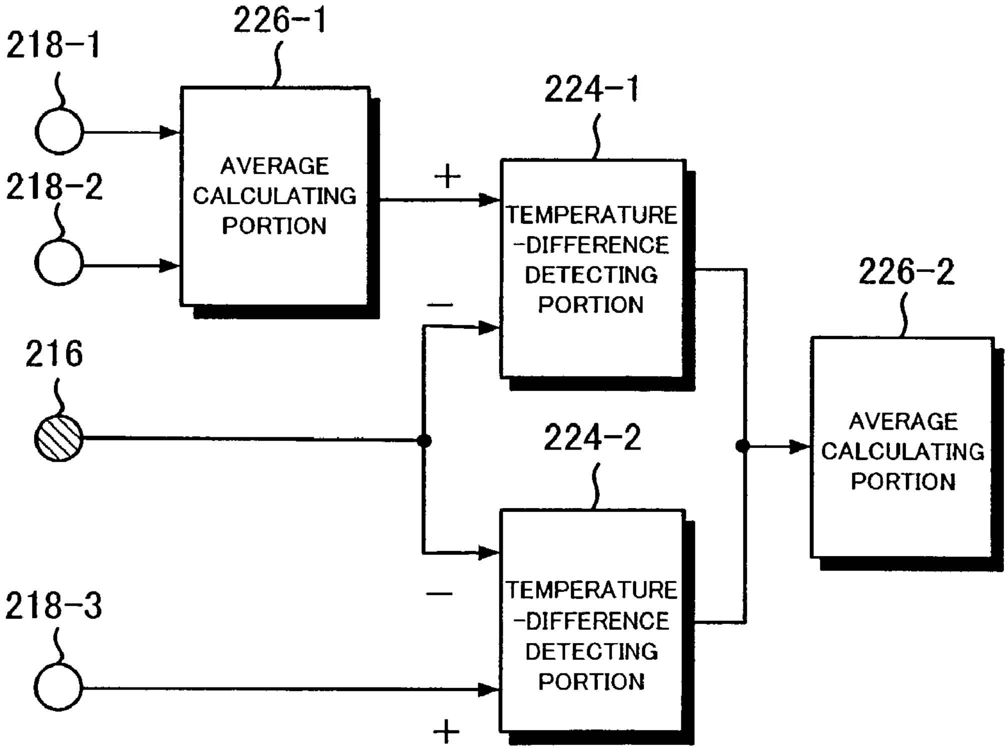

Referring to FIG. 38, there is depicted a fire heat sensor constructed in accordance with a twenty-fifth embodiment of the present invention. This embodiment is characterized in that a plurality of high-temperature detecting portions are provided approximately symmetrically with respect to a single low-temperature detecting portion.

As shown in FIG. 38A, a center low-temperature detecting portion 216 is disposed on a fixing member 212, and two high-temperature detecting portions 218-1, 218-2 and a high-temperature detecting portion 218-3 are disposed opposite each other. Although they are disposed approximately symmetrically with respect to a center, dependency on the direction of a hot airflow can be sufficiently reduced.

A heat sensing circuit in this case is shown in FIG. 38B. An average value between two high-temperature detecting portions 218-1, 218-2 is calculated by an average-value calculating portion 226-1. A temperature difference between the average value calculated by the average-value calculating portion 226-1 and a temperature detected by the low-temperature detecting portion 216 is detected by a first temperature-difference detecting portion 224-1. Similarly, a temperature difference between the temperature detected by the low-temperature detecting portion 216 and a temperature detected by the high-temperature detecting portion 218-3 is detected by a second temperature-difference detecting portion 224-2. An average value of the two temperature differences is calculated by an average-value calculating portion 236-2.

Instead of the average-value calculating portion 236-2, the total of two temperature differences may be calculated by an adder. As a modification of the embodiment shown in FIG. 38, three low-temperature detecting portions may be disposed at positions of axial symmetry with respect to a center high-temperature detecting portion.

Figure 3:
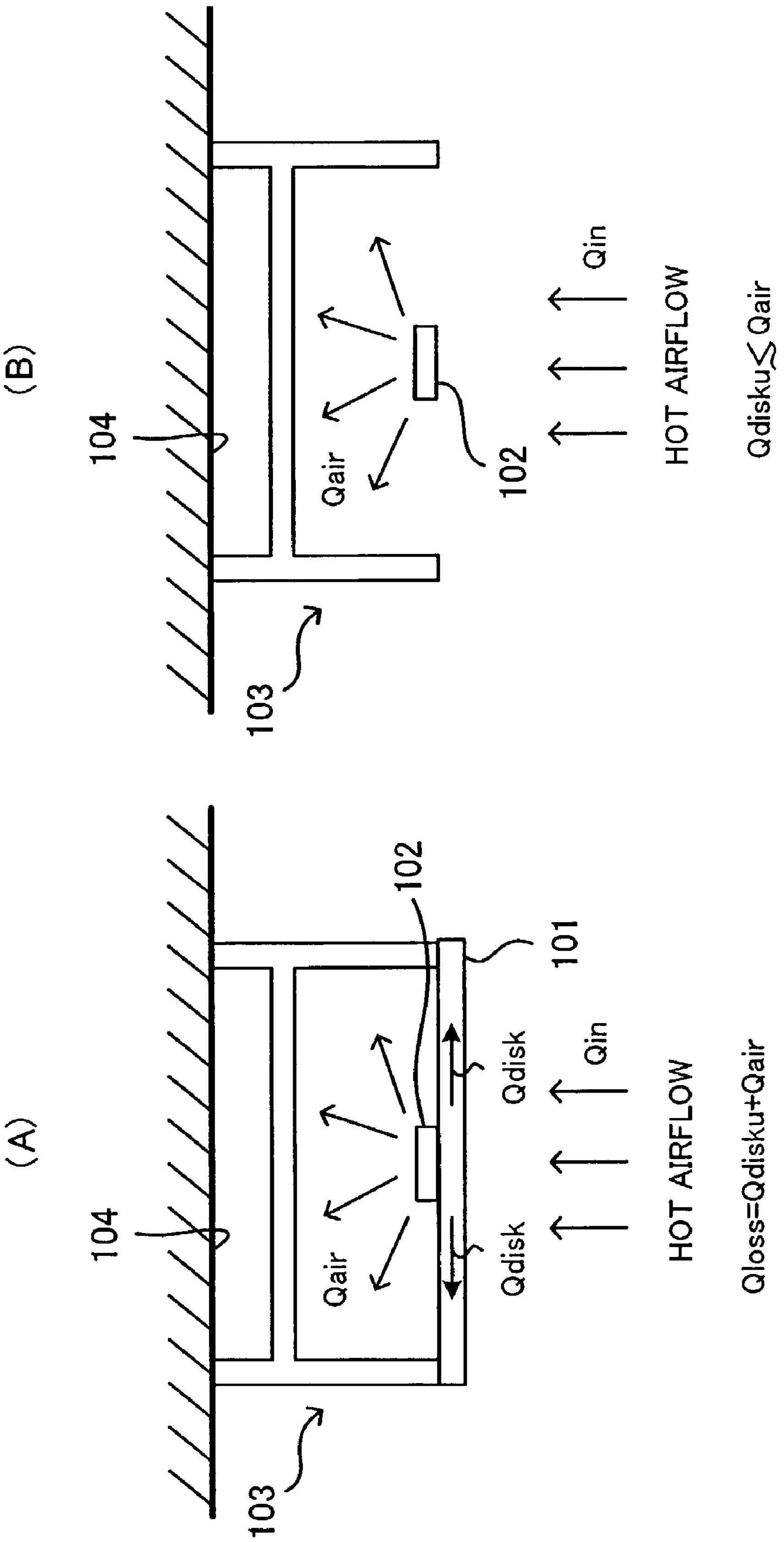
FIGS. 3A and 3B are sectional side views of the thermal relationship between the constituent components of the fire sensor of the first embodiment.
Figure 39:
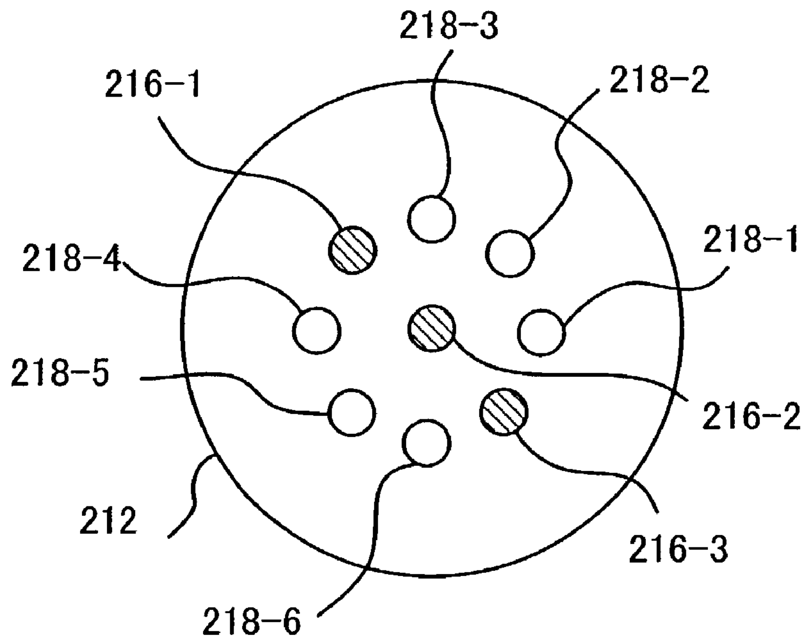
FIG. 39A is a plan view showing the fixing plate of a fire heat sensor constructed in accordance with a twenty-sixth embodiment of the present invention.
FIG. 39B is a block diagram showing the heat sensing circuit of the fire heat sensor shown in FIG. 39A.
Figure 39:
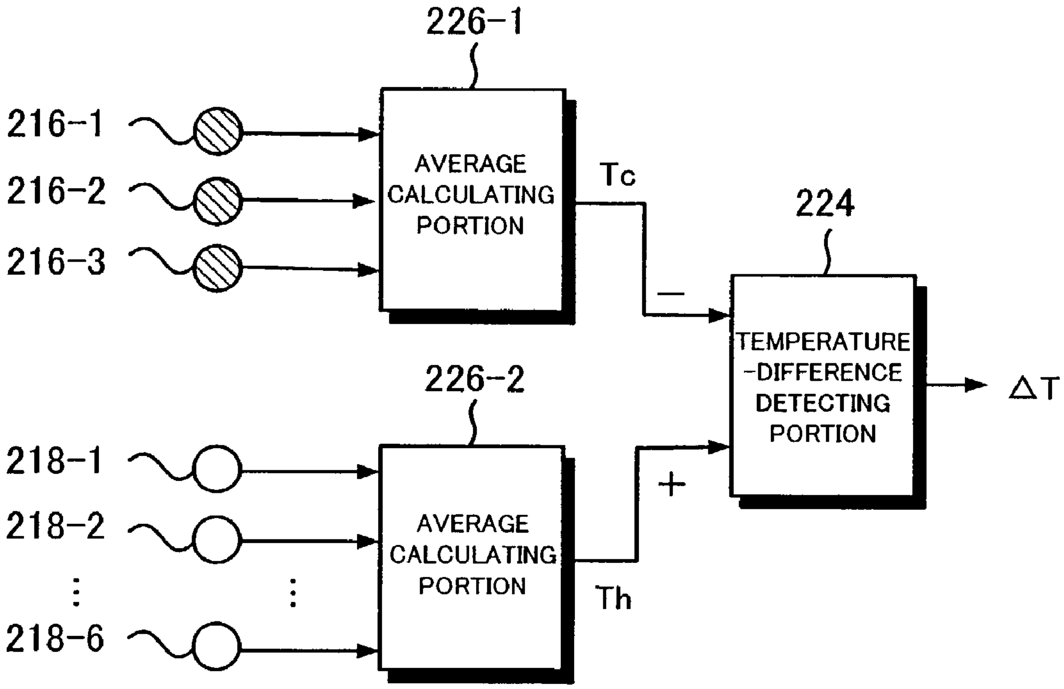

Referring to FIG. 39, there is depicted a fire heat sensor constructed in accordance with a twenty-sixth embodiment of the present invention. In FIG. 39A, 3 (three) low-temperature detecting portions 216-1 to 216-3 are disposed on a straight line, and 6 (six) high-temperature detecting portions 218-1 to 218-6 are disposed on a circle with the center low-temperature detecting portion 216-2 as the center.

A heat sensing circuit in this case is shown in FIG. 39B. A first average-value calculating portion 226-1 calculates an average value from temperatures detected by the 3 (three) low-temperature detecting portions 216-1 to 216-3. A second average-value calculating portion 226-2 calculates an average value from temperatures detected by the 6 (six) high-temperature detecting portions 218-1 to 216-6. A temperature difference ΔT between the two average values is calculated by a temperature-difference calculating portion 224. Even in the embodiment of FIG. 39, the low-temperature detecting portions and the high-temperature detecting portions may be conversely disposed.

Figure 40:
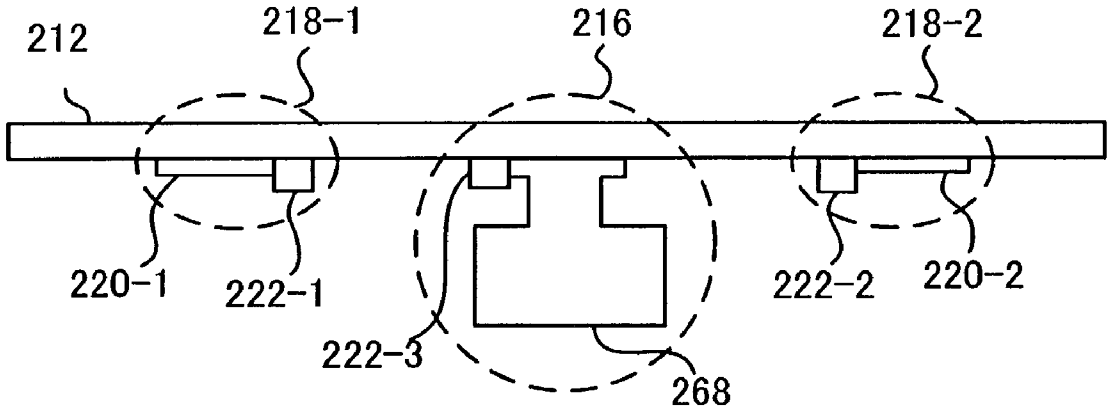
FIG. 40 is a sectional side view showing a fire heat sensor constructed in accordance with a twenty-seventh embodiment of the present invention.

Referring to FIG. 40, there is depicted a fire heat sensor constructed in accordance with a twenty-seventh embodiment of the present invention. This embodiment is characterized in that a heat collector and a heat accumulator in a low-temperature detecting portion are formed integrally with each other. In this embodiment, two high-temperature detecting portions 218-1, 218-2 are provided symmetrically with respect to a low-temperature detecting portion 216 mounted on a fixing member 212. The heat collector and heat accumulator in the low-temperature detecting portion 216 are formed as a heat collecting-accumulating element 268. This reduces the number of components and makes the sensor structurally simple.

Figure 41:
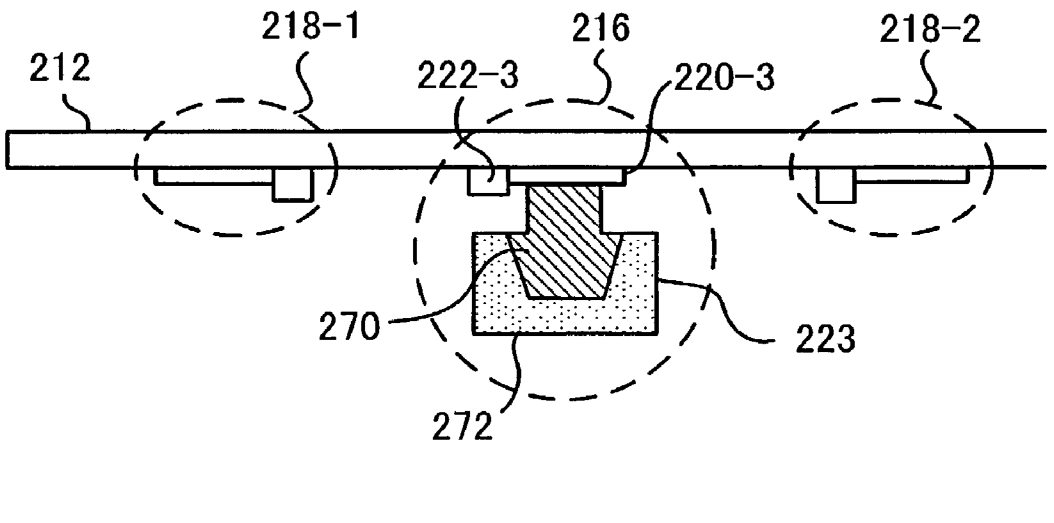
FIG. 41 is a sectional side view showing a fire heat sensor constructed in accordance with a twenty-eighth embodiment of the present invention.

Referring to FIG. 41, there is depicted a fire heat sensor constructed in accordance with a twenty-eighth embodiment of the present invention. This embodiment is characterized in that the heat accumulator of a low-temperature detecting portion is formed as a composite structure. That is, the heat accumulator 223 of a low-temperature detecting portion 216 is disposed between high-temperature detecting portions 218-1, 218-2 and consists of metal 270 and ceramic 272.

The composite member of the heat accumulator 223 is not limited to metal and ceramic. It is also possible to utilize composite materials. That is, if a material for the heat accumulator is adjusted so that the thermal diffusivity is $10^{-6}$ to $10^{-3}$ $m^2/S$, the speed of a temperature rise in the low-temperature detecting portion can be adjusted. Therefore, it is possible to enhance the operational stability (reduction in wrong fire information, etc.) of a differential heat sensor.

Figure 42:
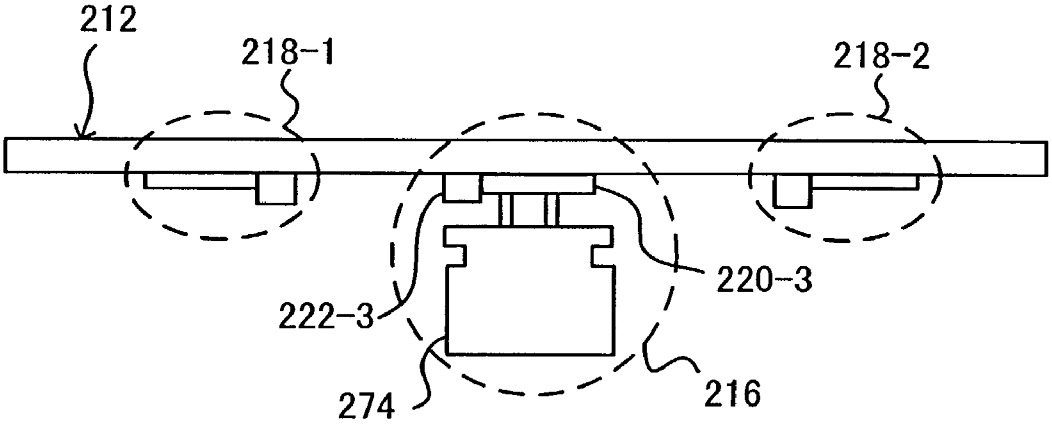
FIG. 42 is a sectional side view showing a fire heat sensor constructed in accordance with a twenty-ninth embodiment of the present invention.

Referring to FIG. 42, there is depicted a fire heat sensor constructed in accordance with a twenty-ninth embodiment of the present invention. In this embodiment, an aluminum electrolytic capacitor is used in the heat accumulator of a low-temperature detecting portion. That is, the heat collector 220-3 of a low-temperature detecting portion 216 formed on a fixing member 212 is connected with an aluminum electrolytic capacitor 274 which has a thermal diffusion characteristic and capacity enough to function as a heat accumulator.

Figure 43:
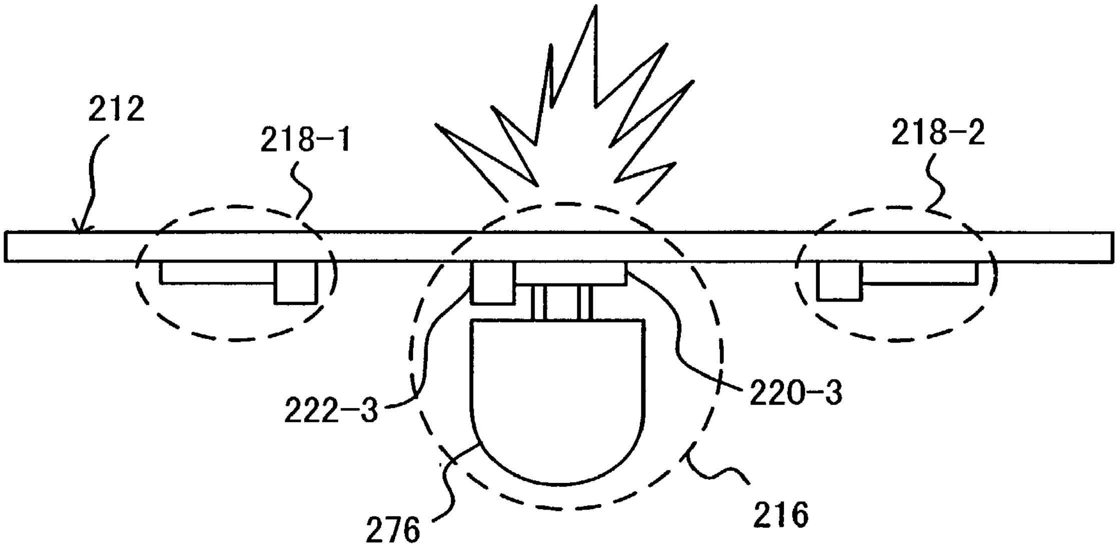
FIG. 43 is a sectional side view showing a fire heat sensor constructed in accordance with a thirtieth embodiment of the present invention.

Referring to FIG. 43, there is depicted a fire heat sensor constructed in accordance with a thirtieth embodiment of the present invention. In this embodiment, an LED is used in the heat accumulator of a low-temperature detecting portion. The heat collector 220-3 of a low-temperature detecting portion 216 is connected with an LED 276. In addition to the functions of a heat accumulator, the LED 276 may be used as an indicating element which is driven when a fire is detected.

The LED 276 is disposed on the inside surface of the fixing member 212, but the fixing member 212 is sufficiently thin. Therefore, if the LED 276 is lit when a fire is detected, the light passes through the fixing member 212 and the warning operation of the fire sensor can be found from the outside by the lighting or blinking of the LED 276.

While each of the above-described embodiments is used as a single fire heat sensor, it may be used as a composite fire sensor by providing the fire heat sensor of the present invention in the existing photoelectric smoke sensors.

As set forth in the embodiments shown in FIGS. 17 through 43, the present invention has the following advantages:

According to the fire heat sensor of the present invention, sensitivity can be made constant independently of the direction of a hot airflow by adding or averaging temperature differences detected at least 2 axial symmetrical positions. Thus, a fire can be detected by differential heat sensing which is independent of the direction of a hot airflow and has high reliability.

(C) Embodiments of a Fire Sensor with an Outer Cover

Furthermore, a description will be given of embodiments of the present invention applied to a fire sensor that has an outer cover for protecting a temperature detecting element.

Figure 44:
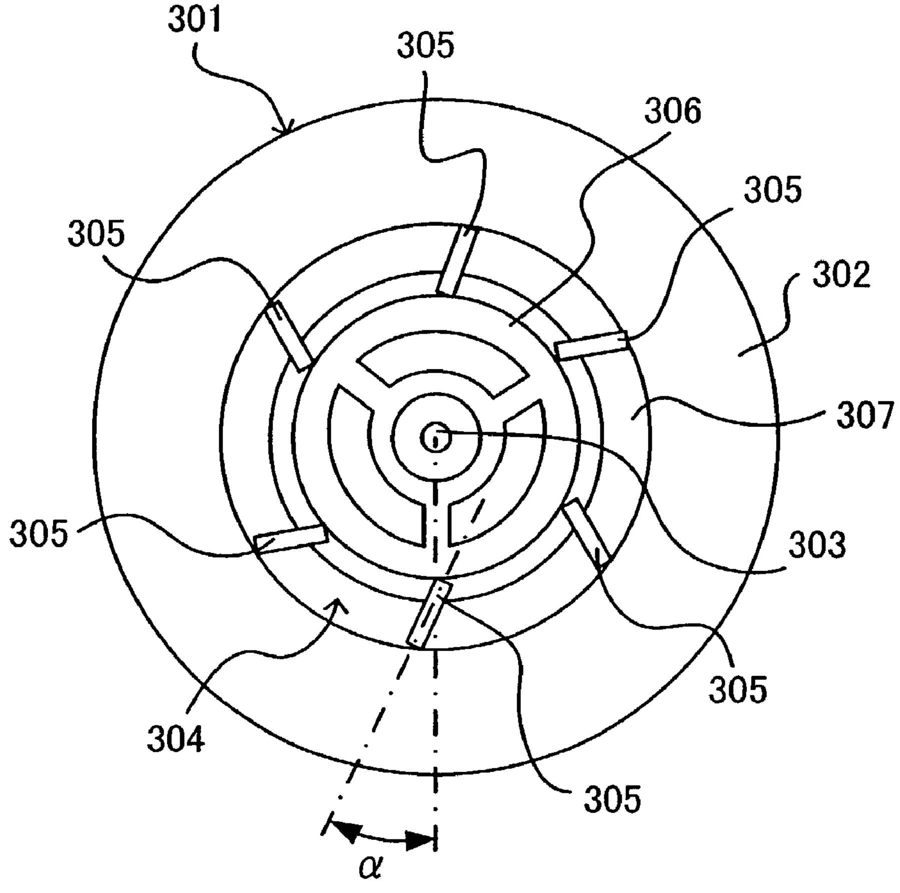
FIG. 44A is a plan view of a fire sensor constructed in accordance with a thirty-first embodiment of the present invention.
FIG. 44B is a side view of the fire sensor shown in FIG. 44A.
Figure 44:
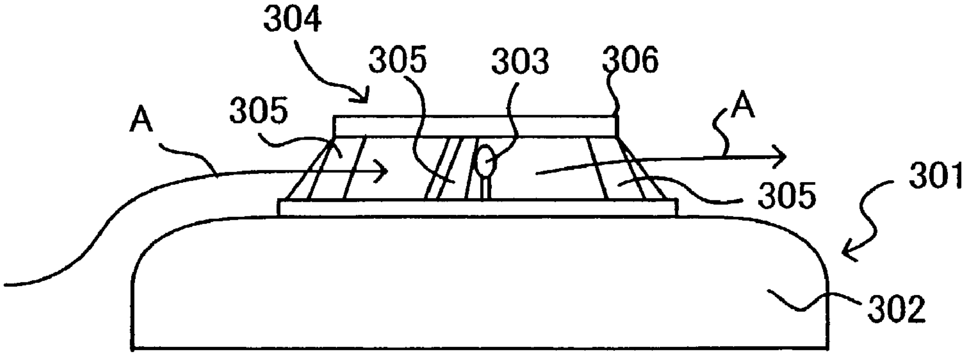

Referring now to FIG. 44, there is depicted a fire sensor 301 constructed in accordance with a thirty-first embodiment of the present invention. The fire sensor 301 of this embodiment includes a heat detecting element 303, which protrudes toward the center of the lower portion of a sensor main body 302 mounted, for example, on a ceiling. The heat detecting element 303 consists of a thermistor. In addition to a thermistor, the heat detecting element 303 may consist of a temperature detecting element such as a transistor, a diode, a thermocouple, etc.

The heat detecting element 303 is provided with an outer cover 304 for protection. The outer cover 304 has a plurality of plate fins 305 which are disposed on a mounting plate 307 on the side of the sensor main body 302 so as to surround the heat detecting element 303. In this embodiment, 6 (six) plate fins 305 are disposed to protrude from the sensor main body 302.

As illustrated in FIG. 44, each plate fin 305 is disposed obliquely at a predetermined offset angle α to a center line passing through the center of the outer cover 304, and is erected approximately perpendicular to the sensor main body 302. The angle α of the plate fin 305 is in a range of about 20 to 30 degrees to the center line passing through the center of the outer cover 304.

The outer cover 304 further has an airflow introducing plate 306 at the upper ends of the plate fins 305. The airflow introducing plate 306 is disposed approximately parallel to the sensor main body 302. In this embodiment, the air flow introducing plate 306 consists of two rings interconnected at three points.

Figure 45:
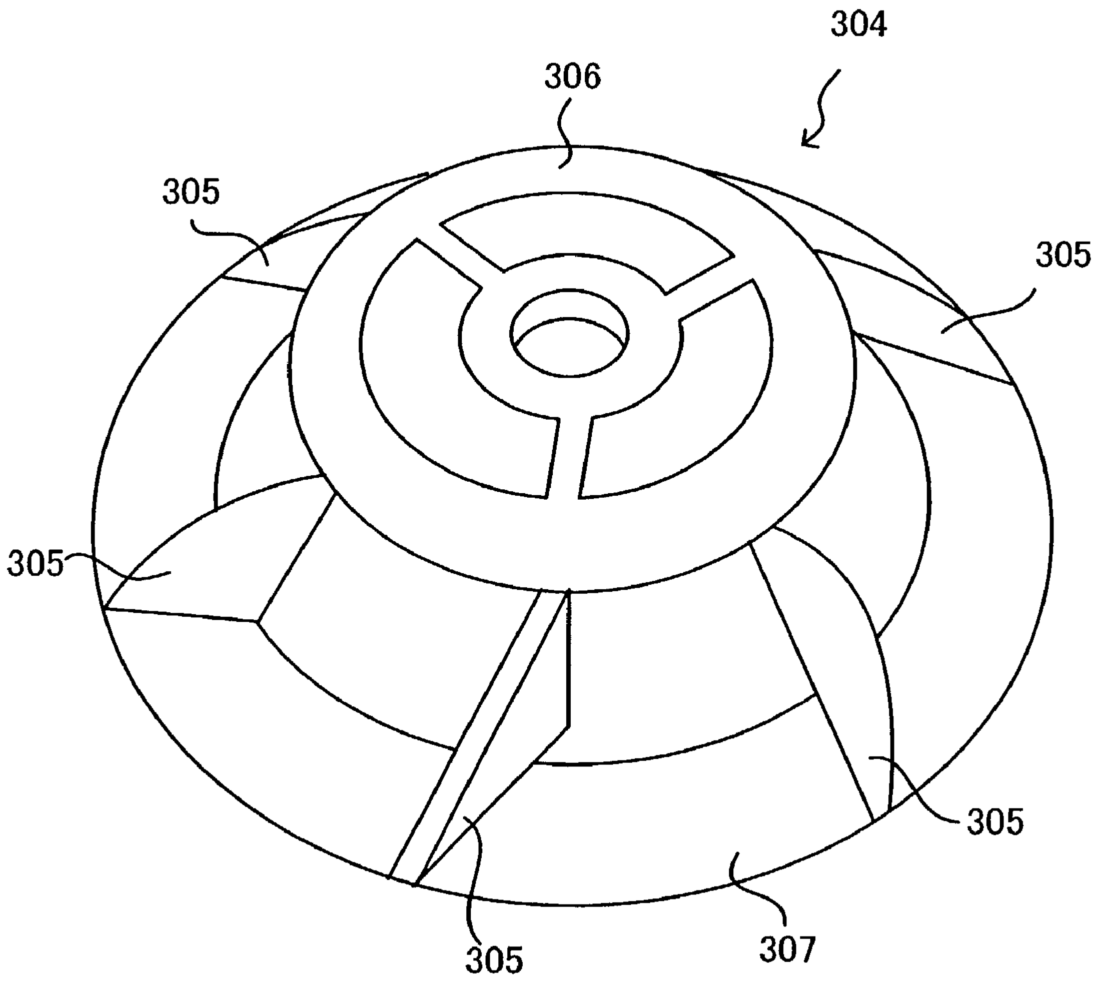
FIG. 45 is a perspective view of the outer cover shown in FIGS. 44A and 44B.

FIG. 45 shows a perspective view of the outer cover 304 shown in FIG. 44. Between the mounting plate 307 on the side of the sensor main body 302 and the airflow introducing plate 306, a plurality of plate fins 305 are disposed at a predetermined off set angle α to the cover center so that a hot air flow generated by a fire can be efficiently introduced to the heat detecting element 303 disposed within the cover 304.

Figure 46:
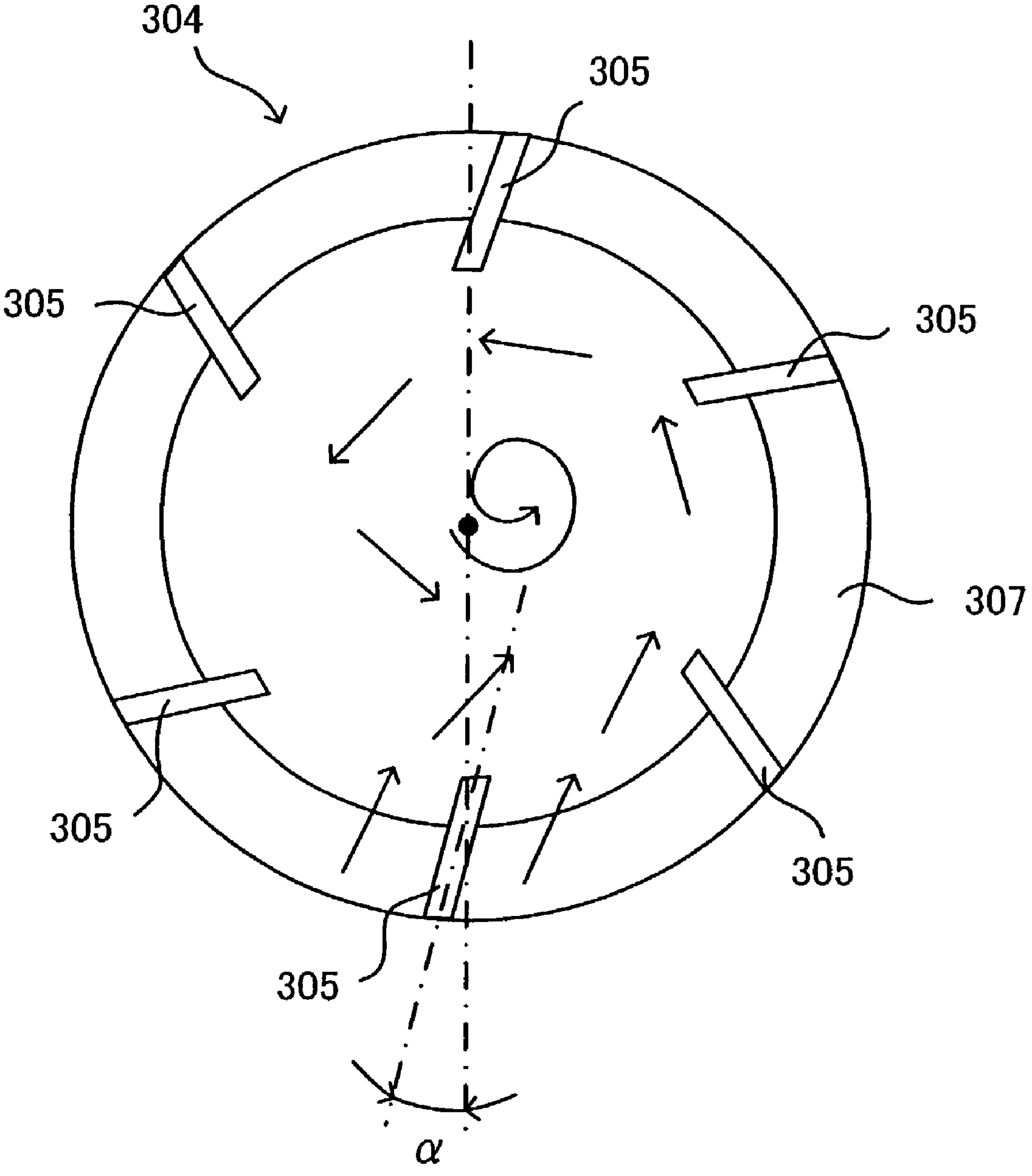
FIG. 46 is a plan view used to explain how a hot airflow generated by a fire is introduced into the outer cover.

FIG. 46 illustrates how a hot airflow is introduced into the outer cover 304, the airflow introducing plate 306 having been removed to show the movement of the hot airflow within the cover 304. In the figure, assuming that a hot airflow generated by a fire occurs as indicated by arrows, this hot airflow enters into the outer cover 304 along the plate fins 305 which are situated in the direction of the hot airflow. Since the plate fins 305 have an offset angle α of about 20 to 30 degrees to the center of the cover 304, the hot airflow is introduced in a direction offset slightly from the cover center by the plate fins 305. The hot airflow introduced within the outer cover 304 strikes the inner edge of each plate fin 305 and flows like a vortex toward the cover center. Since the hot air flow introduced within the outer cover 304 is collected around the cover center, the sensitivity of the heat detecting element 303 installed at the central portion of the cover 304 can be enhanced.

Figure 47:
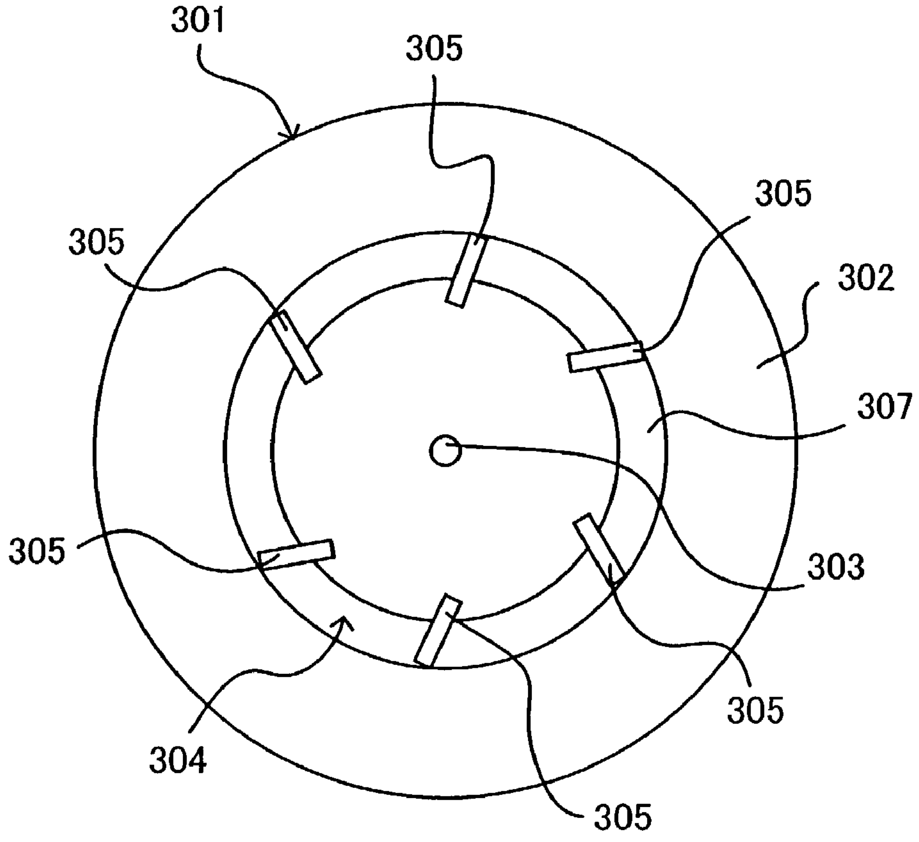
FIG. 47A is a plan view of a fire sensor constructed in accordance with a thirty-second embodiment of the present invention.
FIG. 47B is a side view of the fire sensor shown in FIG. 47A.
Figure 47:
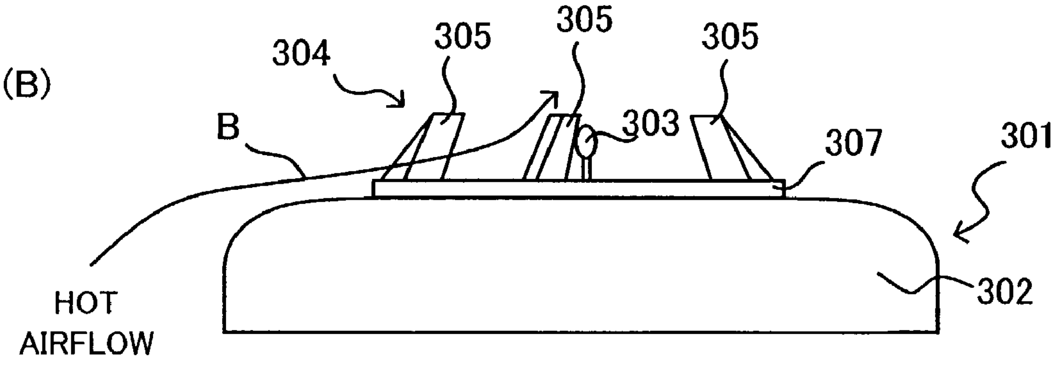

Referring to FIG. 47, there is depicted a fire sensor 301 constructed in accordance with a thirty-second embodiment of the present invention. The thirty-second embodiment is similar to the thirty-first embodiment of FIG. 44, but different in that it does not include the airflow introducing plate 306 of the outer cover 304 of the embodiment of FIG. 44. The fire sensor 301 of FIG. 47 includes a heat detecting element 303 that protrudes toward the center of the lower portion of a sensor main body 302 mounted, for example, on a ceiling. The fire sensor 301 further includes an outer cover 304 for protecting the detecting element 303. The outer cover 304 has a plurality of plate fins 305 which are disposed on a mounting plate 307 on the side of the sensor main body 302 so as to surround the heat detecting element 303. In this embodiment, 6 (six) plate fins 305 are disposed. As with the embodiment of FIG. 44, each plate fin 305 has a predetermined offset angle α to a center line passing through the center of the outer cover 304, and is erected approximately perpendicular to the sensor main body 302.

Figure 48:
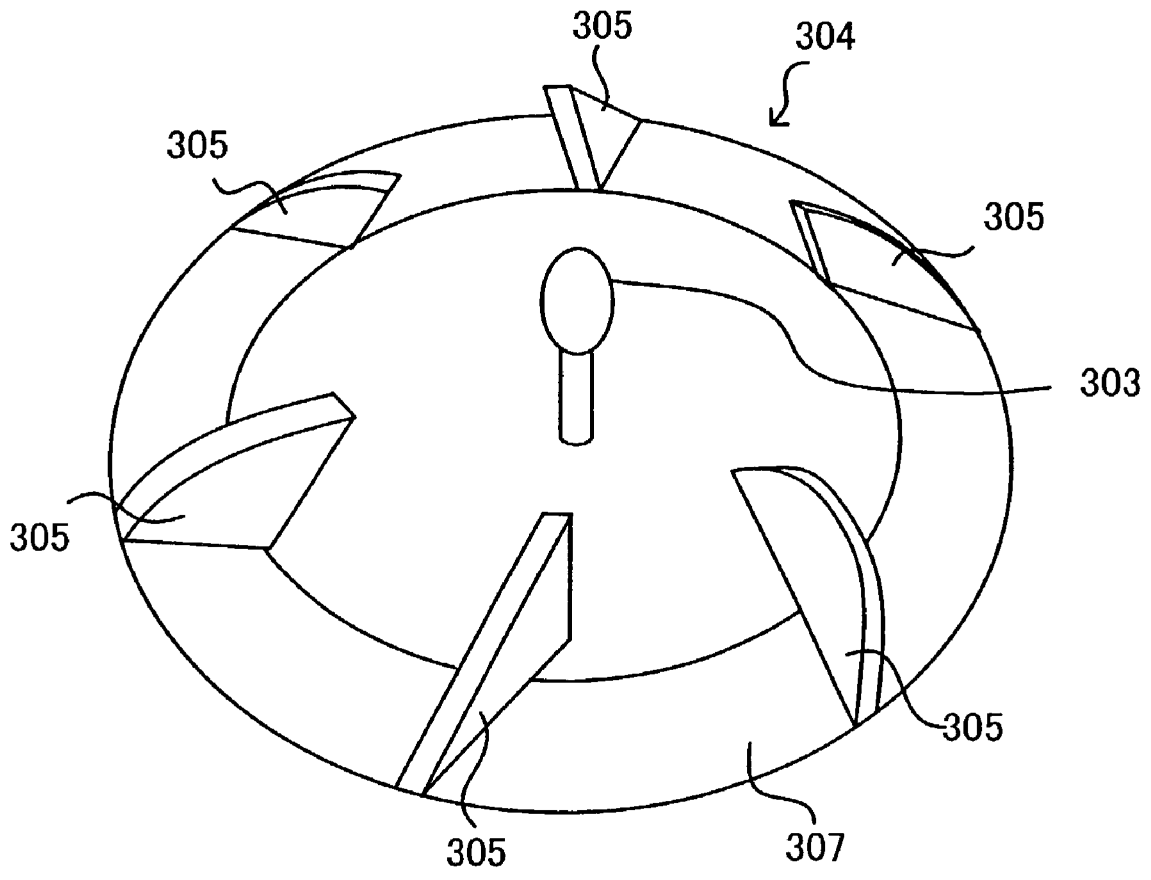
FIG. 48 is a perspective view of the outer cover shown in FIGS. 47A and 47B.

FIG. 48 shows a perspective view of the outer cover 304 of the embodiment of FIG. 47. As with the thirty-first embodiment, if a hot airflow is generated by a fire, the hot airflow is introduced at an offset angle α to the center of the heat detecting element 303 by the plate fins 305. Therefore, as in the embodiment shown in FIG. 46, the introduced hot airflow is collected around the heat detecting element 303, and the sensitivity of the heat detecting element 303 can be enhanced.

Figure 49:
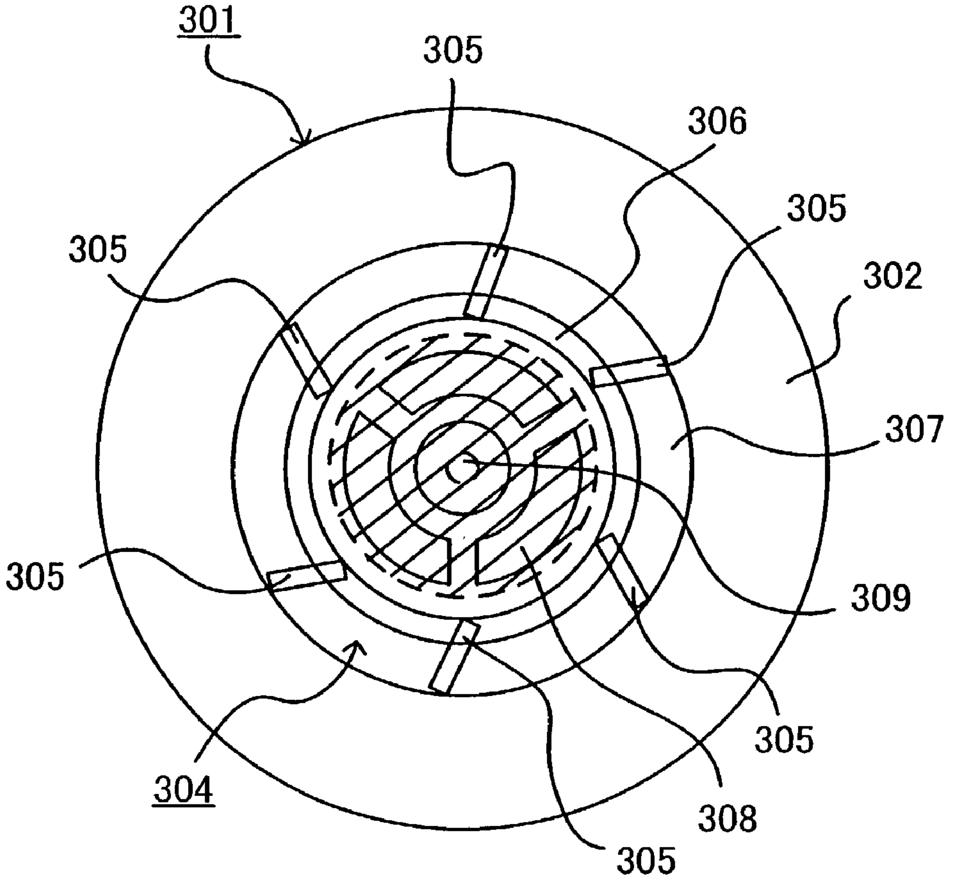
FIG. 49A is a plan view of a fire sensor constructed in accordance with a thirty-third embodiment of the present invention.
FIG. 49B is a side view of the fire sensor shown in FIG. 49A.
Figure 49:
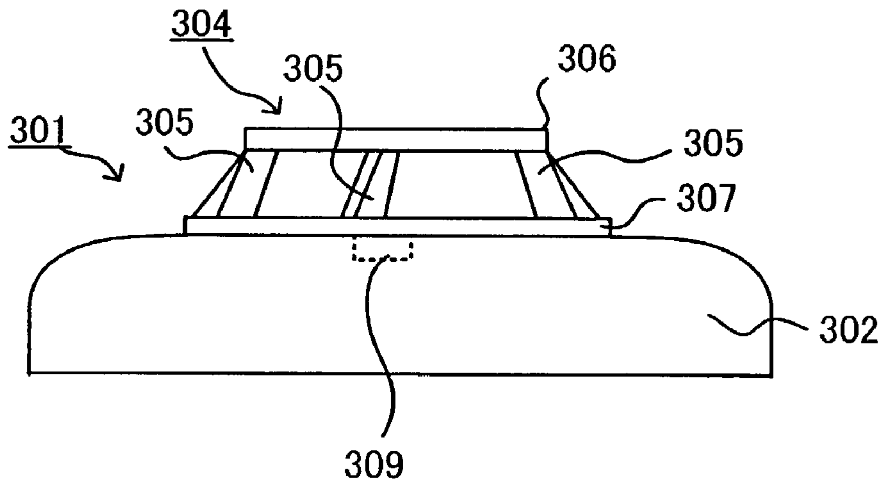

Referring to FIG. 49, there is depicted a fire sensor 301 constructed in accordance with a thirty-third embodiment of the present invention. This embodiment is similar to the embodiment of FIG. 44, but different in that the sensor main body has a heat sensing plate.

In FIG. 49, the main body 302 of the fire sensor 301 has a heat sensing plate 308 at the central portion thereof, as shown by oblique lines. The heat sensing plate 308 consists, for example, of a metal plate with high heat conductivity and serves as a heat collecting plate with respect to a hot airflow. The inside of the heat sensing plate 308 is fixed to a heat detecting element 309 such as a thermistor. When the heat sensing plate 308 is exposed to a hot airflow, the temperature of the heat sensing plate 308 is detected by the heat detecting element 309.

The fire sensor 301 of the thirty-third embodiment, as in the embodiment of FIG. 44, includes an outer cover 304. The outer cover 304 has a plurality of plate fins 305 (e.g., 6 (six) plate fins), which are disposed to surround the heat detecting element 309. The plate fins 305 is erected in amounting plate 307 so that they have a predetermined offset angle α (of 20 to 30 degrees) to the cover center. The outer cover 304 further has an airflow introducing plate 306 that is mounted on the upper ends of the plate fins 305. The airflow introducing plate 306 is disposed approximately parallel to the sensor main body 302.

If the fire sensor 301 of the thirty-third embodiment employing the heat sensing plate 308 of FIG. 49 is exposed to a hot airflow generated by a fire, the hot airflow is introduced into the outer cover 304 by the plate fins 305 disposed at a predetermined offset angle α to the cover center, as shown in FIG. 46. Because of this, a vortical hot airflow is generated within the outer cover 304 and flows toward the cover center. In the embodiment of FIG. 49, the heat sensing plate 308 is large enough to sense the vortical hot airflow within the outer cover 304. Because of this, the heat sensing plate 308 is exposed sufficiently to the hot airflow and rises in temperature. Therefore, a high sensitivity to detection, which efficiently follows a rise in temperature of a hot airflow, can be obtained by the heat detecting element 309 held in direct contact with the heat sensing plate 308.

Figure 50:
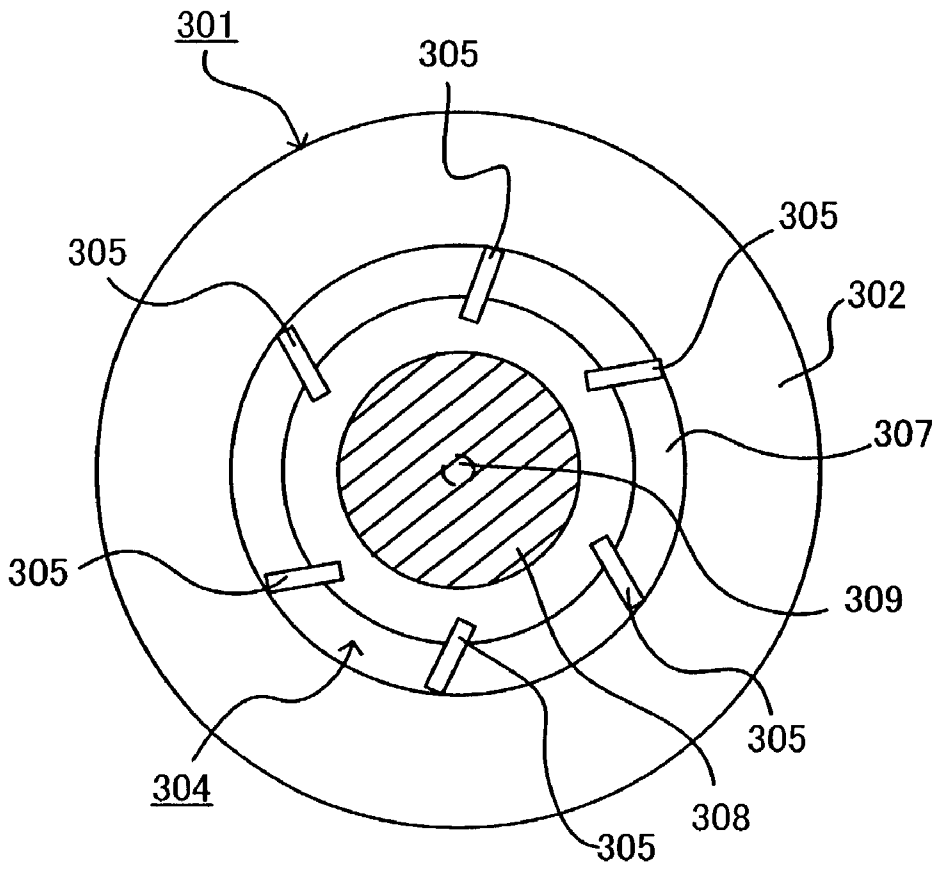
FIG. 50A is a plan view of a fire sensor constructed in accordance with a thirty-fourth embodiment of the present invention.
FIG. 50B is a side view of the fire sensor shown in FIG. 50A.
Figure 50:
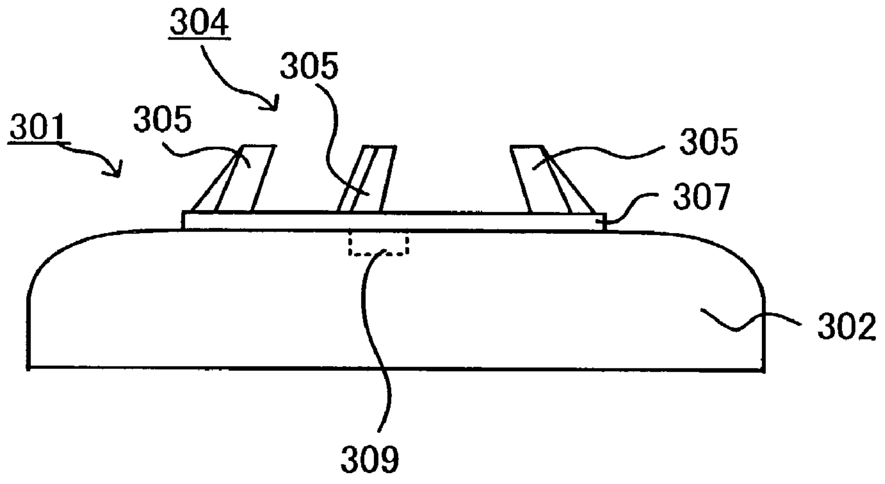

Referring to FIG. 50, there is depicted a fire sensor 301 constructed in accordance with a thirty-fourth embodiment of the present invention. The this embodiment is similar to the embodiment of FIG. 49, but different in that it does not include the air introducing plate 306 of the outer cover 304 of the thirty-third embodiment.

As in the embodiment of FIG. 44, the outer cover 304 having no airflow introducing plate generates a vortical flow that collects at the cover center when exposed to a hot airflow generated by a fire, as shown in FIG. 46. The heat sensing plate 308 is able to receive thermal energy from the vortical hot airflow in a wide range. Therefore, the temperature of the hot airflow can be efficiently detected by the heat detecting element 309.

In the above-described embodiments, each of the fire sensors is equipped with the single heat sensing element 303 or 309. And the temperature detected by the heat sensing element 303 or 309 is compared with a threshold temperature that is used to judge a fire. When the detected temperature exceeds the threshold temperature, a fire detection signal is output to issue an alarm.

In addition to the above-described type, there is a fire sensor provided with a pair of heat detecting elements to judge a fire from the difference between temperatures detected by the two elements. One of the two elements has high sensitivity to a hot airflow, while the other has low sensitivity.

Figure 51:
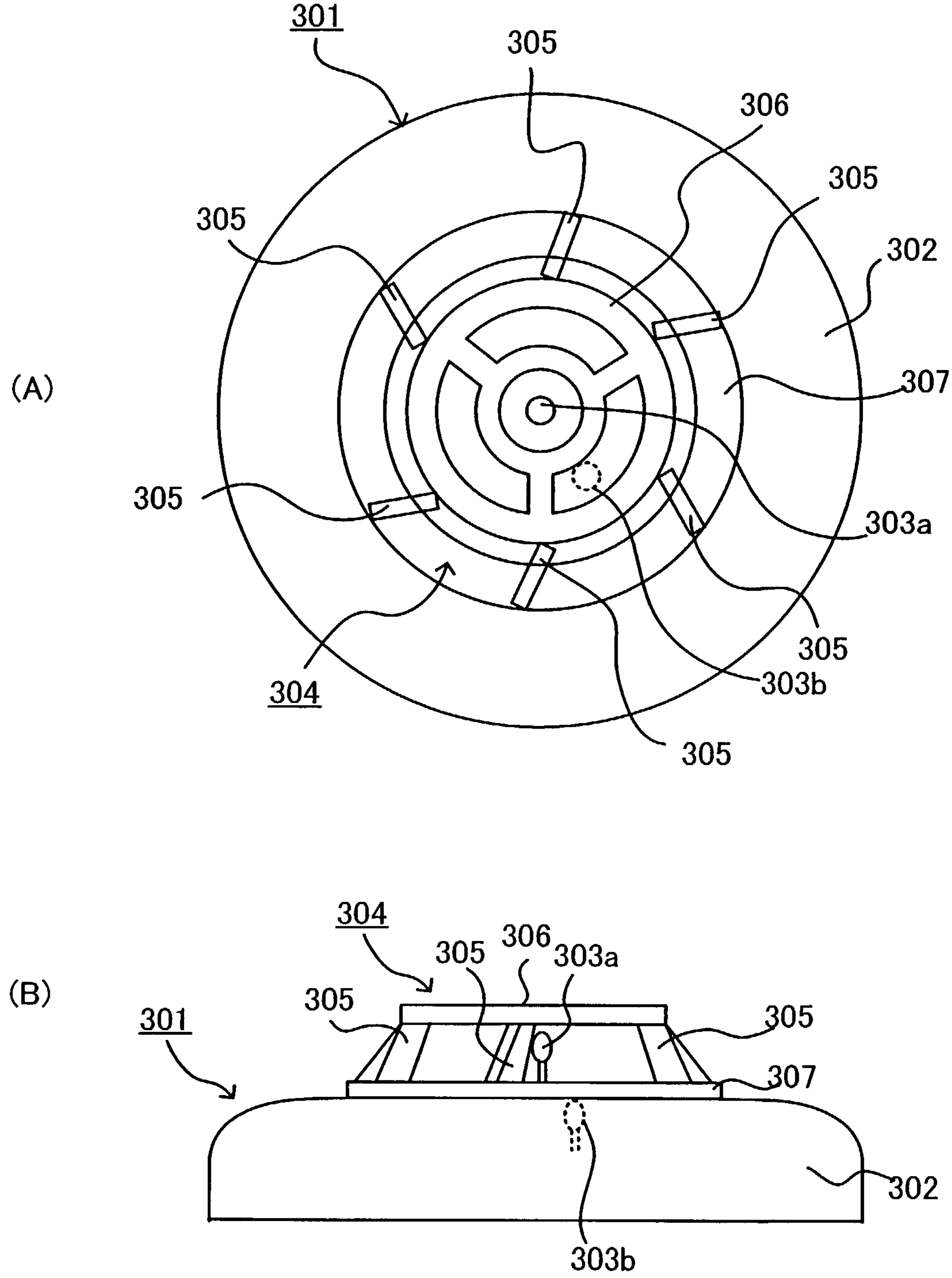
FIG. 51A is a plan view of a fire sensor constructed in accordance with a thirty-fifth embodiment of the present invention.
FIG. 51B is a side view of the fire sensor shown in FIG. 51A.

Referring to FIG. 51, there is depicted a fire sensor 301 constructed in accordance with a thirty-fifth embodiment of the present invention. This embodiment is similar to the embodiment of FIG. 44, but different in that it performs the above-described differential heat sensing.

The fire sensor 301 includes a high-temperature detecting element 303*a* and a low-temperature detecting element 303*b*. The high-temperature detecting element 303*a* protrudes from a sensor main body 302 and is disposed at a position that is exposed directly to a hot airflow. The low-temperature detecting element 303*b* is disposed at a position, which is not exposed directly to a hot airflow, such as a position within the sensor main body 302.

The fire sensor 301 of FIG. 51 further includes an outer cover 304, which is provided so as to protect the high-temperature detecting element 303*a* protruding from the sensor main body 302. When the fire sensor 301 is exposed to a hot airflow such as that shown in FIG. 46, a vertical hot airflow which flows toward the cover center is generated by a plurality of plate fins 305 having the above-described offset angle α, and an airflow introducing plate 306. Therefore, the temperature of the hot airflow can be efficiently detected by the high-temperature detecting element 303*a*.

In the low-temperature detecting element 303*b* installed within the sensor main body 302, a great time lag occurs when the temperature of a hot airflow generated by a fire rises sharply.

Therefore, in the above-described differential heat sensing, a temperature difference (ΔT=Th−Tc) between the temperature Th detected by the high-temperature detecting element 303*a* and the temperature Tc detected by the low-temperature detecting element 303*b* is detected. When this temperature difference ΔT exceeds a predetermined threshold value which is judged to be a fire, a fire detection signal is output to issue an alarm.

When the temperature of a hot airflow generated by a fire rises sharply, the temperature difference ΔT is obtained as a great value. However, when temperature rises slowly, the temperature difference ΔT rises slowly and is saturated at a certain value. Therefore, there can be realized a differential heat sensor for discriminating a temperature difference caused by an ordinary change in temperature from the temperature difference ΔT caused by a fire.

Figure 52:
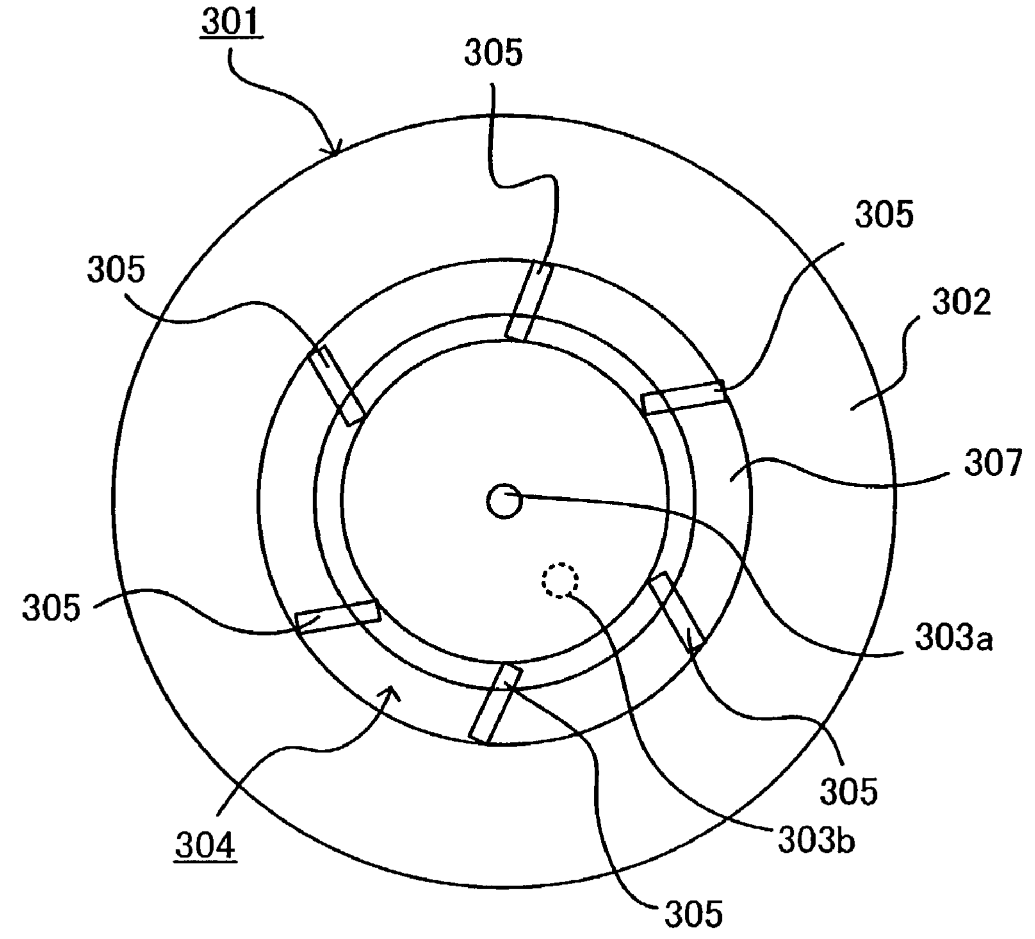
FIG. 52A is a plan view of a fire sensor constructed in accordance with a thirty-sixth embodiment of the present invention.
FIG. 52B is a side view of the fire sensor shown in FIG. 52A.
Figure 52:
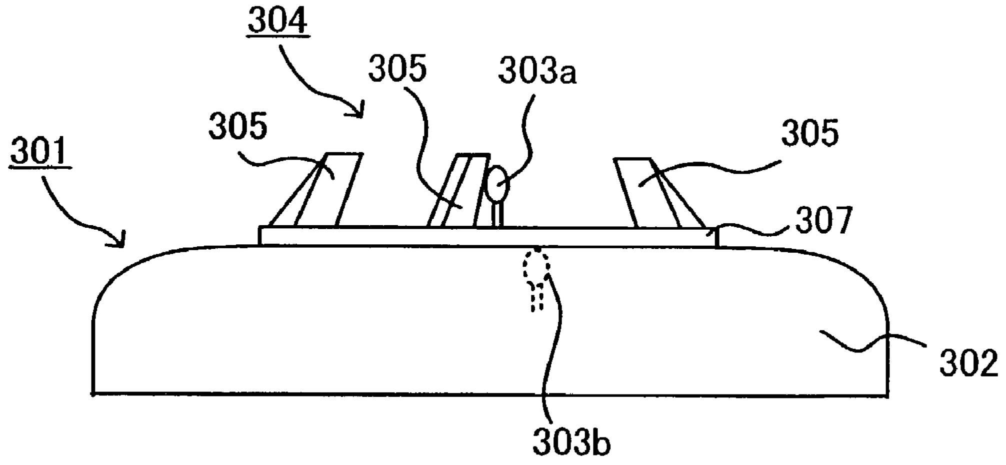

Referring to FIG. 52, there is depicted a fire sensor 301 constructed in accordance with a thirty-sixth embodiment of the present invention. This embodiment is similar to the embodiment of FIG. 51, but different in that it does not include the air introducing plate 306 of the outer cover 304 of the embodiment of FIG. 51.

As in the embodiment of FIG. 51, a hot airflow generated by a fire is introduced so that it collects around a high-temperature detecting element 303*a*. Therefore, the temperature of the hot airflow is efficiently detected by the high-temperature detecting element 303*a*. In addition, based on the temperature difference ΔT between the temperature detected by the high-temperature detecting element 303*a* and the temperature detected by a low-temperature detecting element 303*b*, a fire can be judged.

Figure 53:
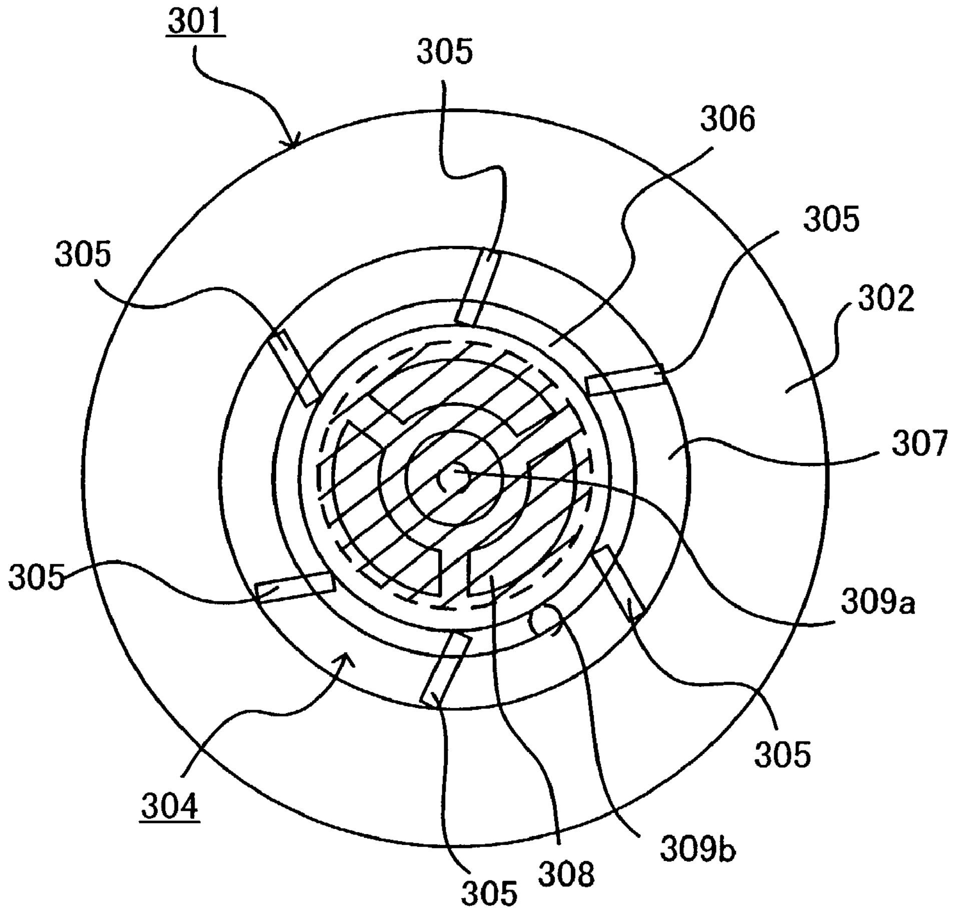
FIG. 53A is a plan view of a fire sensor constructed in accordance with a thirty-seventh embodiment of the present invention.
FIG. 53B is a side view of the fire sensor shown in FIG. 53A.
Figure 53:
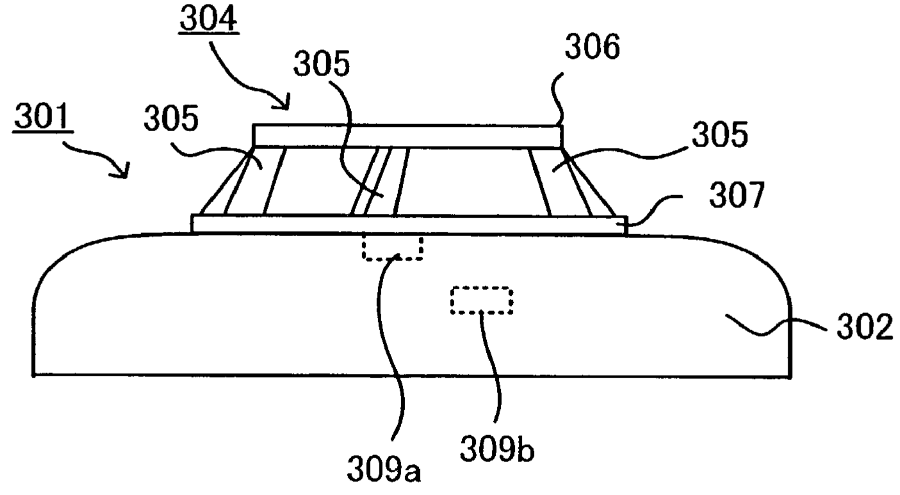

Referring to FIG. 53, there is depicted a fire sensor 70 constructed in accordance with a thirty-seventh embodiment of the present invention. This embodiment is similar to the embodiment of FIG. 51 performing differential heat sensing, but different in that a sensor main body 302 is provided with a heat sensing plate 308.

The under side of the heat sensing plate 308 is fixed to a high-temperature detecting element 309*a* such as a thermistor. A low-temperature detecting element 309*b* is disposed within the sensor main body 302 so that it is thermally separated from the heat sensing plate 308. An outer cover 304, as with the embodiment of FIG. 51, is equipped with a plurality of plate fins 305 and an airflow introducing plate 306.

Figure 54:
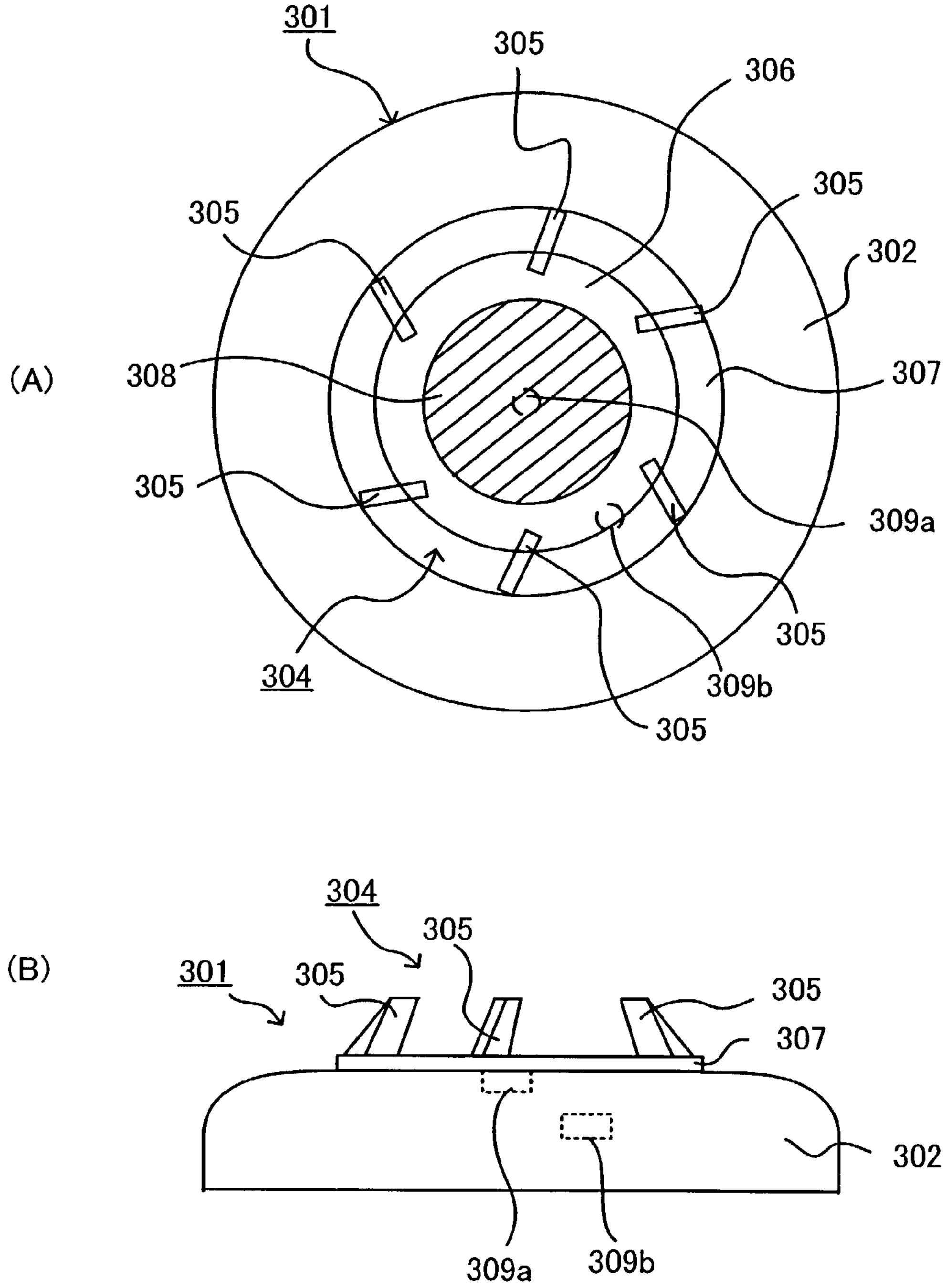
FIG. 54A is a plan view of a fire sensor constructed in accordance with a thirty-eighth embodiment of the present invention.
FIG. 54B is a side view of the fire sensor shown in FIG. 54A.

Referring to FIG. 54, there is depicted a fire sensor 80 constructed in accordance with a thirty-eighth embodiment of the present invention. This embodiment is similar to the embodiment of FIG. 53, but different in that it does not include the airflow introducing plate 306 of the outer cover 304 of the embodiment of FIG. 53. The remaining structure is the same as the embodiment of FIG. 44.

Figure 55:
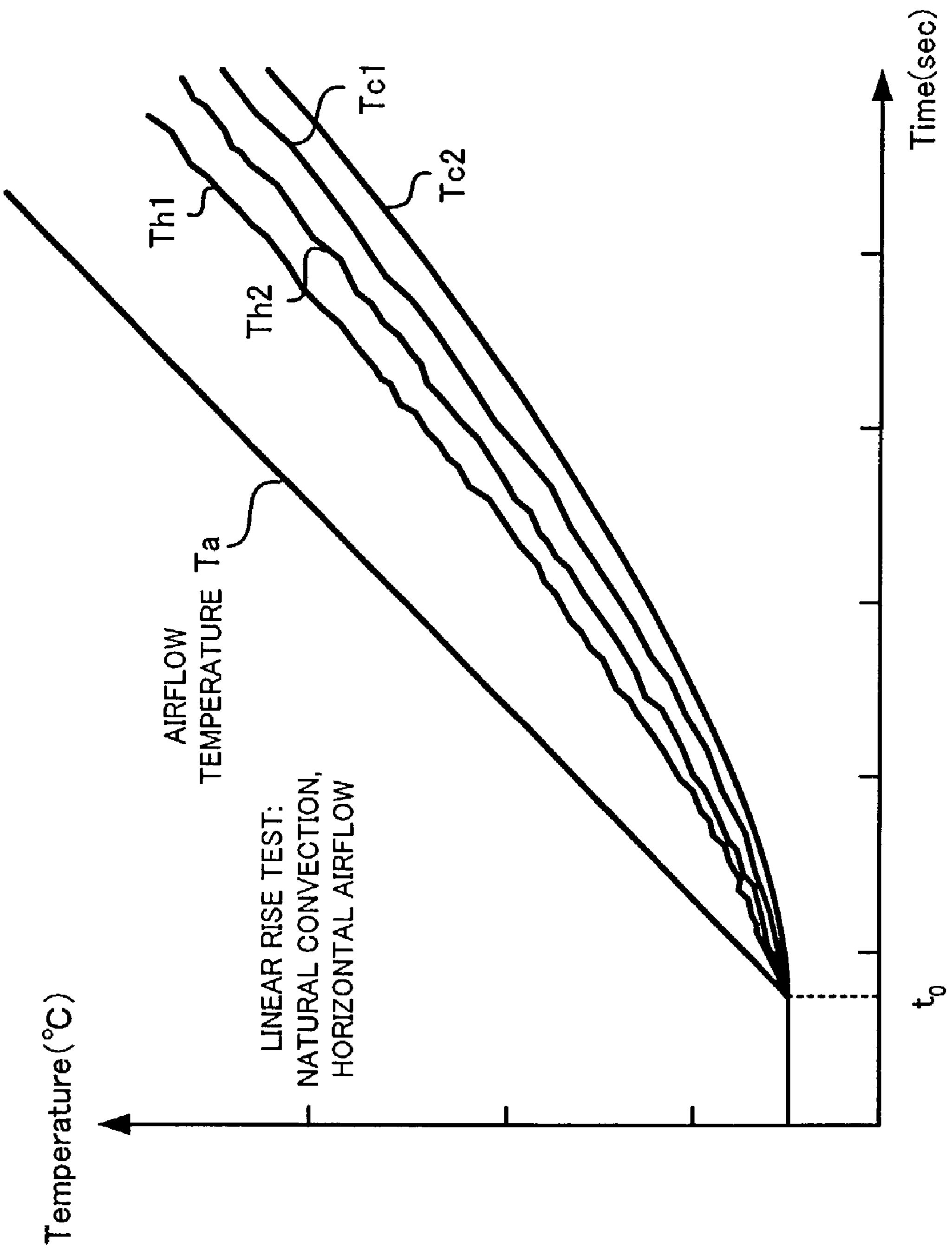
FIG. 55 is a characteristic diagram showing how the temperature of the heat detecting elements in the thirty-seventh and thirty-eighth embodiments rises.
Figure 56:
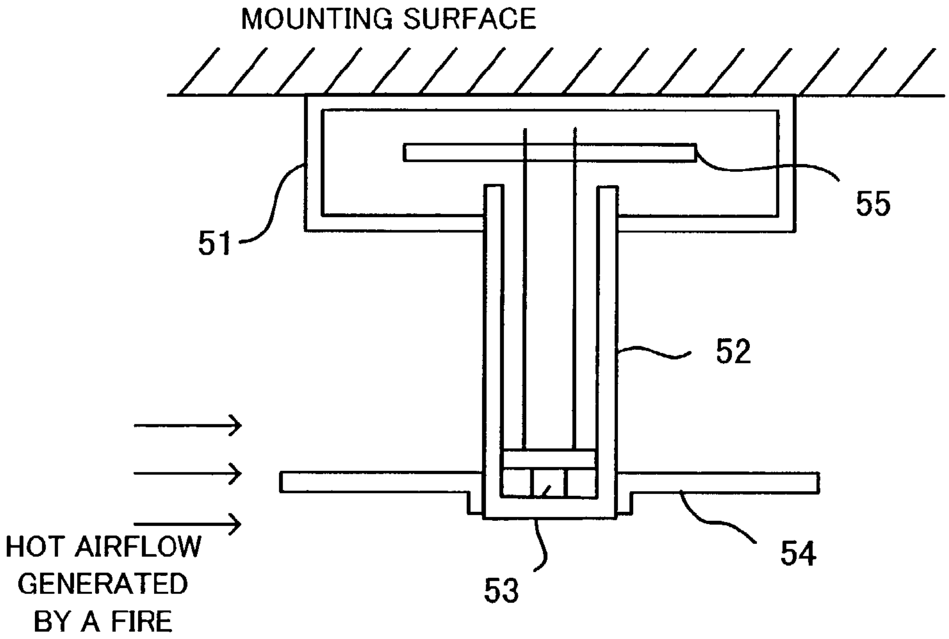
FIG. 56 is a sectional side view showing a prior art fire sensor.
Figure 57:
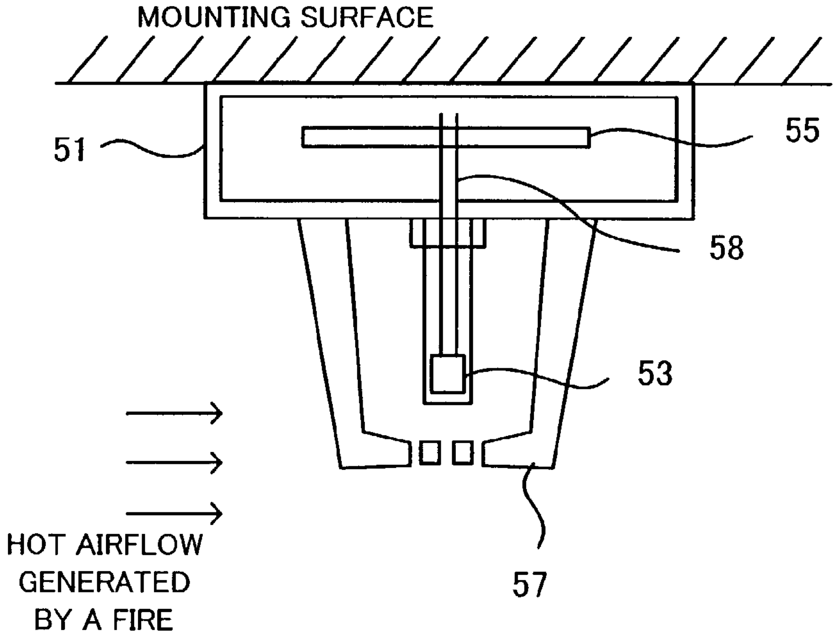
PRIOR ART FIG.57
FIG. 57 is a sectional side view showing another prior art fire sensor.
Figure 58:
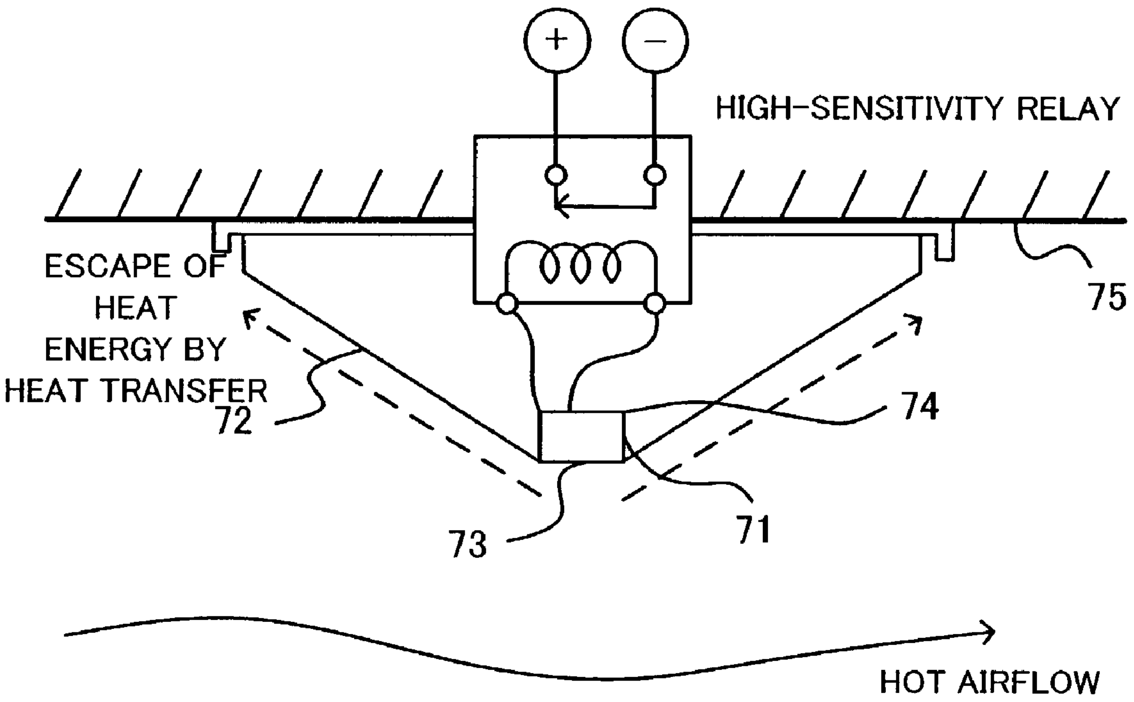
FIG. 58 is a sectional side view showing a prior art thermocouple type heat sensor.
Figure 59:
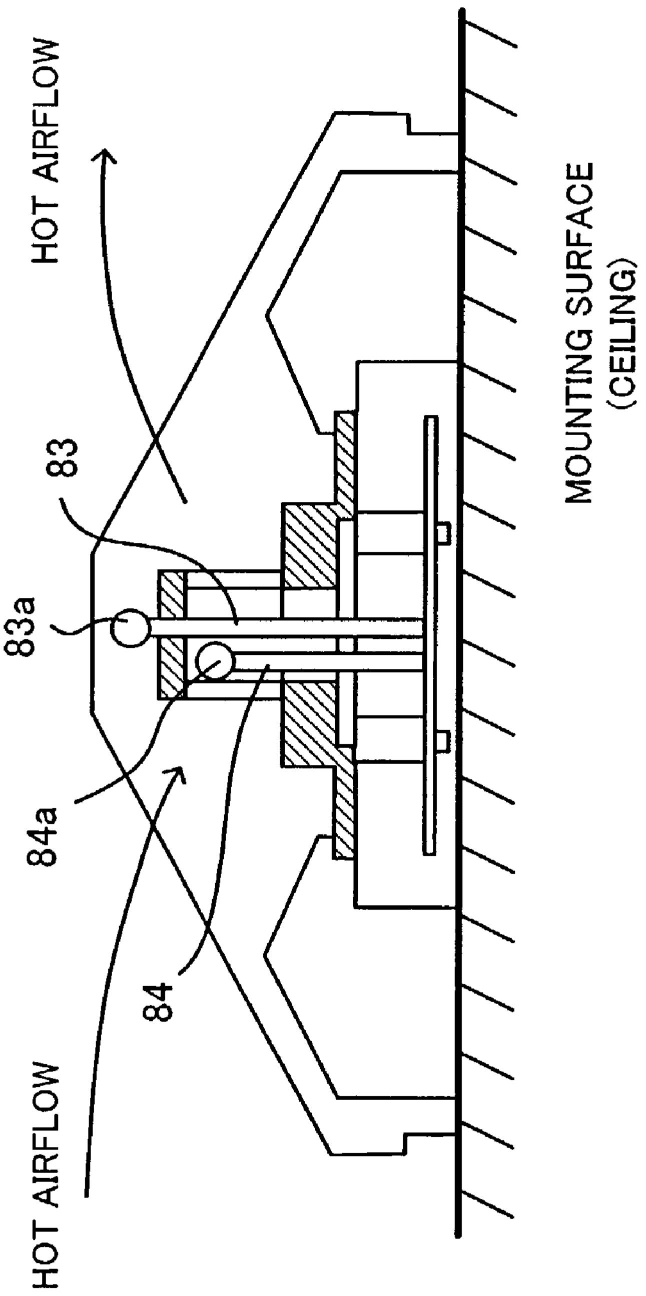
FIG. 59 is a sectional side view showing a prior art heat sensor with two thermistors.
Figure 60:
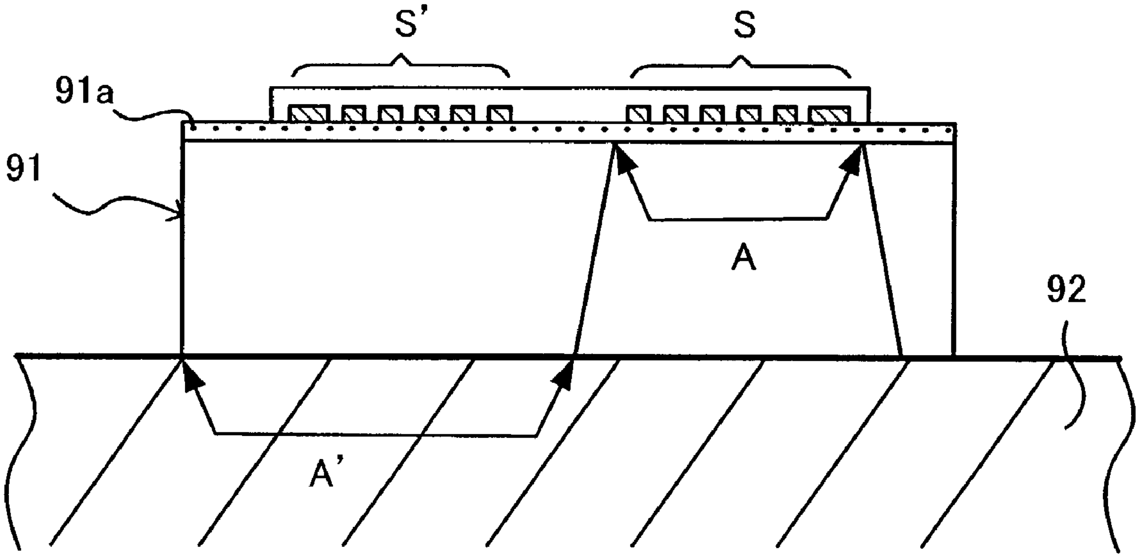
FIG. 60 is a sectional side view of a prior art heat sensor employing a fine machining technique.

FIG. 55 shows the temperature characteristics of the high-temperature detecting element 309*a* and low-temperature detecting element 309*b* of the embodiments of FIGS. 53 and 54 in the case where airflow temperature $T_a$ is linearly increased.

In FIG. 55, airflow temperature $T_a$ is linearly increased from a certain point of time at a fixed rate. In the embodiment of FIG. 53 having the airflow introducing plate 306, when airflow temperature $T_a$ is increased as shown in FIG. 55, the temperatures detected by the high-temperature detecting element 309*a* become like $T_{h1}$. The temperatures detected by the low-temperature detecting element 309*b* become like $T_{c1}$.

In the embodiment of FIG. 54 having no airflow introducing plate, when airflow temperature $T_a$ is linearly increased with the same conditions, the temperatures detected by the high-temperature detecting element 309*a* become like $T_{h2}$. The temperatures detected by the low-temperature detecting element 309*b* become like $T_{c2}$.

In comparison of the detected temperatures $T_{h1}$ and $T_{c1}$ in the embodiment of FIG. 53 and the detected temperatures $T_{h2}$ and $T_{c2}$ in the embodiment of FIG. 54 having no airflow introducing plate, the embodiment with the airflow introducing plate 306 possesses a higher ability to follow airflow temperature $T_a$. Therefore, it can be confirmed that a hot airflow can be efficiently introduced and collected at the central portion by the outer cover 304 having the airflow introducing plate 306, and a sensitivity to detection can be sufficiently enhanced.

Even in the embodiment of FIG. 54 having no airflow introducing plate, a high ability to follow airflow temperature $T_a$ is obtained compared with the detected temperature T2 which is obtained by the conventional structure in which plate fins are disposed in the center direction.

In the above-described embodiments with the heat sensing plate 308, the heat sensing plate 308 is provided at approximately the center of the surface of the sensor main body 302 which is exposed to a hot airflow. And the under side of the heat sensing plate 308 is directly contacted by the heat detecting element 309 or high-temperature detecting element 309*a*. However, instead of using the heat sensing plate 308, a heat detecting element such as a thermistor in the form of a plate may be provided directly on a flat portion of the sensor main body 302 which is exposed to a hot airflow.

As set forth in the embodiments shown in FIGS. 44 through 55, the present invention has the following advantages:

If the outer cover is exposed to a hot airflow generated by a fire, a vortical airflow which flows toward the center is generated and collected at the center sensing portion by a plurality of plate fins disposed at a predetermined offset angle to the center of the outer cover. Therefore, sensitivity to detecting a hot airflow can be enhanced.

By mounting the airflow introducing plate on the upper ends of the plate fins so that it is approximately parallel to the sensor main body, a hot airflow introduced by the plate fins is efficiently collected at the central sensing portion. Therefore, sensitivity to detecting a hot airflow can be further enhanced.

While the present invention has been described with reference to the preferred embodiments thereof, the invention is not to be limited to the details given herein. As this invention may be embodied in several forms without departing from the spirit of the essential characteristics thereof, the present embodiments are therefore illustrative and not restrictive. Since the scope of the invention is defined by the appended claims rather than by the description preceding them, all changes that fall within the metes and bounds of the claims, or equivalence of such metes and bounds thereof are therefore intended to be embraced by the claims.

What is claimed is:

1. A fire heat sensor comprising:

a plurality of detecting portions comprising at least three detecting portions mounted in thermal insulation and oriented in portions for receiving heat from hot airflow generated in the case of a fire;

at least one of said detecting portions being a low temperature detecting portion comprising a heat accumulator, a heat collector, and a temperature detecting element for measuring and outputting the temperature which rises gradually when heat is received from said hot airflow;

at least one of the remaining detection portions being high temperature detecting portion comprising a heat collector and a temperature detecting element for measuring and outputting the temperature which rises rapidly when heat is received from said hot airflow; and a heat sensing circuit for performing differential heat sensing based on the outputs of said at least one low temperature detecting portion and said at least one high temperature detecting portion;

wherein said heat collectors achieve thermal insulation by being mounted on a detecting element fixed board which is composed of a material whose thermal diffusivity is less than $10^{-6}$ $m^2/s$.

2. The fire heat sensor according to claim 1, wherein said heat accumulator comprises electronic components which forms a section of an electrical signal circuit.

3. The fire heat sensor according to claim 1, wherein each of said temperature detecting elements is constituted using a thermocouple, a thermistor, or a diode.

4. The fire heat sensor according to claim 3, wherein said heat accumulator comprises an electronic component which forms a portion of an electrical signal circuit.

5. The fire heat sensor according to claim 1, wherein said heat collectors are constituted using an electrode pad on a circuit mounting board.

6. The fire heat sensor according to claim 5, wherein said heat accumulator comprises an electronic component which forms a portion of an electrical signal circuit.

7. The fire heat sensor according to claim 5, wherein each of said temperature detecting elements is constituted using a thermocouple, a thermistor, or a diode.

8. The fire heat sensor according to claim 1, wherein said at least on low temperature detecting portion and said at least one high temperature detecting portion each have an output, said heat sensing circuit performs differential heat sensing by calculating the added value or average value of the temperature differences between each output of said at least one high temperature detecting portion with an output of said at least on low temperature detecting portion.

9. The fire heat sensor according to claim 8, wherein said heat accumulator comprises an electronic component which forms a portion of an electrical signal circuit.

10. The fire heat sensor according to claim 8, wherein the thermal diffusivity of the material of said heat collectors and said heat accumulator is defined in the range of $10^{-6}$ to $10^{-3}$ $m^2/s$.

11. The fire heat sensor according to claim 8, wherein said heat collectors are constituted using an electrode pad on a circuit mounting board.

12. The fire heat sensor according to claim 1, wherein the thermal diffusivity of the materials of said heat collectors and said heat accumulator is defined in the range of $10^{-6}$ to $10^{-3}$ $m^2/s$.

13. The fire heat sensor according to claim 12, wherein said heat accumulator comprises an electronic component which forms a portion of an electrical signal circuit.

14. The fire heat sensor according to claim 12, wherein said heat collectors are constituted using an electrode pad on a circuit mounting board.

15. The fire heat sensor according to claim 12, wherein each of said temperature detecting elements is constituted using a thermocouple, a thermistor, or a diode.

16. The fire heat sensor according to claim 1, comprising one high temperature detecting portion and two low temperature detecting portions;

said heat collector of said high temperature detecting portion is positioned substantially in a center of a circular periphery and said heat collectors of said two low temperature detecting portions are positioned symmetrically on a centerline that crosses substantially in a middle of a circular form; and said one high temperature detecting portion and said two low temperature detecting portions each have an output, said heat sensing circuit performs differential heat sensing by calculating the added value or average value of the temperature differences between each output of said one high temperature detecting portion with each of said two low temperature detecting portions.

17. The fire heat sensor according to claim 16, wherein said heat accumulators each comprise an electronic component which forms a portion of an electrical signal circuit.

18. The fire heat sensor according to claim 16, wherein the thermal diffusivity of the material of said heat collectors and said heat accumulators is defined in the range of $10^{-6}$ to $10^{-3}$ $m^2/s$.

19. The fire heat sensor according to claim 16, wherein said heat collectors are constituted using an electrode pad on a circuit mounting board.

20. The fire heat sensor according to claim 16, wherein each of said temperature detecting elements is constituted using a thermocouple, a thermistor, or a diode.

21. The fire heat sensor according to claim 1, comprising one low temperature detecting portion and a plurality of four or more high temperature detecting portions;

said heat collector of said low temperature detecting portion is positioned substantially in a center of a circular periphery and said heat collectors of said plurality of high temperature detecting portions are positioned symmetrically on a centerline that crosses substantially in a middle of a circular form; and said heat sensing circuit performs differential heat sensing by calculating the added value or average value from the differences between each output of said plurality of high temperature detection portions with each output of said one low temperature detecting portion.

22. The fire heat sensor according to claim 21, wherein said heat accumulator comprises an electronic component which forms a portion of an electrical signal circuit.

23. The fire heat sensor according to claim 21, wherein the thermal diffusivity of the material of said heat collectors and said heat accumulator is defined in the range of $10^{-6}$ to 10 $^{-3}$ $m^2/s$.

24. The fire heat sensor according to claim 21, wherein said heat collectors are constituted using an electrode pad on a circuit mounting board.

25. The fire heat sensor according to claim 21, wherein each of said temperature detecting elements is constituted using a thermocouple, a thermistor, or a diode.

26. The fire heat sensor according to claim 1, comprising one high temperature detecting portion and a plurality of four or more low temperature detecting portions;

said heat collector of said one high temperature detecting portion is positioned substantially in a center of a circular periphery and said heat collectors of said plurality of low temperature detecting portions are positioned symmetrically on a centerline that crosses substantially in a middle of a circular form; and said heat sensing circuit performs differential heat sensing by calculating the added value or average value from the differences between each output of said one high temperature detecting portion with each output of said plurality of low temperature detecting portions.

27. The fire heat sensor according to claim 26, wherein said heat accumulators each comprise an electronic component which forms a portion of an electrical signal circuit.

28. The fire heat sensor according to claim 26, wherein the thermal diffusivity of the material of said heat collectors and said heat accumulators is defined in the range of $10^{-6}$ to $10^{-3}$ $m^2/s$.

29. The fire heat sensor according to claim 26, wherein said heat collectors are constituted using an electrode pad on a circuit mounting board.

30. The fire heat sensor according to claim 26, wherein each of said temperature detecting elements is constituted using a thermocouple, a thermistor, or a diode.

31. The fire heat sensor according to claim 1, comprising a plurality of the same number of said low temperature detecting portions and said high temperature detecting portions;

said heat collector of said plurality of low temperature detecting portions are positioned symmetrically with respect to each other on a circular periphery on a centerline which crosses substantially a middle of a circular configuration; and said plurality of high temperature detecting portions are positioned symmetrically with respect to each other on the periphery of said circular configuration or on the periphery of another concentric circular configuration on a centerline which crosses substantially a middle of a circular configuration;

said heat sensing circuit performs differential heat sensing to calculate the average value of each output of said plurality of high temperature detecting portions and the average value of each output of said plurality of low temperature detecting portions.

32. The fire heat sensor according to claim 31, wherein said heat accumulators each comprise an electronic component which forms a portion of an electrical signal circuit.

33. The fire heat sensor according to claim 31, wherein the thermal diffusivity of the material of said heat collectors and said heat accumulators is defined in the range of $10^{-6}$ to $10^{-3}$ $m^2/s$.

34. The fire heat sensor according to claim 31, wherein said heat collectors are constituted using an electrode pad on a circuit mounting board.

35. The fire heat sensor according to claim 31, wherein each of said temperature detecting elements is constituted using a thermocouple, a thermistor, or a diode.

36. The fire heat sensor according to claim 1, comprising one low temperature detecting portion and two high temperature detection portions;

said heat collector of said low temperature detecting portion is positioned substantially in a center of a circular periphery and said heat collectors of said two high temperature detecting portions are positioned symmetrically on a centerline that crosses substantially in the a middle of the a circular form.

37. The fire heat sensor according to claim 36, wherein said heat accumulator comprises an electronic component which forms a portion of an electrical signal circuit.

38. The fire heat sensor according to claim 36, wherein said heat sensing circuit performs differential heat sensing by calculating the added value or average value of the temperature differences between each output of said two high temperature detecting portions with an output of said one low temperature detecting portion.

39. The fire heat sensor according to claim 36, wherein the thermal diffusivity of the material of said heat collectors and said heat accumulator is defined in the range of $10^{-6}$ to $10^{-3}$ $m^2/s$.

40. The fire heat sensor according to claim 36, wherein said heat collectors are constituted using a electrode pad on a circuit mounting board.

41. The fire heat sensor according to claim 36, wherein each of said temperature detecting elements is constituted using a thermocouple, a thermistor, or a diode.

42. The fire heat sensor according to claim 36, wherein said temperature detecting elements of said one low temperature detecting portion and said two high temperature detecting portions comprise two dual-transistor components in which each contains a resin molded pair of internal transistors;

said heat collector of said one low temperature detecting portion is connected to lead frame terminals attached to each other of said internal transistors of a low direction pair in said two dual-transistor components;

said heat collectors of said two high temperature detecting portions are connected separately to lead frame terminals attached to said internal transistors of a high direction pair in said two dual-transistor components; and said heat sensing circuit comprises a bridge circuit which includes said low direction pair of said internal transistors connected to said low temperature detecting portion and said high direction pair of said internal transistors connected to said high temperature detecting portions for acquiring the differential output corresponding to the temperature difference in said low temperature detecting portion and said high temperature detecting portions.

43. The fire heat sensor according to claim 42, wherein said heat accumulator comprises an electronic component which forms a portion of an electrical signal circuit.

44. The fire heat sensor according to claim 42 wherein said heat sensing circuit performs differential heat sensing by calculating the added value or average value of the temperature differences between each output of said two high temperature detecting portions with an output of said one low temperature detecting portion.

45. The fire heat sensor according to claim 42, wherein the thermal diffusivity of the material of said heat collectors and said heat accumulator is defined in the range of $10^{-6}$ to $10^{-3}$ $m^2/s$.

46. The fire heat sensor according to claim 42, wherein said heat collectors are constituted using an electrode pad on a circuit mounting board.

47. The fire heat sensor according to claim 42, wherein each of said temperature detecting elements is constituted using a thermocouple, a thermistor, or a diode.

48. The fire heat sensor according to claim 42, wherein said heat sensing circuit comprising said bridge circuit includes a Darlington connection of two transistors with the collector leads connected to said low temperature detecting portion and a Darlington connection of two transistors with the collector leads connected to said high temperature detecting portions for acquiring the differential output corresponding to the temperature difference in said low temperature detecting portion and said high temperature detecting portions.

49. The fire heat sensor according to claim 48, wherein said heat accumulator comprises an electronic component which forms a portion of an electrical signal circuit.

50. The fire heat sensor according to claim 48, wherein said heat sensing circuit performs differential heat sensing by calculating the added value or average value of the temperature differences between each output of said two high temperature detecting portions with an output of said one low temperature detecting portion.

51. The fire heat sensor according to claim 48, wherein the thermal diffusivity of the material of said heat collectors and said heat accumulator is defined in the range of $10^{-6}$ to $10^{-3}$ $m^2/s$.

52. The fire heat sensor according to claim 48, wherein said heat collectors are constituted using an electrode pad on a circuit mounting board.

53. The fire heat sensor according to claim 42, wherein said heat sensing circuit comprising said bridge circuit includes a parallel connection of two transistors with the collector leads connected to said low temperature detecting portion and a parallel connection of two transistors with the collector leads connected to said high temperature detecting portions for acquiring the differential output corresponding to the temperature difference in said low temperature detecting portion and said high temperature detecting portions.

54. The fire heat sensor according to claim 53, wherein said heat accumulator comprises an electronic component which forms a portion of an electrical signal circuit.

55. The fire heat sensor according to claim 53, wherein said heat sensing circuit performs differential heat sensing by calculating the added value or average value of the temperature differences between each output of said two high temperature detecting portions with an output of said one low temperature detecting portion.

56. The fire heat sensor according to claim 53, wherein the thermal diffusivity of the material of said heat collectors and said heat accumulator is defined in the range of $10^{-6}$ to $10^{-3}$ $m^2/s$.

57. The fire heat sensor according to claim 53, wherein said heat collectors are constituted using an electrode pad on a circuit mounting board.

58. The fire heat sensor according to claim 42, wherein said temperature detecting element of said one low temperature detecting portion comprises the first and third internal transistors of said pairs in said two dual-transistor components and said temperature detecting elements of said two high temperature detecting portions comprise the second and fourth internal transistors of said pairs in said two dual-transistor components;

said first and third transistors are connected so that a junction is made with said lead frame terminals attached to said heat collector of said one low temperature detecting portion; and said second and fourth transistors are connected respectively so that a junction is made with said lead frame terminals attached to said heat collectors of said two high temperature detecting portions; and said heat sensing circuit comprising said bridge circuit includes said first and third transistors connected to said low temperature detecting portion and said second and fourth transistors connected to said two high temperature detecting portions for acquiring the differential output corresponding to the temperature difference in said low temperature detecting portion and said high temperature detecting portions.

59. The fire heat sensor according to claim 58, wherein said heat sensing circuit comprising said bridge circuit includes a Darlington connection of two transistors with the collector leads connected to said low temperature detecting portion and a Darlington connection of two transistors with the collector leads connected to said high temperature detecting portions for acquiring the differential output corresponding to the temperature difference in said low temperature detecting portion and said high temperature detecting portions.

60. The fire sensor according to claim 58, wherein said heat sensing circuit comprising said bridge circuit includes a parallel connection of two transistors with the collector leads connected to said low temperature detecting portion and a parallel connection of two transistors with the collector leads connected to said high temperature detecting portions for acquiring the differential output corresponding to the temperature difference in said low temperature detecting portion and said high temperature detecting portions.

61. The fire heat sensor according to claim 58, wherein said heat accumulator comprises an electronic component which forms a portion of an electrical signal circuit.

62. The fire heat sensor according to claim 58, wherein said heat sensing circuit performs differential heat sensing by calculating the added value or average value of the temperature differences between each output of said two high temperature detecting portions with an output of said one low temperature detecting portion.

63. The fire heat sensor according to claim 58, wherein the thermal diffusivity of the material of said heat collectors and said heat accumulator is defined in the range of $10^{-6}$ to $10^{-3}$ $m^2/s$.

64. The fire heat sensor according to claim 58, wherein said heat collectors are constituted using an electrode pad on a circuit mounting board.

65. A fire heat sensor comprising:

a plurality of detecting portions comprising at least three detecting portions mounted in thermal insulation and oriented in positions for receiving heat from hot airflow generated in the case of a fire;

at least one said heat detecting portions being a low temperature detecting portion in one segment of said plurality of heat collectors comprising a heat accumulator, a heat collector, and a temperature detecting element for measuring and outputting the temperature which rises gradually when heat is received from said hot airflow;

at least two of the remaining detection portions high temperature detecting portions each comprising a heat collector and a temperature detecting element for measuring and outputting the temperature which rises rapidly when heat is received from said hot airflow; and a heat sensing circuit for performing differential heat sensing based on the outputs of said at least one low temperature detecting portion and said at least two high temperature detecting portions, said heat collector of said at least one low temperature detecting portion is positioned substantially in a center of a circular periphery and said heat collectors of said at least two high temperature detecting portions are positioned symmetrically on a centerline that crosses substantially in a middle of a circular form;

wherein said temperature detecting elements of said at least one low temperature detecting portion and said at least two high temperature detecting portions comprise two dual-transistor components in which each contains a resin molded pair of internal transistors;

said heat collector of said at least one low temperature detecting portion is connected to the lead frame terminals attached to each other of said internal transistors of a low direction pair in said two dual-transistor components, said heat collectors of said at least two high temperature detecting portions are connected separately to said lead frame terminals attached to said internal transistors of a high detection pair in said two dual-transistor components; and said heat sensing circuit comprises a bridge circuit which includes said low direction pair of said internal transistors connected to said at least one low temperature detecting portion and said high direction pair of said internal transistors connected to said at least two high temperature detecting portions for acquiring the differential output corresponding to the temperature difference in said at least one low temperature detecting portion and said at least two high temperature detecting portions.

66. The fire heat sensor according to claim 65, wherein said heat sensing circuit comprising said bridge circuit includes a Darlington connection of two transistors with the collector leads connected to said at least one low temperature detecting portion and a Darlington connection of two transistors with the collector leads connected to said at least two high temperature detecting portions for acquiring the differential output corresponding to the temperature difference in said at least one low temperature detecting portion and said at least two high temperature detecting portions.

67. The fire heat sensor according to claim 65, wherein said heat sensing circuit comprising said bridge circuit includes a parallel connection of two transitors with the collector leads connected to said at least one low temperature detecting portion and a parallel connection of two transistors with the collector leads connected to said at least two high temperature detecting portions for acquiring the differential output corresponding to the temperature difference in said at least one low temperature detecting portion and said at least two high temperature detecting portions.

68. The fire heat sensor according to claim 65, wherein said heat accumulator comprises an electronic component which forms a portion of an electrical signal circuit.

69. The fire heat sensor according to claim 65, wherein said heat sensing circuit performs differential heat sensing by calculating the added value or average value of each difference of each output from the differential outputs corresponding to the temperature differences of each output of said at least two high temperature detecting portions and said at least one low temperature detecting portion.

70. The fire heat sensor according to claim 65, wherein the thermal diffusivity of the material of said heat collectors and said heat accumulator is defined in the range of $10^{-6}$ to $10^{-3}$ $m^2/s$.

71. The fire heat sensor according to claim 65, wherein said heat collectors are constituted using an electrode pad on a circuit mounting board.

72. The fire heat sensor according to claim 65, wherein each of said temperature detecting elements is constituted using a thermocouple, a thermistor, or a diode.

73. A fire heat sensor comprising:

a plurality of detecting portions comprising at least three detecting portions mounted in thermal insulation and oriented in positions for receiving heat from hot airflow generated in case of fire;

one of said detecting portions being a low temperature detecting portion comprising a heat accumulator, a heat collector, and a temperature detecting element for measuring and outputting the temperature which rises gradually when heat is received from said hot airflow;

two of the remaining detecting portions being high temperature detecting portions each comprising a heat collector and a temperature detecting element for measuring and outputting the temperature which rises rapidly when heat is received from said hot airflow; and a heat sensing circuit for performing differential heat sensing based on the outputs of said low temperature detecting portion and said high temperature detecting portions;

said heat coolector of said low temperature detecting portion is positioned substantially in a center of a circular periphery and said heat collectors of said two high temperature detecting portions are positioned symmetrically on a centerline that crosses substantially in a middle of a circular form;

wherein said temperature detecting element of said one low temperature detecting portion comprises first and third internal transistors of said pairs in said two dual-transistor components and said temperature detecting elements of said two high temperature detecting portions comprise the second and fourth internal transistors of said pairs in said two dual-transistor components;

said first and third transistors are connected so that a junction is made with said lead frame terminals attached to said heat collector of said one low temperature detecting portion; and said second and fourth transistors are connected respectively so that a junction is made with said lead frame terminals attached to said heat collectors of said two high temperature detecting portions; and said heat sensing circuit comprising said bridge circuit includes said first and third transistors connected to said low temperature detecting portion and said second and fourth transistors connected to said two high temperature detecting portions for acquiring the differential output corresponding to the temperature difference in said low temperature detecting portion and said high temperature detecting portions.

74. The fire heat sensor according to claim 73, wherein said heat sensing circuit comprising said bridge circuit includes a Darlington connection of two transistors with the collector leads connected to said low temperature detecting portion and a Darlington connection of two transistors with the collector leads connected to said high temperature detecting portions for acquiring the differential output corresponding to the temperature difference in said low temperature detecting portion and said high temperature detecting portions.

75. The fire heat sensor according to claim 73, wherein said heat sensing circuit comprising said bridge circuit includes a parallel connection of two transitors with the collector leads connected to said at least one low temperature detecting portion and a parallel connection of two transistors with the collector leads connected to said at least two high temperature detecting portions for acquiring the differential output corresponding to the temperature difference in said at least one low temperature detecting portion and said at least two high temperature detecting portions.

76. The fire heat sensor according to claim 73, wherein said heat accumulator comprises an electronic component which forms a portion of an electrical signal circuit.

77. The fire heat sensor according to claim 65, wherein said heat sensing circuit performs differential heat sensing by calculating the added value or average value of each difference of each output from the differential outputs corresponding to the temperature differences of each output of said at least two high temperature detecting portions and said at least one low temperature detecting portion.

78. The fire heat sensor according to claim 73, wherein the thermal diffusivity of the material of said heat collectors and said heat accumulator is defined in the range of $10^{-6}$ to $10^{-3}$ $m^2/s$.

79. The fire heat sensor according to claim 73, wherein said heat collectors are constituted using an electrode pad on a circuit mounting board.

* * * * *